(12) United States Patent
Murai et al.

(10) Patent No.: US 9,777,087 B2
(45) Date of Patent: Oct. 3, 2017

(54) POLYMER INCLUDING PHTHALOCYANINE STRUCTURE, METHOD FOR PRODUCING THE POLYMER, PIGMENT COMPOSITION, PIGMENT DISPERSION, AND TONER

(71) Applicant: CANON KABUSHIKI KAISHA, Tokyo (JP)

(72) Inventors: Yasuaki Murai, Kawasaki (JP); Osamu Matsushita, Kawasaki (JP); Takayuki Toyoda, Yokohama (JP); Waka Hasegawa, Tokyo (JP); Ayano Mashida, Kawasaki (JP); Kosuke Mukumoto, Yokohama (JP); Masashi Hirose, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/053,985

(22) Filed: Feb. 25, 2016

(65) Prior Publication Data
US 2016/0251465 A1    Sep. 1, 2016

(30) Foreign Application Priority Data

Feb. 27, 2015    (JP) .................................. 2015-039423

(51) Int. Cl.
| | |
|---|---|
| G03G 9/09 | (2006.01) |
| C08F 212/08 | (2006.01) |
| C08F 220/36 | (2006.01) |
| C08F 220/60 | (2006.01) |
| C09D 11/107 | (2014.01) |
| C08K 3/00 | (2006.01) |

(Continued)

(52) U.S. Cl.
CPC .......... *C08F 212/08* (2013.01); *C08F 220/36* (2013.01); *C08F 220/60* (2013.01); *C08K 3/0033* (2013.01); *C08K 3/04* (2013.01); *C08K 5/0041* (2013.01); *C08K 5/3417* (2013.01); *C09D 11/107* (2013.01); *G03G 9/0874* (2013.01); *G03G 9/08711* (2013.01); *G03G 9/08784* (2013.01); *G03G 9/08791* (2013.01); *G03G 9/08797* (2013.01); *G03G 9/0904* (2013.01); *G03G 9/0918* (2013.01)

(58) Field of Classification Search
CPC .................................................. G03G 9/0918
See application file for complete search history.

(56) References Cited

U.S. PATENT DOCUMENTS

| 5,166,025 A | 11/1992 | Kaieda |
| 2012/0235099 A1 | 9/2012 | Ushijima |

FOREIGN PATENT DOCUMENTS

| JP | H03113462 A | 5/1991 |
| JP | H06148927 A | 5/1994 |

(Continued)

OTHER PUBLICATIONS

De Loos, Femke, et al., "Construction of Phthalocyanine-Terminated Polystyrene Nanoarchitectures", Journal of Physical Organic Chemistry, Feb. 29, 2012, pp. 586-591, vol. 25.

(Continued)

*Primary Examiner* — Hoa V Le
(74) *Attorney, Agent, or Firm* — Canon U.S.A., Inc. IP Division

(57) ABSTRACT

A polymer including a unit having a phthalocyanine structure, the polymer having a high capability of dispersing pigments. A pigment composition, a pigment dispersion, and a toner all having a high tinting strength.

14 Claims, 4 Drawing Sheets

(56) References Cited

FOREIGN PATENT DOCUMENTS

| | | | |
|---|---|---|---|
| JP | H07324170 A | 12/1995 | |
| JP | 2000515181 A | 11/2000 | |
| JP | 3721617 B2 | 11/2005 | |
| JP | 4254292 B2 | 4/2009 | |
| JP | 2012067285 A | 4/2012 | |
| JP | 2012-153813 A | 8/2012 | |
| WO | 95/26381 A1 | 10/1995 | |
| WO | 99/05099 A1 | 2/1999 | |
| WO | 2009157536 A1 | 12/2009 | |

OTHER PUBLICATIONS

Wang, Laibing, et al., "A Novel Approach to Synthesize Polymers for Potential Photodynamic Therapy: from Benzenedinitrile to Phthalocyanine" Polymer Chemistry, 2014, pp. 2872-2879, vol. 5, Royal Society of Chemistry.

Matyjaszewski, Krzysztof, et al., "Atom Transfer Radical Polymerization", Chemical Reviews, Sep. 12, 2001, pp. 2921-2990, vol. 101, No. 9.

Hawker, Craig J. et al. "New Polymer Synthesis by Nitroxide Mediated Living Radical Polymerizations", Chemical Reviews, Oct. 25, 2001, pp. 3661-3688, vol. 101, No. 12.

Kamigaito, Masami, et. al, "Metal-Catalyzed Living Radical Polymerization", Chemical Reviews, Dec. 12, 2001, pp. 3689-3745, vol. 101, No. 12.

Goto, Atsushi, et al., "Mechanism-Based Invention of High-Speed Living Radical Polymerization Using Organotellurium Compounds and Azo-Initiators", Journal of American Chemical Society, Jun. 25, 2003, pp. 8720-8721, vol. 125, No. 29.

Lacroix-Desmazes, Patrick, et al., "Reverse Iodine Transfer Polymerization of Methyl Acrylate and n-Butyl Acrylate", Macromolecules, Jun. 18, 2005, pp. 6299-6309, vol. 38, No. 15.

P. Peyser, "Glass Transtition Temperatures of Polymers", Polymer Handbook, 3rd Ed., Sep. 1989, pp. 209-277.

POLYMER INCLUDING PHTHALOCYANINE STRUCTURE, METHOD FOR PRODUCING THE POLYMER, PIGMENT COMPOSITION, PIGMENT DISPERSION, AND TONER

BACKGROUND OF THE DISCLOSURE

Field of the Disclosure

The present disclosure relates to a polymer including a phthalocyanine structure, a method for producing the polymer, a pigment composition including the polymer, a pigment dispersion including the pigment composition, and a toner including the pigment composition.

Description of the Related Art

High-order functional polymer compounds have been generally produced by using pendant-like polymers. Pendant-like polymers are produced by introducing a low-molecular-weight compound that serves as a pendant group into the backbone of the polymer and have both function of low-molecular-weight compounds and function of polymers. Polymers including coloring matter serving as a pendant group are markedly useful from the viewpoint of engineering because they enable coloring matter having ease of forming and working, which are the advantages of polymers, to be produced.

In particular, various functional polymers including a phthalocyanine structure that serves as a pendant group have been proposed because such polymers allow the spectral characteristics of phthalocyanine to be utilized. For example, Japanese Patent Laid-Open No. 07-324170 proposes utilization of such a functional polymer as an optical recording medium. In addition, Laibing Wang et al, Polym. Chem. 2014,vol. 5,issue 8,pp. 2872-2879,The Royal Society of Chemistry, United Kingdom reports an example case where such a functional polymer is utilized as coloring matter for photodynamic therapy. International Publication No. 2009/157536 proposes an example case where such a functional polymer is utilized as a colorant or a pigment dispersant.

An example case where the pendant-like polymer is utilized as a pigment dispersant is focused. In general, pigment particles having a small diameter are less likely to be dispersed to a sufficient degree in a medium such as an organic solvent, a molten resin, or the like because strong cohesive forces are likely to act between the pigment particles. If the dispersibility of a pigment is low and the particles of the pigment are coagulated, tinting strength may be reduced.

Accordingly, there has been proposed a technique in which a dispersant is used in combination with a pigment for dispersing the pigment in order to enhance the dispersibility of the pigment. In particular, various dispersants have been proposed in order to enhance the dispersibility of pigments in toner particles.

For example, Japanese Patent Laid-Open No. 2012-067285 discloses a technique for dispersing azo pigments, in which a compound including an azo skeleton structure is used in combination with a binder resin and a pigment in order to produce a toner having good color tone.

Japanese Patent Laid-Open No. 03-113462 discloses a technique in which a polymer including a unit that is sodium styrenesulfonate is used as a dispersant in order to enhance the dispersibility of a phthalocyanine pigment in a cyan toner.

Japanese Patent Laid-Open No. 06-148927 discloses a toner that includes a copolymer constituted by a styrene monomer and an acrylic-acid-ester monomer (or, meth-acrylic-acid-ester monomer) in order to enhance the dispersibility of carbon black in a black toner.

Japanese Patent Laid-Open No. 07-324170 and International Publication No. 2009/157536 describe a method in which a polymerizable monomer including a phthalocyanine structure is synthesized and subsequently polymerized in order to form a pendant-like polymer. However, since the solubility of the phthalocyanine skeleton is low, in this method, it is necessary to introduce a soluble substituent such as a long-chain alkyl group or an alkoxy group into the aromatic ring of isoindoline included in the phthalocyanine skeleton in order to enhance reactivity. Furthermore, in order to bond the phthalocyanine structure to the polymer chain at one site, it is necessary to synthesize phthalocyanine that includes an amino group at one site, which serves as a reactive substituent, and to perform isolation purification using column chromatography or the like. Therefore, in this method, reaction yield is likely to be low and, when used as a mixture, a compound in which the phthalocyanine structure is bonded to a polymer chain at multiple sites may be produced as a byproduct.

In the method described in Laibing Wang et al, Polym. Chem. 2014,vol. 5,issue 8,pp. 2872-2879,The Royal Society of Chemistry, United Kingdom, for the same reason, it is also necessary to introduce a soluble substituent that is a long-chain alkoxy group into an isoindoline ring included in a phthalocyanine skeleton.

In the methods described in Japanese Patent Laid-Open Nos. 03-113462 and 06-148927,it is necessary to increase the amount of dispersant used in order to achieve a certain level of pigment dispersibility. Thus, there is a risk that the excessive amount of dispersant may affect the properties of the product depending on the application of the pigment.

The method described in Japanese Patent Laid-Open No. 2012-067285,in which a compound including an azo skeleton structure is used as a pigment dispersant, enables a compound capable of enhancing the dispersibility of various pigments to an acceptable level to be produced. However, a pigment dispersant having a higher capability of enhancing pigment dispersibility has been anticipated in order to meet a recent demand for an improvement of the quality of output images.

SUMMARY OF THE DISCLOSURE

The present disclosure provides a novel polymer including a unit including a phthalocyanine structure, the polymer having a high capability of dispersing pigments. The present disclosure also provides a pigment composition, a pigment dispersion, and a toner that have high tinting strength.

Specifically, a first aspect of the present disclosure relates to a polymer including a unit represented by any one of Formulae (1) and (2) below.

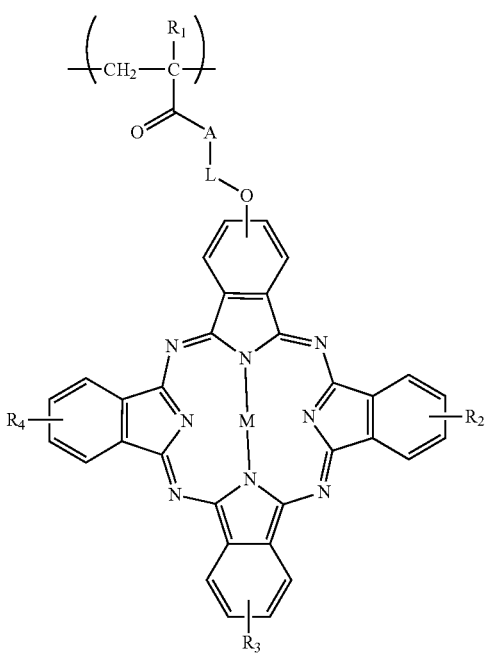

(1)

In Formula (1),
R₁ represents a hydrogen atom or an alkyl group;
R₂ to R₄ each independently represent a hydrogen atom or an alkyl group having 1 to 4 carbon atoms;
A represents an oxygen atom or an NH group;
L represents an alkylene group; and
M represents a divalent metal, a $SiX_2$ group, or an AlX group, where X represents a halogen atom or an $OR_5$ group, $R_5$ being a hydrogen atom, an alkyl group, an aryl group, or an aralkyl group.

In Formula (2), $R_1$ to $R_4$, A, and L represent the same things as $R_1$ to $R_4$, A, and L in Formula (1), respectively.

A second aspect of the present disclosure relates to a method for producing the above-described polymer.

A third aspect of the present disclosure relates to a pigment composition including the above-described polymer and a pigment.

A fourth aspect of the present disclosure relates to a pigment dispersion including the above-described pigment composition and a water-insoluble solvent.

A fifth aspect of the present disclosure relates to a toner including toner particles each including a binder resin and a colorant, the colorant being the above-described pigment composition.

Further features of the present disclosure will become apparent from the following description of exemplary embodiments with reference to the attached drawings.

DESCRIPTION OF THE EMBODIMENTS

Figure 1:
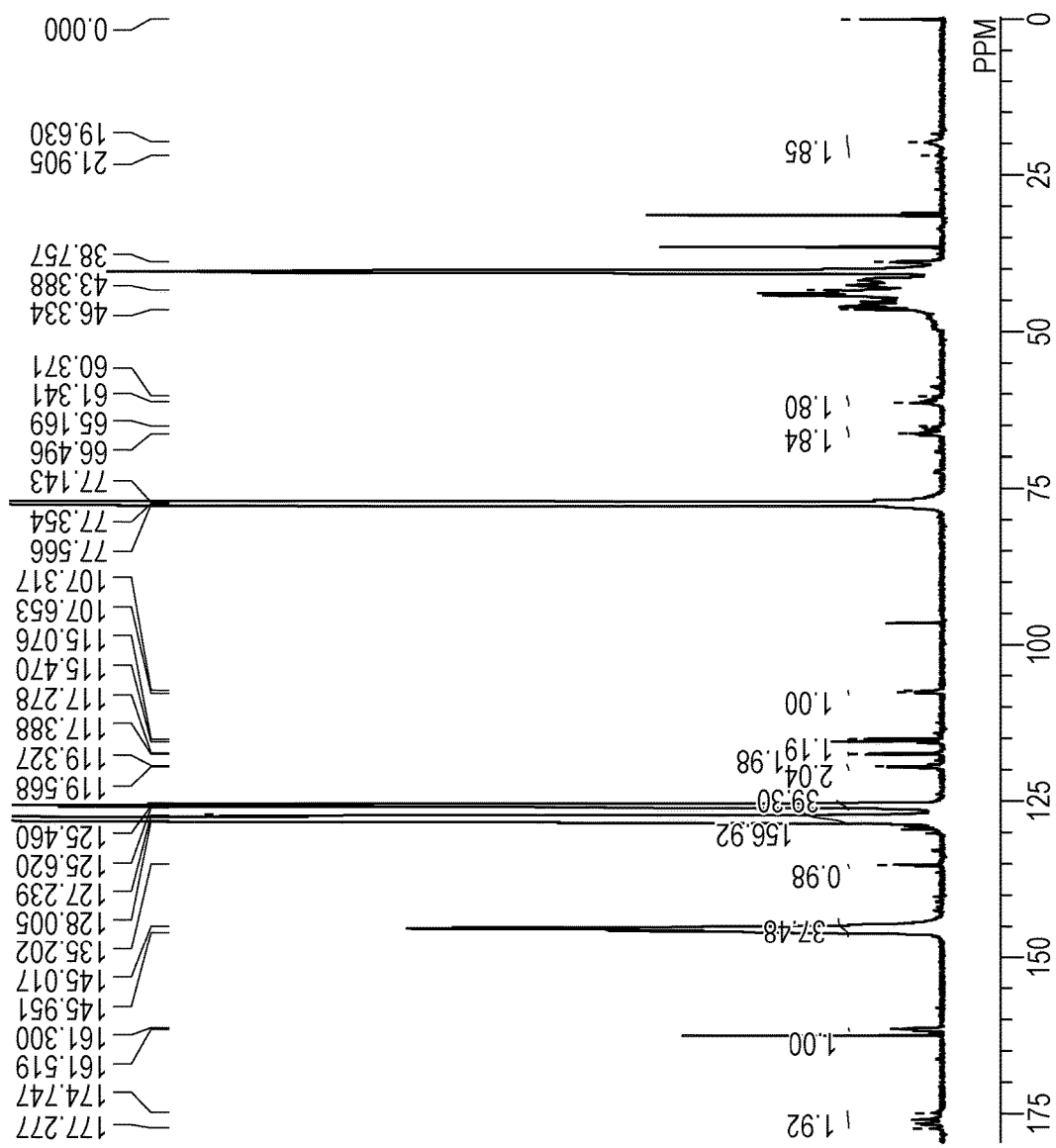
FIG. 1 illustrates a ¹³C NMR spectrum (CDCl₃, room temperature, 150 MHz) of a polymer (44) according to an embodiment of the present disclosure.

An embodiment of the present disclosure is described below in detail.

A polymer according to an embodiment of the present disclosure includes a unit represented by any one of Formulae (1) and (2) below.

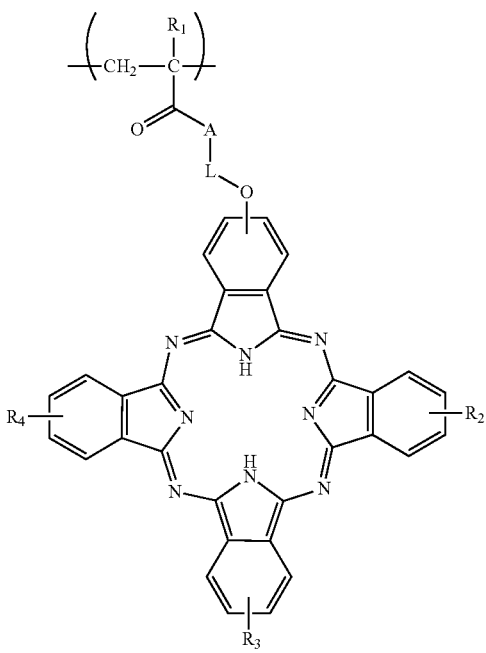

(2)

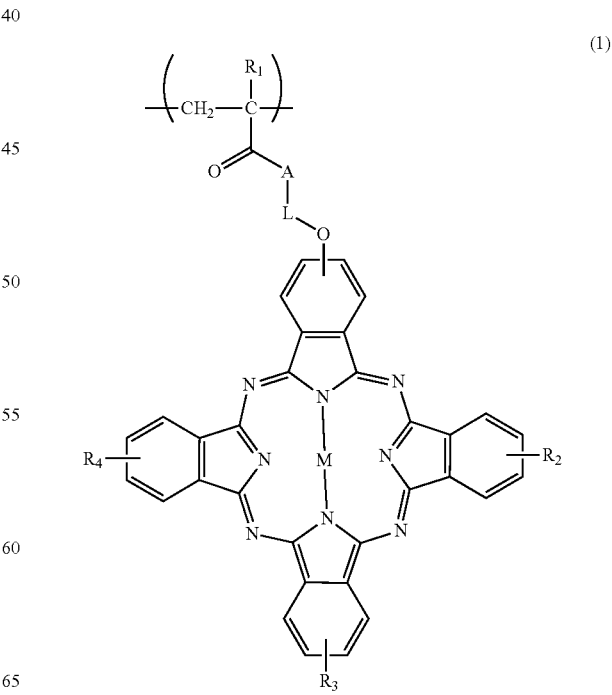

(1)

In Formula (1),

R₁ represents a hydrogen atom or an alkyl group;

R₂ to R₄ each independently represent a hydrogen atom or an alkyl group having 1 to 4 carbon atoms;

A represents an oxygen atom or an NH group;

L represents an alkylene group; and

M represents a divalent metal, a SiX₂ group, or an AlX group, where X represents a halogen atom or an OR₅ group, R₅ being a hydrogen atom, an alkyl group, an aryl group, or an aralkyl group.

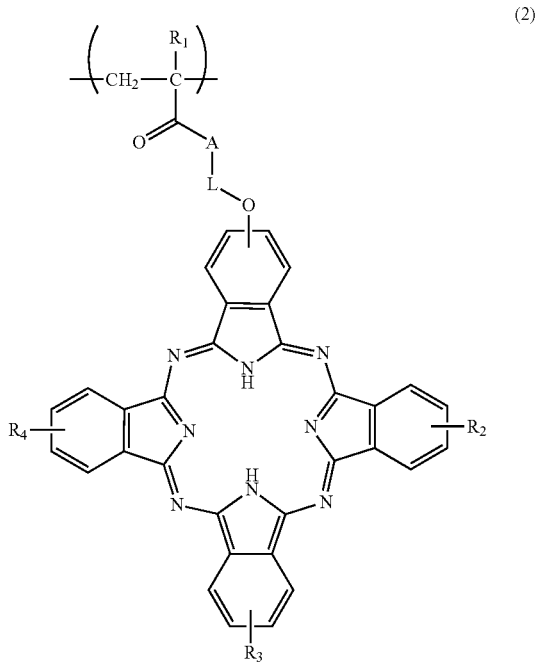

In Formula (2), R₁ to R₄, A, and L represent the same things as R₁ to R₄, A, and L in Formula (1), respectively.

Hereinafter, the phthalocyanine part of the unit represented by any one of Formulae (1) and (2) is referred to as "phthalocyanine structure", and the polymer-chain part of the unit which does not include the phthalocyanine structure is referred to as "backbone part".

The polymer according to the embodiment is described below.

The polymer according to the embodiment is constituted by the phthalocyanine structure included in the unit represented by any one of Formulae (1) and (2), which has a high affinity for a pigment, and the backbone part having a high affinity for water-insoluble solvents.

The phthalocyanine structure is described in detail below.

Examples of the alkyl group that may be used as R₁ in Formulae (1) and (2) include, but are not limited to, linear, branched, or cyclic alkyl groups such as a methyl group, an ethyl group, an n-propyl group, an n-butyl group, an n-pentyl group, an n-hexyl group, an isopropyl group, an isobutyl group, a sec-butyl group, a tert-butyl group, and a cyclohexyl group.

R₁ in Formulae (1) and (2) may be selected from the above functional groups and a hydrogen atom. R₁ in Formulae (1) and (2) may be a hydrogen atom or a methyl group from the viewpoint of the polymerizability of polymerizable monomers constituting the unit.

Examples of the alkyl group having 1 to 4 carbon atoms which may be used as R₂ to R₄ in Formulae (1) and (2) include, but are not limited to, linear or branched alkyl groups such as a methyl group, an ethyl group, an n-propyl group, an isopropyl group, an n-butyl group, a sec-butyl group, and a tert-butyl group.

R₂ to R₄ in Formulae (1) and (2) may be selected from the above functional groups and a hydrogen atom. All of R₂ to R₄ in Formulae (1) and (2) may be the same substituent from the viewpoint of ease of production. In particular, all of R₂ to R₄ may be a hydrogen atom from the viewpoint of affinity for pigments.

A in Formulae (1) and (2) is an oxygen atom or a NH group. A in Formulae (1) and (2) may be an oxygen atom from the viewpoint of the availability of raw materials.

Examples of the alkylene group that may be used as L in Formulae (1) and (2) include, but are not limited to, linear, branched, or cyclic alkylene groups such as a methylene group, an ethylene group, a trimethylene group, a propylene group, a tetramethylene group, a pentamethylene group, and a 1,4-cyclohexanedimethylene group.

L in Formulae (1) and (2) may be selected from the above functional groups. L in Formulae (1) and (2) is preferably an alkylene group having 1 to 3 carbon atoms, is more preferably an alkylene group having 2 or 3 carbon atoms, and is particularly preferably an ethylene group from the viewpoint of reactivity with phthalonitrile, which is described below.

Examples of the divalent metal that may be used as M in Formula (1) include, but are not limited to, Cu, Zn, Fe, Co, Ni, Ru, Rh, Pd, Pt, Mn, Mg, Ti, Be, Ca, Ba, Cd, Hg, Pb, and Sn.

X included in SiX and AlX that may be used as M in Formula (1) represents a halogen atom such as a fluorine atom, a chlorine atom, a bromine atom, or an iodine atom or an OR₅ group.

Examples of the alkyl group that may be used as R₅ included in the OR₅ group in Formula (1) include, but are not limited to, linear, branched, or cyclic alkyl groups such as a methyl group, an ethyl group, an n-propyl group, an n-butyl group, an n-pentyl group, an n-hexyl group, an isopropyl group, an isobutyl group, a sec-butyl group, a tert-butyl group, and a cyclohexyl group.

Examples of the aryl group that may be used as R₅ included in the OR₅ group in Formula (1) include, but are not limited to, a phenyl group, a 1-naphthyl group, a 2-naphthyl group, a 4-quinolyl group, or a 8-quinolyl group.

Examples of the aralkyl group that may be used as R₅ included in the OR₅ group in Formula (1) include, but are not limited to, a benzyl group and a phenethyl group.

M in Formula (1) may be selected from the above substituents. M in Formula (1) may be Zn, Cu, Co, Ni, or Fe from the viewpoint of affinity for pigments. M in Formula (1) may be Zn from the viewpoint of ease of production.

In the unit represented by any one of Formulae (1) and (2), the phthalocyanine structure is bonded to the polymer backbone via an ether linkage at one site. The ether linkage may be located at the a-position or the β-position of the phthalocyanine structure. The phthalocyanine structure may be bonded to the polymer backbone via an ether linkage at the β-position of the phthalocyanine structure from the viewpoint of reactivity with phthalonitrile, which is described below.

A unit represented by any one of Formulae (1) and (2) which is suitable from the viewpoints of affinity for pigments and ease of production is a unit represented by Formula (4).

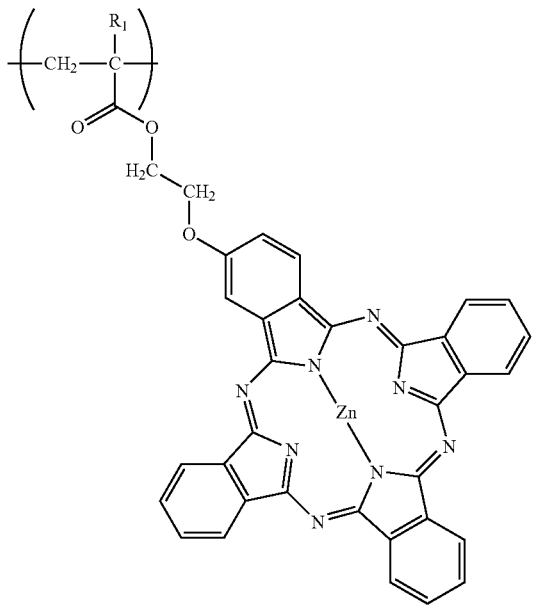

(4)

In Formula (4), $R_1$ represents a hydrogen atom or an alkyl group.

The backbone part of the polymer is described below. Note that the term "backbone part" used herein refers to a part of the polymer according to the embodiment which is other than the phthalocyanine skeleton, that is, specifically, a part of the polymer which extends from the polymer backbone to the oxygen atom bonded to the linking group L in Formulae (1) and (2). The molecular weight of the backbone part may refer to the molecular weight of the backbone part in which a hydrogen atom is bonded to the oxygen atom.

The backbone part may include the unit represented by Formula (3) below.

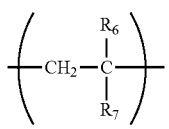

(3)

In Formula (3), $R_6$ represents a hydrogen atom or an alkyl group; and $R_7$ represents a phenyl group, a phenyl group including a substituent, a carboxyl group, an alkoxycarbonyl group, and a carboxamide group.

Examples of the alkyl group that may be used as $R_6$ in Formula (3) include, but are not limited to, linear, branched, or cyclic alkyl groups such as a methyl group, an ethyl group, an n-propyl group, an n-butyl group, an n-pentyl group, an n-hexyl group, an isopropyl group, an isobutyl group, a sec-butyl group, a tert-butyl group, and a cyclohexyl group.

$R_6$ in Formula (3) may be selected from the above functional groups. $R_6$ in Formula (3) may be a hydrogen atom or a methyl group from the viewpoint of the polymerizability of polymerizable monomers constituting the unit.

Examples of the alkoxycarbonyl group [–C(=O)—OR] that may be used as $R_7$ in Formula (3) include, but are not limited to, linear, branched, or cyclic alkoxycarbonyl groups such as a methoxycarbonyl group, an ethoxycarbonyl group, an n-propoxycarbonyl group, an isopropoxycarbonyl group, an n-butoxycarbonyl group, an isobutoxycarbonyl group, a sec-butoxycarbonyl group, a tert-butoxycarbonyl group, an octoxycarbonyl group, a nonoxycarbonyl group, a decoxycarbonyl group, an undecoxycarbonyl group, a dodecoxycarbonyl group, a hexadecoxycarbonyl group, an octadecoxycarbonyl group, an eicosoxycarbonyl group, a docosoxycarbonyl group, a 2-ethylhexoxycarbonyl group, a phenoxycarbonyl group, a 2-hydroxyethoxycarbonyl group, a 2-hydroxypropoxycarbonyl group, a 4-hydroxybutoxycarbonyl group, and a [4-(hydroxymethyl)cyclohexyl]methoxycarbonyl group.

The hydrogen atoms included in the carboxamide group that may be used as $R_7$ in Formula (3), which are bonded to a nitrogen atom, may be replaced with a substituent (—C(=O)—NHR or —C(=O)—NRR). Examples of such a carboxamide group including a substituent include, but are not limited to, linear or branched amide groups such as an N-methylamide group, an N,N-dimethylamide group, an N-ethylamide group, an N,N-diethylamide group, an N-isopropylamide group, an N,N-diisopropylamide group, an N-n-butylamide group, an N,N-di-n-butylamide group, an N-isobutylamide group, an N,N-diisobutylamide group, an N-sec-butylamide group, an N,N-di-sec-butylamide group, an N-tert-butylamide group, an N-octylamide group, an N,N-dioctylamide group, an N-nonylamide group, an N,N-dinonylamide group, an N-decylamide group, an N,N-didecylamide group, an N-undecylamide group, an N,N-diundecylamide group, an N-dodecylamide group, an N,N-didodecylamide group, an N-hexadecylamide group, an N-octadecylamide group, an N-phenylamide group, an N-(2-ethylhexyl)amide group, an N,N-di(2-ethylhexyl)amide group, and an N-(2-hydroxyethyl)amide group.

When $R_7$ in Formula (3) represents a phenyl group, the phenyl group may include a substituent. Any substituent that does not either deteriorate the polymerizability of polymerizable monomers constituting the unit or significantly deteriorate the solubility of the above-described polymer including the phthalocyanine structure may be used. Examples of the substituent that may be included in the phenyl group include alkoxy groups such as a methoxy group and an ethoxy group; amino groups such as an N-methylamino group and an N,N-dimethylamino group; acyl groups such as an acetyl group; and halogen atoms such as a fluorine atom and a chlorine atom.

$R_7$ in Formula (3) may be selected from the above functional groups. $R_7$ in Formula (3) may include at least one selected from a phenyl group or an alkoxycarbonyl group from the viewpoints of the dispersibility and compatibility of the polymer including the phthalocyanine structure in a medium.

The affinity of the backbone part for dispersion media can be controlled by changing the proportion of the unit represented by Formula (3). In the case where a nonpolar solvent such as styrene is used as a dispersion medium, the proportion of a unit represented by Formula (3) with $R_7$ being a phenyl group may be increased from the viewpoint of the affinity of the backbone part for the dispersion medium. In the case where a solvent having a certain degree of polarity, such as an acrylic acid ester, is used as a dispersion medium, the proportion of a unit represented by Formula (3) with $R_7$ being a carboxyl group, an alkoxycarbonyl group, or a carboxamide group may be increased from the viewpoint of the affinity of the backbone part for the dispersion medium.

The molecular weight of the backbone part is preferably 500 to 200,000. Setting the molecular weight of the backbone part to 500 or more may further enhance pigment dispersibility. Setting the molecular weight of the backbone part to 200,000 or less may further enhance the affinity of the backbone part for water-insoluble solvents. The number-average molecular weight of the backbone part is more preferably 2,000 to 50,000 from the viewpoint of ease of production.

As disclosed in PCT Japanese Translation Patent Publication No. 2003-531001, a method in which a branched aliphatic chain is introduced into a polyoxyalkylenecarbonyl dispersant at the terminal of the molecule thereof in order to enhance dispersibility is known. The branched aliphatic chain may also be introduced into the terminal of the backbone part of the polymer according to the embodiment by synthesizing a telechelic backbone part using atom transfer radical polymerization (ATRP) or the like.

The phthalocyanine structures included in the polymer may be interspersed at random in the polymer. Alternatively, the polymer may include only one phthalocyanine structure at one terminal of the polymer. In another case, the phthalocyanine structures may be unevenly dispersed in the polymer so as to form plural blocks of phthalocyanine structures.

The molar fraction of the phthalocyanine structures included in the polymer to the units constituting the backbone part is preferably 0.5 to 10 mol % and is more preferably 0.5 to 5.0 mol % from the viewpoint of the balance between affinity for pigments and affinity for dispersion media.

A method for producing the polymer according to the embodiment is described in detail below.

In the polymer including a phthalocyanine structure according to the embodiment, the phthalocyanine structure is bonded to the backbone part at one site. The polymer according to the embodiment may be selectively produced with a good yield by employing a production method including the following steps (i) to (iii):

(i) polymerizing a polymerizable monomer including a hydroxyl group in order to produce a polymer including a hydroxyl group;

(ii) reacting the hydroxyl group included in the polymer with phthalonitrile including a leaving group in order to introduce phthalonitrile into the polymer via an ether linkage; and (iii) causing a reaction of phthalonitrile included in the polymer in order to form a phthalocyanine ring.

The step (i) is described in detail below with reference to an example scheme of the step (i).

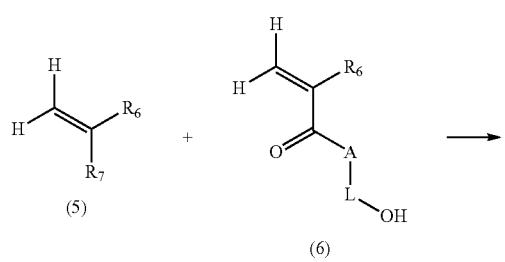

(5)   (6)

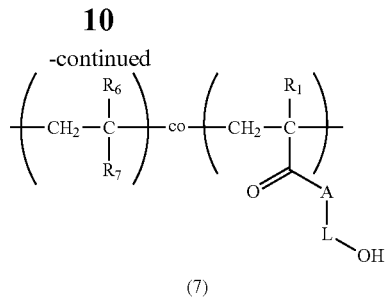

(7)

In the above scheme, $R_6$ and $R_7$ in Formulae (5) and (7) represent the same things as $R_6$ and $R_7$ in Formula (3) above, respectively; $R_1$, A, and L in Formula (6) represent the same things as $R_1$, A, and L in Formulae (1) and (2) above, respectively; and the symbol "co" means that units constituting the copolymer are arranged in a random order.

In the scheme of the step (i), a polymerizable monomer (5) that constitutes the unit represented by Formula (3) above is copolymerized with a polymerizable monomer (6) including a hydroxyl group in order to synthesize a polymer (7) including a hydroxyl group.

Since various polymerizable monomers including a hydroxyl group are commercially available, the polymerizable monomer (6) including a hydroxyl group is readily available. The polymerizable monomer (6) including a hydroxyl group may be readily synthesized by a method known in the related art.

Any polymerization method known in the related art (e.g., Krzysztof Matyjaszewski et al, Chemical Reviews, 2001, vol. 101, pp. 2921-2990, American Chemical Society, United States) may be employed for the polymerization reaction of the above scheme.

Specifically, radical polymerization, cationic polymerization, or anionic polymerization may be performed in order to synthesize the polymer (7) including a hydroxyl group. In particular, radical polymerization may be performed from the viewpoint of ease of production.

Radical polymerization may be performed by using a radical polymerization initiator, by performing irradiation with radiation, a laser beam, or the like, by using a photopolymerization initiator in combination with irradiation with light, or by performing heating.

Any radical polymerization initiator that causes radicals to be created and induces a polymerization reaction may be used. The radical polymerization initiator is selected from compounds that create radicals due to heat, light, radiation, or a redox reaction. Examples of such compounds include azo compounds, organic peroxides, inorganic peroxides, organometallic compounds, and photopolymerization initiators. Specific examples thereof include azo polymerization initiators such as 2,2'-azobis(isobutyronitrile), 2,2'-azobis(2-methylbutyronitrile), 2,2'-azobis(4-methoxy-2,4-dimethylvaleronitrile), and 2,2'-azobis(2,4-dimethylvaleronitrile); organic peroxide polymerization initiators such as benzoyl peroxide, di-t-butyl peroxide, t-butylperoxy isopropyl carbonate, t-hexyl peroxybenzoate, and t-butyl peroxybenzoate; inorganic peroxide polymerization initiators such as potassium persulfate and ammonium persulfate; and redox initiators such as a hydrogen peroxide-ferrous redox system initiator, a benzoyl peroxide-dimethylaniline redox system initiator, and a cerium(IV) salt-alcohol redox system initiator. Examples of the photopolymerization initiators include benzophenons, benzoin ethers, acetophenons, and thioxanthons. The above radical polymerization initiators may be used in combination of two or more as needed.

The amount of polymerization initiator used may be controlled within the range of 0.1 to 20 parts by mass relative to 100 parts by mass of the polymerizable monomer such that a copolymer having a desired molecular weight distribution is formed.

The polymer (7) including a hydroxyl group may also be produced by any other polymerization method such as solution polymerization, suspension polymerization, emulsion polymerization, dispersion polymerization, precipitation polymerization, or bulk polymerization. In particular, solution polymerization may be performed using a solvent in which polymerizable monomers used in the production of the polymer (7) can be dissolved. However, the polymerization method is not limited to solution polymerization. Specific examples of such a solvent include polar organic solvents such as alcohols (e.g., methanol, ethanol, and 2-propanol), ketones (e.g., acetone, and methyl ethyl ketone), ethers (e.g., tetrahydrofuran and diethyl ether), ethylene glycol monoalkyl ethers and the acetates thereof, propylene glycol monoalkyl ethers and the acetates thereof, and diethylene glycol monoalkyl ethers; and nonpolar solvents such as toluene and xylene. These solvents may be used alone or in combination of two or more. Among these solvents, in particular, solvents having a boiling point of 100° C. to 180° C. may be used alone or in combination od two or more.

The polymerization temperature varies depending on the type of polymerization initiator used. Specifically, polymerization is commonly performed at −30° C. to 200° C. and is preferably performed at 40° C. to 180° C. However, the polymerization temperature is not limited to the above temperature.

The molecular weight distribution and the molecular structure of the polymer (7) including a hydroxyl group can be controlled by a method known in the related art. Specifically, the molecular weight distribution and the molecular structure of the polymer (7) can be controlled by a method in which an addition-cleavage chain transfer agent is used (see Japanese Patent Nos. 4254292 and 3721617), an NMP method in which dissociation and bonding of amine oxide radicals are used (see, e.g., Craig J. Hawker et al, Chemical Reviews, 2001,Vol. 101,pp. 3661-3688,American Chemical Society, United States), an ATRP method in which polymerization is performed using a metal catalyst and ligands with a halogen compound serving as a polymerization initiator (see, e.g., Masami Kamigaito et al, Chemical Reviews, 2001,Vol. 101,pp. 3689-3746,American Chemical Society, United States), an RAFT method in which dithiocarboxylic acid ester, a xanthate compound, and the like are used as a polymerization initiator (see, e.g., PCT Japanese Translation Patent Publication No. 2000-515181), an MADIX method (see, e.g., International publication No. 99/05099), a DT method (see, e.g., Atsushi Goto et al, J. Am. Chem. Soc. 2003,Vol. 125,pp. 8720-8721,American Chemical Society, United States), or an RITP method (see, e.g., Patrik Lacroix-Desmazes et al, Macromolecules, 2005,vol. 38, pp. 6299-6309).

The step (ii) is described below in detail with reference to an example scheme of the step (ii).

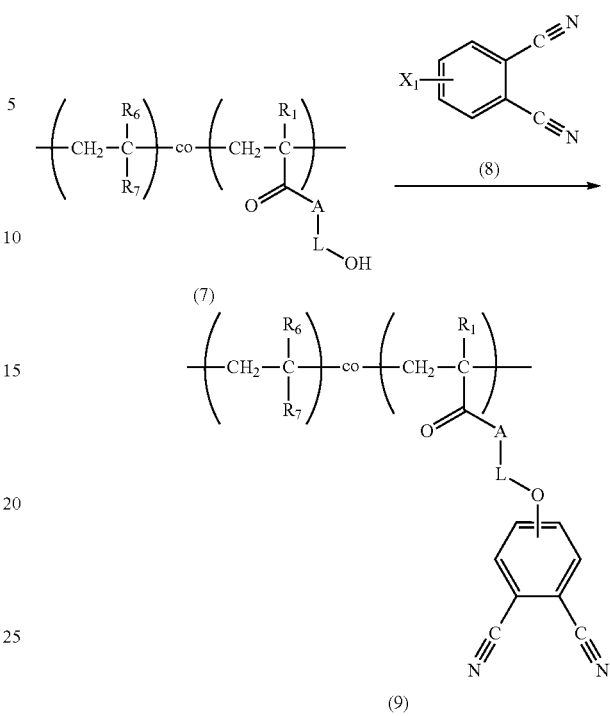

In the above scheme, $R_1$, $R_6$, $R_7$, A, and L in Formulae (7) and (9) represent the same things as $R_1$, $R_6$, $R_7$, A, and L in Formulae (1) to (3) above, respectively; $X_1$ in Formula (8) represents a leaving group; and the symbol "co" means that units that constitute the copolymer are arranged in a random order.

In the scheme of the step (ii), the polymer (7) including a hydroxyl group, which is produced in the step (i) above, is reacted with phthalonitrile (8) including a leaving group in order to synthesize a polymer (9) including phthalonitrile bonded to the backbone part via an ether linkage.

In the step (ii), known Williamson ether synthesis conditions may be employed from the viewpoint of the reactivity of the substrate. Specifically, the hydroxyl group included in the polymer (7) is converted into an alkoxide in the presence of a base in an aprotic polar solvent, and a nucleophilic substitution reaction of the phthalonitrile (8) including a leaving group is conducted. Thus, the polymer (9) including phthalonitrile can be produced.

Specific examples of the aprotic polar solvent that may be used in the step (ii) include acetonitrile, N,N-dimethylformamide, N,N-dimethylacetoamide, dimethylsulfoxide, N-methylpyrrolidone, dioxane, and pyridine.

Specific examples of the base that may be used in the step (ii) include alkali-metal hydroxides such as sodium hydroxide and potassium hydroxide; alkali-metal carbonates such as sodium carbonate, sodium hydrogencarbonate, and potassium carbonate; alkali-metal hydride such as sodium hydride and potassium hydride; and potassium tert-butoxide.

Examples of $X_1$ included in the phthalonitrile (8) that may be used in the step (ii) include halogen atoms such as a chlorine atom, a bromine atom, and an iodine atom, a tosyloxy group (OTs), a mesyloxy group (OMs), a trifluoromethanesulfonate group (OTf), and a nitro group. Since various phthalonitriles including such a leaving group are commercially available, the phthalonitrile (8) including the leaving group may be readily available and readily synthesized by any method known in the related art.

The leaving group $X_1$ included in the phthalonitrile (8) used in the step (ii) may be located at the 3-position or the 4-position. The leaving group $X_1$ may be located at the 4-position from the viewpoint of reactivity with the polymer (7).

The step (ii) is preferably conducted at 0° C. to 200° C. and is more preferably conducted at 40° C. to 120° C. Normally, the reaction terminates within 30 hours.

In the step (ii), the molar equivalent ratio of the base to the hydroxyl groups included in the polymer (7) may be set to 1.0 to 5.0 and the molar equivalent ratio of phthalonitrile (8) to the hydroxyl groups included in the polymer (7) may be set to 1.0 to 2.5 from the viewpoint of reactivity of the substrate.

The step (iii) is described in detail below with reference to an example scheme of the step (iii).

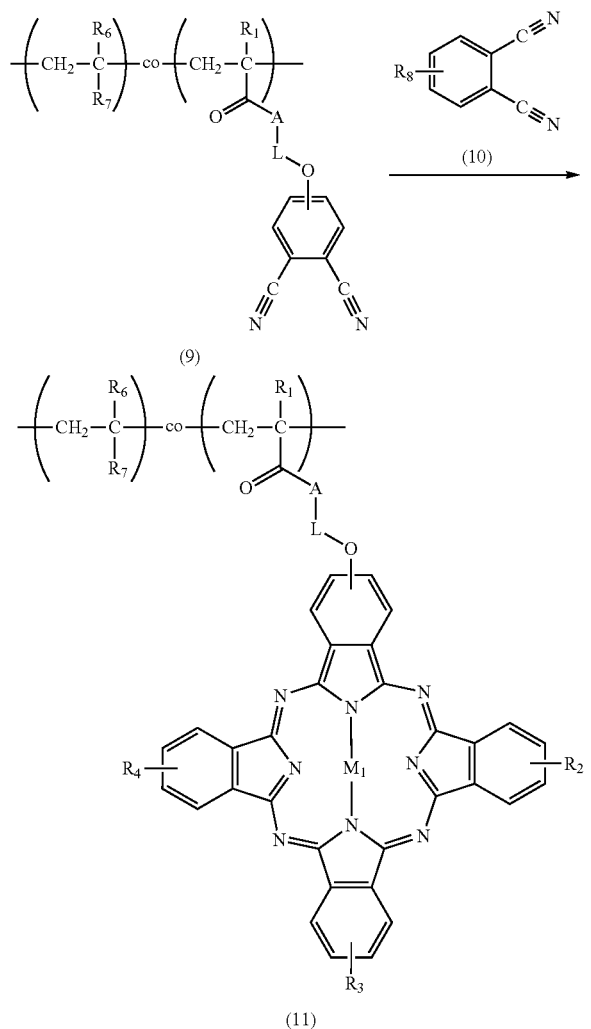

In the above scheme, $R_1$ to $R_4$, $R_6$, $R_7$, A, and L in Formulae (9) and (11) represent the same things as $R_1$ to $R_4$, $R_6$, $R_7$, A, and L in Formulae (1) to (3) above, respectively; $R_8$ in Formula (10) represents the same thing as $R_2$ to $R_4$ in Formulae (1) and (2) above; $M_1$ in Formula (11) represents the same thing as M in Formula (1) above; and the symbol "co" means that units that constitute the copolymer are arranged in a random order.

In the scheme of the step (iii), the polymer (9) including phthalonitrile, which is produced in the step (ii) above, is reacted with phthalonitrile (10) in the presence or absence of a metal salt in order to form a phthalocyanine ring, and thereby a polymer (11) including a phthalocyanine structure according to the embodiment is synthesized.

Specific examples of the solvent that may be used in the step (iii) include N,N-dimethylformamide, N,N-dimethylacetamide, ethanol, 1-propanol, 1-butanol, 1-pentanol, 1-hexanol, dimethylaminoethanol, quinoline, toluene, o-xylene, mixed xylene, and o-dichlorobenzene.

In the step (iii), a catalyst may be added to the reaction system in order to perform the reaction under a relatively mild condition. Examples of the catalyst include 1,8-diazabicyclo [5.4.0]undec-7-ene (DBU) and 1,5-diazabicyclo [4.3.0]non-5-ene (DBN).

In the step (iii), a metal salt is used in order to form $M_1$ in Formula (11). Examples of the metal salt include metal halides such as metal chlorides and metal bromides; and metal acetates.

In the case where the unit represented by Formula (2) above is formed, the above metal salt is not used and the reaction is conducted in the presence of the above catalyst.

The step (iii) is preferably conducted at 60° C. to 200° C. and is more preferably conducted at 100° C. to 165° C. Normally, the reaction terminates within 30 hours.

In the step (iii), the reaction may be conducted using a solvent having a boiling point of 130° C. or more in the presence of the above catalyst at a reflux temperature.

In the step (iii), the molar equivalent ratio of phthalonitrile (10) to phthalonitrile included in the polymer (9) is preferably set to 3.0 to 5.0, and the molar equivalent ratio of the metal salt to phthalonitrile included in the polymer (9) is preferably set to 1.0 to 2.0 in order to preferentially produce the polymer including a phthalocyanine structure according to the embodiment, the phthalocyanine structure being bonded to the backbone part of the polymer at one site.

The polymer including a phthalocyanine structure, which is produced by the above-described production method, and the polymers represented by Formulae (7) and (9) above may be purified by an ordinary method for isolating and purifying organic compounds. Examples of the isolation and purification method include recrystallization and reprecipitation in which an organic solvent is used and column chromatography in which silica gel or polystyrene beads are used. These methods may be used alone or in combination of two or more in order to increase the purity of the polymer.

Identification of the polymer including a phthalocyanine structure and the polymers represented by Formulae (7) and (9) above is performed and the molecular weights of these polymers are measured by size exclusion chromatography (SEC) using "GPC-101" produced by SHOWA DENKO K.K. and a nuclear magnetic resonance spectrometric analysis using "ECA-400" produced by JEOL, Ltd. or "FT-NMR AVANCE-600" produced by Bruker BioSpin K.K.

The polymer (i.e., pigment dispersant) and a pigment composition according to the embodiment are described below.

The polymer according to the embodiment includes the above-described phthalocyanine structure having a high affinity for pigments and the backbone part having a high affinity for water-insoluble solvents. Thus, the polymer according to the embodiment may be suitably used as a pigment dispersant. The polymer according to the embodiment has a particularly high capability of dispersing a phthalocyanine compound, which includes a phthalocyanine structure similarly to the polymer according to the embodiment. Polymers including the phthalocyanine structure may be used alone or in combination of two or more as a pigment dispersant.

The pigment composition according to the embodiment includes the polymer (i.e., pigment dispersant) according to the embodiment and a pigment. The pigment composition may be used as a coating solution, an ink, a toner, and a resin formed product.

Examples of yellow pigments that may be included in the pigment composition according to the embodiment include yellow pigments described in Organic Pigments Handbook, Isao Hashimoto, 2006. Specific examples of the yellow pigments include monoazo pigments, bisazo pigments, polyazo pigments, isoindoline pigments, condensed azo pigments, azomethine pigments, anthraquinone pigments, and quinoxaline pigments. Among the above yellow pigments, in particular, monoazo pigments, bisazo pigments, polyazo pigments, and isoindoline pigments may be used. Specifically, acetoacetanilide pigments such as C.I. Pigment Yellow 74, 83, 93, 128, 155, 175,and 180 and isoindoline pigments such as C.I. Pigment Yellow 139 and 185 are preferably used because they have a high affinity for the polymer including a phthalocyanine structure according to the embodiment. In particular, C.I. Pigment Yellow 155, 180, and 185 are more preferably used because they are capable of being dispersed by using the polymer including a phthalocyanine structure according to the embodiment.

The above yellow pigments may be used alone or in combination of two or more.

Any yellow colorant known in the related art which does not deteriorate pigment dispersibility may be used in combination with the above yellow pigments as a yellow colorant included in the pigment composition according to the embodiment.

Examples of the yellow colorant that may be used in combination with the above yellow pigments include condensed azo compounds, isoindolinone compounds, anthraquinone compounds, azo metal complexes, methine compounds, quinophthalone compounds, and arylamide compounds.

Specific examples of such yellow colorant include C.I. Pigment Yellow 12, 13, 14, 15, 17, 62, 94, 95, 97, 109, 110, 111, 120, 127, 129, 139, 147, 151, 154, 168, 174, 176, 181, 191, 194, 213,and 214; C.I. Vat yellow 1, 3,and 20; Mineral Fast Yellow; Navel Yellow; Naphthol Yellow S; Hansa Yellow G; Permanent Yellow NCG; C.I. Solvent Yellow 9, 17, 24, 31, 35, 58, 93, 100, 102, 103, 105, 112, 162,and 163.

A magenta pigment that may be included in the pigment composition according to the embodiment may be selected from, for example, magenta pigments (e.g., quinacridone pigments, monoazo naphthol pigments, disazo naphthol pigments, perylene pigments, thioindigo pigments, diketopyrrolopyrrole pigments, naphthol AS pigments, and BONA lake pigments) described in Organic Pigments Handbook, Isao Hashimoto, 2006.Among the above magenta pigments, in particular, quinacridone pigments, diketopyrrolopyrrole pigments, naphthol AS pigments, and BONA lake pigments are preferably used.

Specifically, the quinacridone pigment represented by Formula (12), the diketopyrrolopyrrole pigment represented by Formula (13), and the naphthol AS pigment and the BONA lake pigment represented by Formula (14) are more preferably used because they have a high affinity for the polymer including a phthalocyanine structure according to the embodiment.

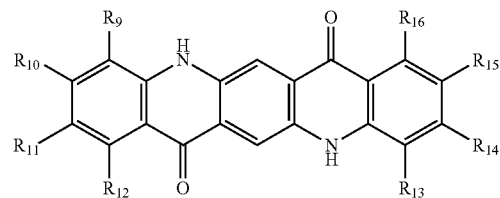

(12)

In Formula (12), $R_9$ to $R_{16}$ each independently represent a hydrogen atom, a chlorine atom, or a methyl group.

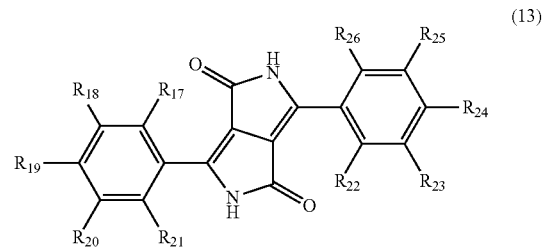

(13)

In Formula (13), $R_{17}$ to $R_{26}$ each independently represent a hydrogen atom, a chlorine atom, a tert-butyl group, a cyano group, or a phenyl group.

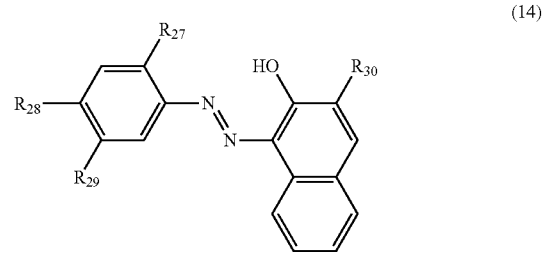

(14)

In Formula (14), $R_{27}$ to $R_{29}$ each independently represent a hydrogen atom, a methoxy group, a methyl group, a nitro group, a chlorine atom, an N,N-diethylaminosulfonyl group, a sulfonic group, a sulfonic acid salt group, or a $CONHR_{31}$ group; and $R_{30}$ represents an amino group, a carboxylic group, a carboxylic acid salt group, or a $CONHR_{32}$ group, where $R_{31}$ and $R_{32}$ each independently represent a hydrogen atom or a phenyl group.

Examples of the quinacridone pigment represented by Formula (12) include C.I. Pigment Red 202, 122, 192,and 209.

In Formula (12), $R_9$, $R_{10}$, $R_{12}$ to $R_{14}$, and $R_{16}$ may be a hydrogen atom and $R_{11}$ and $R_{15}$ may be a hydrogen atom, a chlorine atom, or a methyl group from the viewpoint of affinity for the polymer including a phthalocyanine structure according to the embodiment.

Examples of the diketopyrrolopyrrole pigment represented by Formula (13) include C.I. Pigment Red 255, 254,and 264.

In Formula (13), $R_{17}$, $R_{18}$, $R_{20}$ to $R_{23}$, $R_{25}$, and $R_{26}$ may be a hydrogen atom and $R_{19}$ and $R_{24}$ may be a hydrogen atom or a phenyl group from the viewpoint of affinity for the polymer including a phthalocyanine structure according to the embodiment.

Examples of the naphthol AS pigment represented by Formula (14) include C.I. Pigment Red 2, 3, 5, 6, 7, 23, 150, 146, 184, and 269.

Examples of the BONA lake pigment represented by Formula (14) include C.I. Pigment Red 48:2, 48:3, 48:4, and 57:1.

In Formula (14), at least one selected from $R_{27}$ to $R_{29}$ may be a $CONHR_{31}$ group and $R_{30}$ may be a $CONHR_{32}$ group from the viewpoint of affinity for the polymer including a phthalocyanine structure according to the embodiment. $R_{32}$ may be a hydrogen atom from the viewpoint of affinity for the polymer including a phthalocyanine structure according to the embodiment.

In this embodiment, in particular, quinacridone pigments such as C.I. Pigment Red 122 and 202 and naphthol AS pigments such as C.I. Pigment Red 255, 264, and 150 may be used from the viewpoint of affinity for the polymer including a phthalocyanine structure according to the embodiment.

The above magenta pigments may be used alone or in combination of two or more.

Any magenta colorant known in the related art which does not deteriorate pigment dispersibility may be used in combination with the above magenta pigments as a magenta colorant included in the pigment composition according to the embodiment.

Examples of such magenta colorants include condensed azo compounds, anthraquinone, lake compounds of basic dyes, benzimidazolone compounds, thioindigo compounds, and perylene compounds.

Specific examples of the magenta colorants include C.I. Pigment Red 81:1, 144, 166, 169, 177, 185, 220, 221, and 238.

The phthalocyanine pigment represented by Formula (15) below may be used as a cyan pigment included in the pigment composition according to the embodiment.

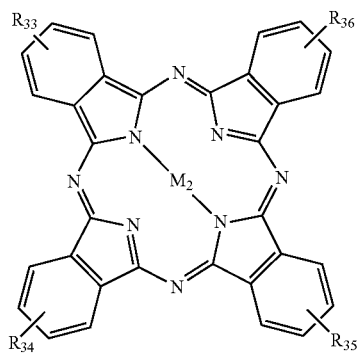

(15)

In Formula (15), $R_{33}$ to $R_{36}$ each independently represent a hydrogen atom, an alkyl group, a sulfonic group, or a sulfonic acid salt group; and $M_2$ represents a metal atom or two hydrogen atoms.

Examples of the phthalocyanine pigment represented by Formula (15) include C.I. Pigment Blue 15, 15:1, 15:2, 15:3, 15:4, 15:5, 15:6, 16, 17, 17:1, 68, 70, 75, 76, and 79.

Among these pigments, in particular, C.I. Pigment Blue 15, 15:1, 15:2, 15:3, 15:4, 15:5, and 15:6 may be used from the viewpoint of affinity for the polymer including a phthalocyanine structure according to the embodiment.

The above cyan pigments may be used alone or in combination of two or more.

Any cyan colorant known in the related art which does not deteriorate pigment dispersibility may be used in combination with the above cyan pigments as a cyan colorant included in the pigment composition according to the embodiment.

Examples of such cyan colorant include C.I. Pigment Blue 1, 1:2, 1:3, 2, 2:1, 2:2, 3, 4, 5, 6, 7, 8, 9, 9:1, 10, 10:1, 11, 12, 13, 14, 18, 19, 20, 21, 22, 23, 24, 24:1, 25, 26, 27, 28, 29, 30, 31, 32, 33, 34, 35, 36, 36:1, 52, 53, 56, 56:1, 57, 58, 59, 60, 61, 61:1, 62, 63, 64, 65, 66, 67, 69, 71, 72, 73, 74, 77, 78, 80, 81, 82, 83, and 84.

Colorants other than cyan colorants may also be used in order to control color tone. For example, the chromatic purity of cyan may be enhanced by using C.I. Pigment Green 7 in combination with C.I. Pigment Blue 15:3.

Carbon black may be used as a black colorant included in the pigment composition according to the embodiment.

Carbon black used in this embodiment may be produced by, for example, a thermal method, an acetylene method, a channel method, a furnace method, or a lamp black method. However, a method for producing carbon black is not limited to the above methods.

The average diameter of primary particles of carbon black that may be used in this embodiment is, but not limited to, preferably 14 to 80 nm and is more preferably 25 to 50 nm from the viewpoint of color tone.

The average diameter of primary particles of carbon black can be measured using an enlarged image of carbon black particles which is taken with a scanning electron microscope.

The DBP absorption of carbon black that may be used in this embodiment is, but not limited to, preferably 30 to 200 mL/100g and is more preferably 40 to 150 mL/100 g. Setting the DBP absorption of carbon black to be within the above range further increases the tinting strength of printed images.

The DBP absorption of carbon black is the amount of dibutyl phthalate (DBP) adsorbed by 100 g of carbon black. The DBP absorption of carbon black can be measured in accordance with JIS K6217.

The pH of carbon black is not limited as long as an improvement of the dispersibility of carbon black which is achieved by using the above-described polymer including a phthalocyanine structure is not limited significantly. The pH of carbon black can be determined by measuring a liquid mixture of the carbon black and distilled water with pH electrodes.

The specific surface area of carbon black is preferably, but not limited to, 300 $m^2/g$ or less and is more preferably 100 $m^2/g$ or less. Setting the specific surface area of carbon black to be within the above range enables the amount of polymer including a phthalocyanine structure to be reduced.

The specific surface area of carbon black is measured in terms of BET specific surface area. The specific surface area of carbon black can be measured in accordance with JIS K4652.

The above carbon black may be used alone, or two or more types of carbon black may be used in combination.

Any black colorant known in the related art which does not deteriorate the dispersibility of carbon black may be used in combination with the above carbon black as a black colorant in this embodiment.

Examples of such a black colorant include C.I. Pigment Black 1, 10, 31; C.I. Natural Black 1, 2, 3, 4, 5, 6; and active carbon.

Magenta colorant, cyan colorant, and yellow colorant known in the related art may be used in combination as a black colorant included in the pigment composition according to the embodiment.

Other than the above-described pigments, pigments which have an affinity for the polymer according to the embodiment may be used in this embodiment. Preferably, cyan pigments or carbon may be used in view of the color tone of the polymer (pigment dispersant) and affinity for the polymer.

The additional pigments may be crude pigments, which are produced from raw materials corresponding to the above pigments and not processed through purification, controlling of crystal shape or particle diameter, and surface treatment. The additional pigments may also be processed pigment compositions that does not significantly deteriorate the advantageous effect of the above-described polymer including a phthalocyanine structure.

The compositional ratio of pigments to the polymer including a phthalocyanine structure on a mass basis in the pigment composition according to the embodiment, that is, [mass of pigments]:[mass of polymer including phthalocyanine structure], is preferably 100:0.1 to 100:100 and is more preferably 100:0.5 to 100:20 from the viewpoint of pigment dispersibility.

The pigment composition may be produced by a wet process or a dry process. Since the polymer including a phthalocyanine structure according to the embodiment has a high affinity for water-insoluble solvents, the pigment composition may be produced by a wet process, which enables a uniform pigment composition to be readily prepared. Specifically, the pigment composition can be prepared in the following manner.

A pigment dispersant and, as needed, resins are mixed in a dispersion medium. While the resulting mixture is stirred, a pigment powder is gradually added to the mixture so as to be immersed in the dispersion medium to a sufficient degree. A mechanical shearing force is applied to the mixture with a dispersing machine such that the pigment dispersant is adsorbed onto the surfaces of the pigment particles in order to disperse the pigment in the dispersion medium consistently in the form of uniform and fine particles. Examples of the dispersing machine include a kneader, a roll mill, a ball mill, a paint shaker, a dissolver, an Attritor, a sand mill, and a high-speed mill.

Additives may be added to the pigment composition according to the embodiment when the pigment composition is prepared. Examples of the additives include surfactants, dispersants, fillers, standardizers, resins, waxes, anti-forming agents, antistatic agents, dust-resistant agents, bulking agents, shading colorants, preservatives, drying retarders, rheology control additives, wetting agents, antioxidants, UV absorbers, and photostabilizers. The above additives may be used in combination of two or more. The pigment dispersant according to the embodiment may be added when a crude pigment is prepared.

A pigment dispersion according to the embodiment is described below.

The pigment dispersion according to the embodiment includes the above-described pigment composition and a water-insoluble solvent that serves as a dispersion medium. The pigment dispersion may be produced by dispersing the pigment composition in a water-insoluble solvent or by dispersing constituents of the pigment composition in a water-insoluble solvent. The pigment dispersion may be prepared by, for example, in the following manner.

A pigment dispersant and resins are mixed in a dispersion medium as needed. While the resulting mixture is stirred, a pigment powder or a pigment-composition powder is gradually added to the mixture so as to be immersed in the dispersion medium to a sufficient degree. A mechanical shearing force is applied to the mixture with a dispersing machine such as a ball mill, a paint shaker, a dissolver, an Attritor, a sand mill, or a high-speed mill in order to disperse the pigment consistently in the form of uniform and fine particles.

The type of water-insoluble solvent used as a dispersion medium included in the pigment dispersion according to the embodiment may be selected depending on the purpose and application of the pigment dispersion and is not limited. Examples of the water-insoluble solvent include esters such as methyl acetate, ethyl acetate, and propyl acetate; hydrocarbons such as hexane, octane, petroleum ethers, cyclohexane, benzene, toluene, and xylene; and halogenated hydrocarbons such as carbon tetrachloride, trichloroethylene, and tetrabromoethane.

The water-insoluble solvent used as a dispersion medium included in the pigment dispersion according to the embodiment may be a polymerizable monomer.

Examples of the polymerizable monomer include styrene, $\alpha$-methylstyrene, $\alpha$-ethylstyrene, o-methylstyrene, m-methylstyrene, p-methylstyrene, p-methoxystyrene, p-phenylstyrene, p-chlorostyrene, 3,4-dichlorostyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, ethylene, propylene, butylene, isobutylene, vinyl chloride, vinylidene chloride, vinyl bromide, vinyl iodide, vinyl acetate, vinyl propionate, vinyl benzoate, methyl methacrylate, ethyl methacrylate, propyl methacrylate, butyl methacrylate, n-octyl methacrylate, dodecyl methacrylate, 2-ethylhexyl methacrylate, stearyl methacrylate, behenyl methacrylate, phenyl methacrylate, dimethylaminoethyl methacrylate, diethylaminoethyl methacrylate, methyl acrylate, ethyl acrylate, n-butyl acrylate, isobutyl acrylate, propyl acrylate, n-octyl acrylate, dodecyl acrylate, 2-ethylhexyl acrylate, stearyl acrylate, behenyl acrylate, 2-chloroethyl acrylate, phenyl acrylate, vinyl methyl ether, vinyl ethyl ether, vinyl isobutyl ether, vinyl methyl ketone, vinyl hexyl ketone, methyl isopropenyl ketone, vinylnaphthalene, acrylonitrile, methacrylonitrile, and acrylamide. In particular, styrene may be used as a water-insoluble solvent from the viewpoint of affinity for the polymer including a phthalocyanine structure according to the embodiment.

The resins that may be mixed in the water-insoluble solvent may be selected depending on the purpose and application of the pigment composition and are not limited. Examples of such resins include a polystyrene resin, a styrene copolymer, a polyacrylic resin, a polymethacrylic resin, a polyacrylic acid ester resin, a polymethacrylic acid ester resin, an acrylic acid ester copolymer, a methacrylic acid ester copolymer, a polyester resin, a polyvinyl ether resin, a polyvinyl alcohol resin, a polyvinyl butyral resin, a polyurethane resin, and a polypeptide resin. The above resins may be used in combination of two or more.

A toner according to the embodiment is described below.

The toner according to the embodiment includes toner particles each including a binder resin and a colorant. The colorant is the above-described pigment composition. This enables high dispersibility of pigments in toner particles to be maintained and makes it possible to produce a toner having a high tinting strength.

Resins commonly used in the related art may be used as a binder resin.

Specific examples of such a resin include a styrene-methacrylic acid ester copolymer, a styrene-acrylic acid ester copolymer, a polyester resin, an epoxy resin, and a styrene-butadiene copolymer.

It is also possible to directly prepare toner particles by polymerizing polymerizable monomers, that is, by a polymerization method.

Examples of the polymerizable monomer include styrene monomers such as styrene, α-methylstyrene, α-ethylstyrene, o-methylstyrene, m-methylstyrene, p-methylstyrene, o-ethylstyrene, m-ethylstyrene, and p-ethylstyrene; methacrylate monomers such as methyl methacrylate, ethyl methacrylate, propyl methacrylate, butyl methacrylate, octyl methacrylate, dodecyl methacrylate, stearyl methacrylate, behenyl methacrylate, 2-ethylhexyl methacrylate, dimethylaminoethyl methacrylate, diethylaminoethyl methacrylate, methacrylonitrile, and methacrylamide; acrylate monomers such as methyl acrylate, ethyl acrylate, propyl acrylate, butyl acrylate, octyl acrylate, dodecyl acrylate, stearyl acrylate, behenyl acrylate, 2-ethylhexyl acrylate, dimethylaminoethyl acrylate, diethylaminoethyl acrylate, acrylonitrile, and acrylamide; and olefin monomers such as butadiene, isoprene, and cyclohexene.

The above polymerizable monomers may be used alone or in combination of two or more by being mixed with one another such that the theoretical glass transition temperature (Tg) of the resulting monomer mixture falls within the range of 40° C. to 75° C. (see, J. Brandrup, E. H. Immergut, Polymer Handbook, Third Edition, John Wiley & Sons, United States, 1989, pp. 209-277). Setting the theoretical glass transition temperature of the monomer mixture to be within the above range further enhances the preservation stability and durable stability of the toner and the vividness of full-color images.

Using a nonpolar resin such as polystyrene in combination with a polar resin such as a polyester resin or a polycarbonate resin as binder resins enables the distributions of additives such as a colorant, a charge-controlling agent, and a wax in the toner particles to be controlled. In the case where toner particles are directly prepared by suspension polymerization, for example, a polar resin may be used in a polymerization reaction conducted between the dispersion step and the polymerization step. The amount of polar resin added is controlled in consideration of the balance between the polarity of the polymerizable monomer composition that constitutes toner particles and the polarity of the aqueous medium used. This enables the concentration of the polar resin to be continuously changed in the direction from the surface of each toner particle to the core thereof by, for example, depositing a thin layer of the polar resin on the surface of the toner particle. Using a polar resin that interacts with the above-described polymer including a phthalocyanine structure, colorants, and charge-controlling agents may improve the condition of colorants in the toner particles.

In this embodiment, a crosslinking agent may be used in the synthesis of the binder resin in order to increase the mechanical strength of toner particles and control the molecular weight of the binder resin.

Bifunctional crosslinking agents and polyfunctional crosslinking agents may be used as a crosslinking agent.

Examples of the bifunctional crosslinking agents include divinylbenzene, bis(4-acryloxy polyethoxyphenyl)propane, ethylene glycol di(meth)acrylate, 1,3-butylene glycol di(meth)acrylate, 1,4-butanediol di(meth)acrylate, 1,5-pentanediol di(meth)acrylate, 1,6-hexanediol di(meth)acrylate, neopentyl glycol di(meth)acrylate, diethylene glycol di(meth)acrylate, triethylene glycol di(meth)acrylate, tetraethylene glycol di(meth)acrylate, di(meth)acrylates of polyethylene glycol #200, #400, and #600, dipropylene glycol di(meth)acrylate, polypropylene glycol di(meth)acrylate, and polyester-type di(meth)acrylate. Note that the term "(meth)acrylate" used herein refers to both "acrylate" and "methacrylate"

Examples of the polyfunctional crosslinking agents include pentaerythritol tri(meth)acrylate, trimethylolethane tri(meth)acrylate, trimethylolpropane tri(meth)acrylate, tetramethylolmethane tetra(meth)acrylate, oligoester (meth)acrylate, 2,2-bis(4-methacryloxyphenyl)propane, diallyl phthalate, triallyl cyanurate, triallyl isocyanurate, and triallyl trimellitate.

The amount of the above crosslinking agent used is preferably 0.05 to 10 parts by mass and is more preferably 0.1 to 5 parts by mass relative to 100 parts by mass of the above polymerizable monomer from the viewpoints of the fixability and offset resistance of the toner.

In this embodiment, a wax may be used in the synthesis of the binder resin in order to prevent toner particles from adhering to a fixing member.

Examples of the wax include petroleum waxes such as a paraffin wax, a microcrystalline wax, and petrolatum; the derivatives of these petroleum waxes; a montan wax and the derivatives thereof; hydrocarbon waxes produced by a Fischer-Tropsch process and the derivatives thereof; polyolefin waxes such as polyethylene and the derivatives thereof; and natural waxes such as a carnauba wax and a candelilla wax and the derivatives thereof. The term "derivatives" used herein refers to an oxide, a block copolymer with a vinyl monomer, and a graft-modified product. Other examples of the wax include alcohols such as higher aliphatic alcohols, aliphatic acids such as stearic acid, and palmitic acid, a fatty acid amide, a fatty acid ester, hydrogenated castor oil, and the derivatives thereof, plant waxes, and animal waxes. The above waxes may be used alone or in combination of two or more.

The amount of wax used is preferably 2.5 to 15.0 parts by mass and is more preferably 3.0 to 10.0 parts by mass relative to 100 parts by mass of the binder resin. Setting the amount of wax to be within the above range further enhances the fixability and chargeability of the toner. Toner particles may further include a charge-controlling agent in order to control the optimum amount of triboelectric charge for a toner developing system.

Any charge-controlling agent known in the related art may be used. In particular, a charge-controlling agent that enables charging to be performed rapidly and a certain amount of charge to be maintained consistently may be used. In the case where toner particles are directly prepared by a polymerization method such as suspension polymerization, a charge-controlling agent that is less likely to inhibit the progress of polymerization and does not substantially contain a constituent soluble in an aqueous medium may be used.

Negatively chargeable charge-controlling agents and positively chargeable charge-controlling agents may be used as a charge-controlling agent.

Examples of the negatively chargeable charge-controlling agents include polymers and copolymers including a sulfonic group, a sulfonic acid salt group, or an alkoxysulfonyl group; salicylic acid derivatives and metal complexes thereof; monoazo metal compounds, metal acetylacetonates; aromatic oxycarboxylic acids, aromatic monocarboxylic acids, aromatic polycarboxylic acids, metal salts thereof, anhydrides thereof, and esters thereof; phenol derivatives such as bisphenols; urea derivatives; metal-containing naphthoic acid compounds; boron compounds; quaternary ammonium salts; calixarenes; and resins.

Examples of the positively chargeable charge-controlling agents include nigrosines; nigrosines modified with a metal salt of fatty acid; guanidine compounds; imidazole compounds; onium salts such as quaternary ammonium salts (e.g., benzyltributylammonium-1-hydroxy-4-naphtosulfonic acid salt and tetrabutylammonium tetrafluoroborate) and phosphonium salts, which are analogs to ammonium salts; lake pigments prepared from these compounds; triphenylmethane pigments and lake pigments prepared from the triphenylmethane pigments (examples of a laking agent include phosphotungstic acid, phosphomolybdic acid, phosphotungsticmolybdic acid, tannic acid, lauric acid, gallic acid, ferricyanides, and ferrocyanides); metal salts of higher fatty acids; diorganotin oxides such as dibutyltin oxide, dioctyltin oxide, and dicyclohexyltin oxide; diorganotin borate such as dibutyltin borate, dioctyltin borate, and dicyclohexyltin borate; and resins.

These charge-controlling agents may be used alone or in combination of two or more.

An inorganic fine powder that serves as a fluidizer may be added to the particles of the toner according to the embodiment. Examples of the inorganic fine powder include powders of silica, titanium oxide, alumina, and double oxides thereof; and powders prepared by surface-treating these powders.

The particles of the toner according to the embodiment may be produced by a common production method such as a pulverization method, a suspension polymerization method, a dissolution suspension method, or an emulsion polymerization method. Among these production methods, in particular, suspension polymerization or dissolution suspension may be employed for preparing toner particles from the viewpoints of the environmental load due to the production of toner particles and the diameter of toner particles.

Toner particles may be produced by suspension polymerization, for example, in the following manner.

A colorant containing the pigment composition according to the embodiment is mixed with a polymerizable monomer, a wax, a polymerization initiator, and the like in order to prepare a polymerizable monomer composition. The polymerizable monomer composition is dispersed in an aqueous medium in order to form particles of the polymerizable monomer composition. Toner particles are prepared by polymerizing the polymerizable monomer included in the particles of the polymerizable monomer composition in the aqueous medium.

The polymerizable monomer composition may be prepared by dispersing the above colorant in a first polymerizable monomer and mixing the resulting dispersion with a second polymerizable monomer. Specifically, the pigment composition is dispersed in the first polymerizable monomer to a sufficient degree and subsequently mixed with the second polymerizable monomer and the other toner components. This may enhance the dispersibility of the pigment in toner particles.

Polymerization initiators known in the related art may be used as a polymerization initiator in the above-described suspension polymerization method. Examples of such polymerization initiators include azo compounds, organic peroxides, inorganic peroxides, organometallic compounds, and photopolymerization initiators. Specific examples thereof include azo polymerization initiators such as 2,2'-azobis(isobutyronitrile), 2,2'-azobis(2-methylbutyronitrile), 2,2'-azobis(4-methoxy-2,4-dimethylvaleronitrile), 2,2'-azobis(2,4-dimethylvaleronitrile), and dimethyl 2,2'-azobis (isobutyrate); organic peroxide polymerization initiators such as benzoyl peroxide, di-t-butyl peroxide, t-butylperoxy isopropyl monocarbonate, t-hexyl peroxybenzoate, and t-butyl peroxybenzoate; inorganic peroxide polymerization initiators such as potassium persulfate and ammonium persulfate; a hydrogen peroxide-ferrous redox system polymerization initiator; a BPO-dimethylaniline polymerization initiator; and a cerium(IV) salt-alcohol redox system polymerization initiator. Examples of the photopolymerization initiators include acetophenons, benzoin ethers, and ketals. These polymerization initiators may be used alone or in combination of two or more.

The amount of polymerization initiator used is preferably 0.1 to 20 parts by mass and is more preferably 0.1 to 10 parts by mass relative to 100 parts by mass of the polymerizable monomer.

The aqueous medium used in the above-described suspension polymerization method may include a dispersion stabilizer. Examples of the dispersion stabilizer include inorganic and organic dispersion stabilizers known in the related art.

Examples of such inorganic dispersion stabilizers include calcium phosphate, magnesium phosphate, aluminium phosphate, zinc phosphate, magnesium carbonate, calcium carbonate, calcium hydroxide, magnesium hydroxide, aluminium hydroxide, calcium metasilicate, calcium sulfate, barium sulfate, bentonite, silica, and alumina.

Examples of such organic dispersion stabilizers include polyvinyl alcohol, gelatin, methylcellulose, methylhydroxypropylcellulose, ethylcellulose, sodium salt of carboxymethylcellulose, and starch.

Nonionic, anionic, and cationic surfactants may also be used as a dispersion stabilizer. Examples of such surfactants include sodium dodecyl sulfate, sodium tetradecyl sulfate, sodium pentadecyl sulfate, sodium octyldecyl sulfate, sodium oleate, sodium laurate, potassium stearate, and calcium oleate.

In this embodiment, among the above dispersion stabilizers, water-insoluble inorganic dispersion stabilizers that are soluble in acids may be used. When a water-insoluble inorganic dispersion stabilizer is used for preparing the aqueous medium, the amount of dispersion stabilizer used may be set to 0.2 to 2.0 parts by mass relative to 100 parts by mass of the polymerizable monomer in this embodiment. Setting the amount of dispersion stabilizer used to be within the above range enhances the stability of the droplets of the polymerizable monomer composition in the aqueous medium. In this embodiment, the 300 to 3,000 parts by mass of water relative to 100 parts by mass of the polymerizable monomer composition may be used for preparing the aqueous medium.

In this embodiment, a commercially available dispersion stabilizer may be directly used in order to prepare an aqueous medium including the water-insoluble inorganic dispersion stabilizer dispersed therein. In such a case, forming the water-insoluble inorganic dispersion stabilizer in water while being stirred at a high speed enables the size of the particles of the dispersion stabilizer to be small and uniform. For example, when calcium phosphate is used as a dispersion stabilizer, a suitable dispersion stabilizer may be prepared by forming fine particles of calcium phosphate by mixing an aqueous sodium phosphate solution with an aqueous calcium chloride solution while performing stirring at a high speed.

The particles of the toner according to the embodiment may also be produced by dissolution suspension. Since the steps for producing toner particles by dissolution suspension do not include a heating step, compatibilization between a resin and a wax which may occur when a low-melting-point was is used may be reduced. Furthermore, a reduction in the glass-transition temperature of the toner due to the compatibilization between a resin and a wax may be limited. Since various types of toner components may be used as a binder resin in dissolution suspension, polyester resins, which are generally considered to be advantageous in terms of fixability, may be readily used as a principal component. Thus, dissolution suspension is a production method that is advantageous in the case where toner particles including a resin component that is not suitably used when suspension polymerization is employed.

Toner particles may be prepared by the dissolution suspension method, for example, in the following manner. A colorant containing the pigment composition according to the embodiment is mixed with a binder resin, a wax, and the like in a solvent in order to prepare a solvent composition. The solvent composition is dispersed in an aqueous medium to form particles of the solvent composition. Thus, a toner-particle suspension is prepared. The toner-particle suspension is heated or subjected to a reduced pressure in order to remove the solvent of the suspension. Thus, toner particles are prepared.

The solvent composition may be prepared by dispersing the above colorant in a first solvent and mixing the resulting dispersion with a second solvent. Specifically, the colorant is dispersed in the first solvent to a sufficient degree and subsequently mixed with the second solvent and the other toner components. This may enhance the dispersibility of the pigment in toner particles.

Examples of the solvent that may be used in the dissolution suspension method include hydrocarbons such as toluene, xylene, and hexane; halogenated hydrocarbons such as methylene chloride, chloroform, dichloroethane, trichloroethane, and carbon tetrachloride; alcohols such as methanol, ethanol, butanol, and isopropyl alcohol; polyalcohols such as ethylene glycol, propylene glycol, diethylene glycol, and triethylene glycol; cellosolves such as methyl cellosolve and ethyl cellosolve; ketones such as acetone, methyl ethyl ketone, and methyl isobutyl ketone; ethers such as benzyl alcohol ethyl ether, benzyl alcohol isopropyl ether, and tetrahydrofuran; and esters such as methyl acetate, ethyl acetate, and butyl acetate. These solvents may be used alone or in combination of two or more. Among these solvents, solvents that have a low melting point and are capable of dissolving the above-described binder resins therein to a sufficient degree may be used from the viewpoint of ease of removing the solvent from the toner particle suspension.

The amount of solvent used is preferably 50 to 5,000 parts by mass and is more preferably 120 to 1,000 parts by mass relative to 100 parts by mass of the binder resin.

The aqueous medium used in the dissolution suspension method may include a dispersion stabilizer. Examples of the dispersion stabilizer include inorganic and organic dispersion stabilizers known in the related art. Examples of such inorganic dispersion stabilizers include calcium phosphate, calcium carbonate, aluminium hydroxide, calcium sulfate, and barium sulfate. Examples of such organic dispersion stabilizers include water-soluble polymers such as polyvinyl alcohol, methylcellulose, hydroxyethylcellulose, ethylcellulose, sodium salt of carboxymethylcellulose, sodium polyacrylate, and sodium polymethacrylate; anionic surfactants such as sodium dodecylbenzenesulfonate, sodium octadecyl sulfate, sodium oleate, sodium laurate, and potassium stearate; cationic surfactants such as laurylamine acetate, stearylamine acetate, and lauryltrimethylammonium chloride; zwitterionic surfactants such as lauryldimethylamine oxide; and nonionic surfactants such as polyoxyethylene alkyl ether, polyethylene alkylphenyl ether, and polyoxyethylene alkylamine.

The amount of dispersion stabilizer used may be 0.01 to 20 parts by mass relative to 100 parts by mass of the binder resin from the viewpoint of the stability of droplets of the solvent composition in an aqueous medium.

The weight-average diameter of toner particles (hereinafter, referred to as "D4") is preferably 3.0 to 15.0 µm and is more preferably 4.0 to 12.0 µm. Setting the weight-average diameter of toner particles to be within the above range may enhance the charge stability of the toner and reduce fogging and scattering of the toner which may occur when a number of images are sequentially developed. Furthermore, the reproducibility of halftone portions may be enhanced, and the unevenness in the surfaces of the images may be reduced.

The ratio (hereinafter, referred to as "D4/D1") of the weight-average diameter D4 of toner particles to the number-average diameter (hereinafter, referred to as "D1") of toner particles is preferably set to 1.35 or less and is more preferably set to 1.30 or less. Setting the ratio D4/D1 to be within the above range may limit the occurrence of fogging and a reduction in transfer efficiency, which makes it easy to form high-resolution images.

The D4 and D1 of toner particles may be controlled by modifying the method for producing the toner particles. For example, in the case where suspension polymerization is employed, the concentration of the dispersion stabilizer used in the preparation of the aqueous medium, the rate and duration of stirring in the reaction, and the like may be changed.

The toner according to the embodiment may be a magnetic toner or a nonmagnetic toner. In the case where the toner according to the embodiment is used as a magnetic toner, toner particles included in the toner may be mixed with a magnetic material. Examples of the magnetic material include iron oxides such as magnetite, maghemite, and ferrite; iron oxides including an oxide of a metal other than iron; metals such as Fe, Co, and Ni; alloys of these metals with a metal such as Al, Co, Cu, Pb, Mg, Ni, Sn, Zn, Sb, Be, Bi, Cd, Ca, Mn, Se, Ti, W, or V; and mixtures of the above magnetic materials. In this embodiment, in particular, powders of triiron tetraoxide and γ-iron sesquioxide may be used as a magnetic material.

The average diameter of particles of the magnetic material is preferably 0.1 to 2 µm and is more preferably 0.1 to 0.3 µm. The magnetic material may have the following magnetic properties when a magnetic field of 795.8 kA/m is applied to the magnetic material from the viewpoint of the developability of the toner: a coercive force of 1.6 to 12 kA/m; a saturation magnetization of 5 to 200 Am/kg (preferably, 50 to 100 A/kg); and a residual magnetization of 2 to 20 Am/kg.

The amount of magnetic material used is preferably 10 to 200 parts by mass and is more preferably 20 to 150 parts by mass relative to 100 parts by mass of the binder resin.

EXAMPLES

The embodiment of the present disclosure is further described in detail below with reference to Examples and Comparative examples. However, the present disclosure is not limited to Examples below. Hereinafter, all "parts" and "%" are on a mass basis unless otherwise specified.

In Examples, the following measurement methods were used.

(1) Measurement of Molecular Weight

The molecular weight of the polymer including a phthalocyanine structure and the molecular weight of the backbone part of the polymer were determined by size exclusion chromatography (SEC) in terms of polystyrene. The measurement of molecular weight by SEC was made in the following manner.

A sample was added to an eluent such that the concentration of the sample was 1.0%, and the resulting solution was left standing for 24 hours at room temperature. The solution was filtered through a solvent-resistant membrane filter having a pore size of 0.2 μm in order to prepare a sample solution. The sample solution was measured under the following conditions:

Apparatus: High speed GPC apparatus "GPC-101" produced by SHOWA DENKO K.K.
Columns: Three columns of "Asahipak GF-1G 7B" (guard columns), "GF-310 HQ", and "GF-510 HQ" produced by SHOWA DENKO K.K.
Eluent: 20 mM LiBr in N,N-dimethylformamide
Flow rate: 0.6 mL/min
Oven temperature: 40° C.
Amount of sample injected: 0.100 mL The molecular weight of the sample was calculated using a molecular weight calibration curve prepared using standard polystyrene resins "TSK standard polystyrene F-850, F-450,F-288,F-128,F-80,F-40,F-20,F-10,F-4,F-2,F-1, A-5000,A-2500,A-1000,and A-500" produced by Tosoh Corporation.

(2) Measurement of Hydroxyl Value

The hydroxyl value of the backbone part was measured by the following method.

The basic operation of the method was based on JIS K-0070-1992.

1) Acetic anhydride (25 g) was charged into a 100-mL measuring flask. Pyridine was added to the flask such that the total amount of the contents of the flask was 100 mL. The contents of the flask were mixed sufficiently by shaking the flask in order to prepare an acetylating reagent.
2) The mass (0.5 to 2.0 g) of the sample was weighed precisely and was added in another flask. Hereinafter, the mass of the sample is referred to as M(g).
3) The acetylating reagent (5 mL) prepared above was added to the flask. Subsequently, the flask was placed in a glycerin bath having a temperature of 95° C. to 100° C. such that the bottom (about 1 cm) of the flask was immersed in the glycerin bath in order to heat the flask. After one hour, the flask was removed from the bath and cooled by radiational cooling. Subsequently, 1 mL of water was added to the flask, and the flask was shaken in order to decompose acetic anhydride. In order to complete the decomposition of acetic anhydride, the flask was again heated in the glycerin bath for 10 minutes. After the flask was cooled by radiational cooling, the wall of the flask was cleaned with 5 ml of ethyl alcohol.
4) Titration was performed using a 0.5-mol/L ethyl alcohol solution of potassium hydroxide (KOH) with phenolphthalein that served as an indicator. A blank test was conducted simultaneously.
5) Hereinafter, the amount of the KOH solution used is referred to as S (mL). The blank value was also measured. Hereinafter, the amount of KOH solution used in the blank test is referred to as B (mL).
6) The hydroxyl value of the sample was calculated using the following expression, where f represents a factor of the KOH solution and A represents the acid value of the sample.

$$\text{Hydroxyl value}[mgKOH/g] = \frac{(B-S) \times f \times 28.05}{M} + A$$

(3) Compositional Analysis

The structure of the polymer including a backbone part and a phthalocyanine structure was determined using the following apparatus.

$^1$H NMR: "ECA-400" produced by JEOL, Ltd. (solvent: deuterated chloroform)
$^{13}$C NMR: "FT-NMR AVANCE II 600" produced by Bruker BioSpin K.K. (solvent: deuterated chloroform)
In the $^{13}$C NMR compositional analysis, quantification was performed by inverse-gated decoupling in which chromium(III) acetylacetonate was used as a relaxation reagent.

Example 1

Polymers including a phthalocyanine structure were prepared in the following manner.

Preparation of Polymer (16)

A polymer (16) including a phthalocyanine structure which is represented by the structural formula below was synthesized in accordance with the scheme described below.

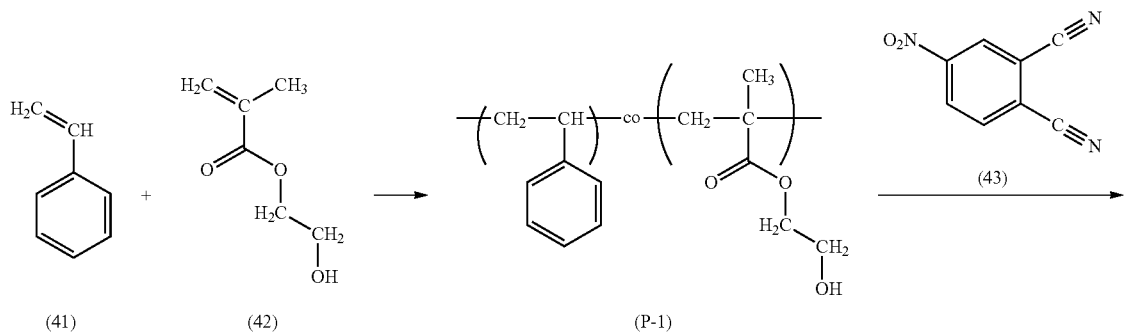

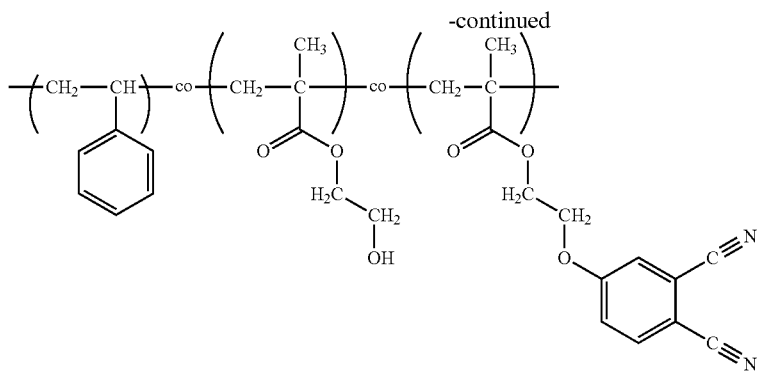
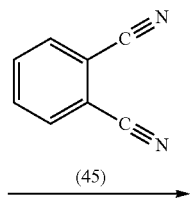

(45)

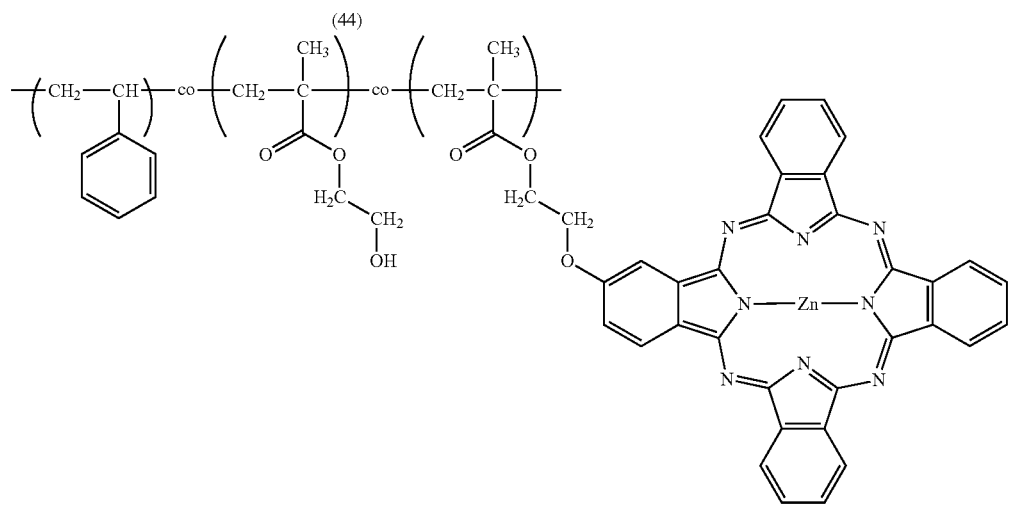

(16)

In the above scheme, the symbol "co" means that units constituting the copolymer are arranged in a random order.

Propylene glycol monomethyl ether (100 parts) was heated while being purged with nitrogen and refluxed at 120° C. or more. To propylene glycol monomethyl ether, a mixture of 51.5 parts of styrene (41), 2.68 parts of 2-hydroxyethyl methacrylate (42), and 1.00 parts of tert-butyl peroxybenzoate (organic peroxide polymerization initiator "Perbutyl Z" produced by NOF CORPORATION) was added dropwise over 3 hours. After the addition of the mixture was completed, the resulting solution was stirred for 3 hours. While the temperature of the solution was increased to 170° C., atmospheric distillation was performed. After the temperature of the solution reached 170° C., distillation was performed under a reduced pressure of 1 hPa for 1 hour in order to remove the solvent. Thus, a resin solid component was formed. The solid component was purified by being dissolved in tetrahydrofuran and reprecipitated in n-hexane. Thus, 53.1 parts of a backbone part (P-1) was prepared. The backbone part (P-1) was analyzed with the above apparatuses. The results of the analysis are summarized below.

Results of Analysis of Backbone Part (P-1)
[1] Results of Measurement of Molecular Weight (GPC):
Weight-average molecular weight (Mw)=21,767
Number-average molecular weight (Mn)=8,422
[2] Results of Measurement of Hydroxyl Value:
24.6 mgKOH/g The molar fractions of units constituting the backbone part (P-1), which were calculated from the results of the measurement of hydroxyl value, were as follows:

Styrene: 96 mol %
2-Hydroxyethyl methacrylate: 4 mol %

In 708 parts of anhydrous N,N-dimethylformamide, 75.0 g of the backbone part (P-1) prepared above was dissolved in a nitrogen atmosphere. To the resulting solution, 13.7 parts of potassium carbonate and 6.39 parts of 4-nitrophthalonitrile (43) were added, and the solution was stirred at 65° C. for 30 hours. The reaction solution was filtered and subsequently charged into a mixture of water and methanol (water:methanol=1:2). The resulting precipitate was cleaned with methanol. Thus, 78.1 parts of a polymer (44) was prepared. The polymer (44) was analyzed with the above-described apparatuses. The results of the analysis are summarized below.

Results of Analysis of Polymer (44)
[1] Results of Measurement of Molecular Weight (GPC):
Weight-average molecular weight (Mw)=22,432
Number-average molecular weight (Mn)=9,185
[2] Results of $^{13}$C NMR (150 MHz, CDCl$_3$, room temperature) (see FIG. 1): δ [ppm]=177.3-174.7 (1.9C, >C=O), 161.5-161.3 (1.0C, phthalonitrile ArC), 146.0-145.0 (37.5C, styrene ArC), 135.2 (1.0C, phthalonitrile ArC), 128.0-127.2 (styrene ArC), 125.6-125.5 (styrene ArC), 119.6-119.3 (2.0C, phthalonitrile ArC), 117.4-117.3 (1.0C, phthalonitrile ArC), 115.5 (1.0C, —C≡N), 115.1 (1.0C, —C≡N), 107.7-107.3 (1.0C, phthalonitrile ArC), 66.5-65.2 (1.9C, —CH$_2$O—Ar), 61.3-60.4 (1.9C, —OCH$_2$—), 46.3-38.8, 21.9-19.6 (1.9C, —CH$_3$)

The reaction percentage of this step, which was calculated from the integral values of carbonyl groups and phthalonitrile on the basis of the results of $^{13}C$ NMR, was 52.6%. The compositional ratio [mol %] between the units constituting the polymer (44), which was calculated from the integral values of styrene, carbonyl groups, and phthalonitrile, was styrene/2-hydroxyethyl methacrylate/phthalonitrile-including monomer=95.2/2.3/2.5.

In 616 parts of o-xylene, 35.0 parts of the polymer (44) prepared above, 3.8 parts of phthalonitrile (45), and 2.5 parts of zinc acetate were dissolved. The resulting solution was heated to 90° C., and 5.2 parts of 1,8-diazabicyclo[5.4.0]undec-7-ene (DBU) was added dropwise to the solution at 90° C. After the addition of DBU was completed, the solution was heated to 140° C. and stirred for 30 hours at 140° C. After the reaction solution was cooled to room temperature and then filtered, the filtrate was vacuum-concentrated, dissolved in 248 parts of N,N-dimethylformamide, and reprecipitated in methanol. The step of dissolving the resulting precipitate in 248 parts of N,N-dimethylformamide and subsequently performing reprecipitation in methanol was repeated three times. Thus, 26.0 parts of the polymer (16) was prepared.

The polymer (16) was analyzed with the above-described apparatuses. The results of the analysis are summarized below.

Results of Analysis of Polymer (16)

[1] Results of Measurement of Molecular Weight (GPC):
Weight-average molecular weight (Mw)=52,006
Number-average molecular weight (Mn)=17,557

Figure 2:
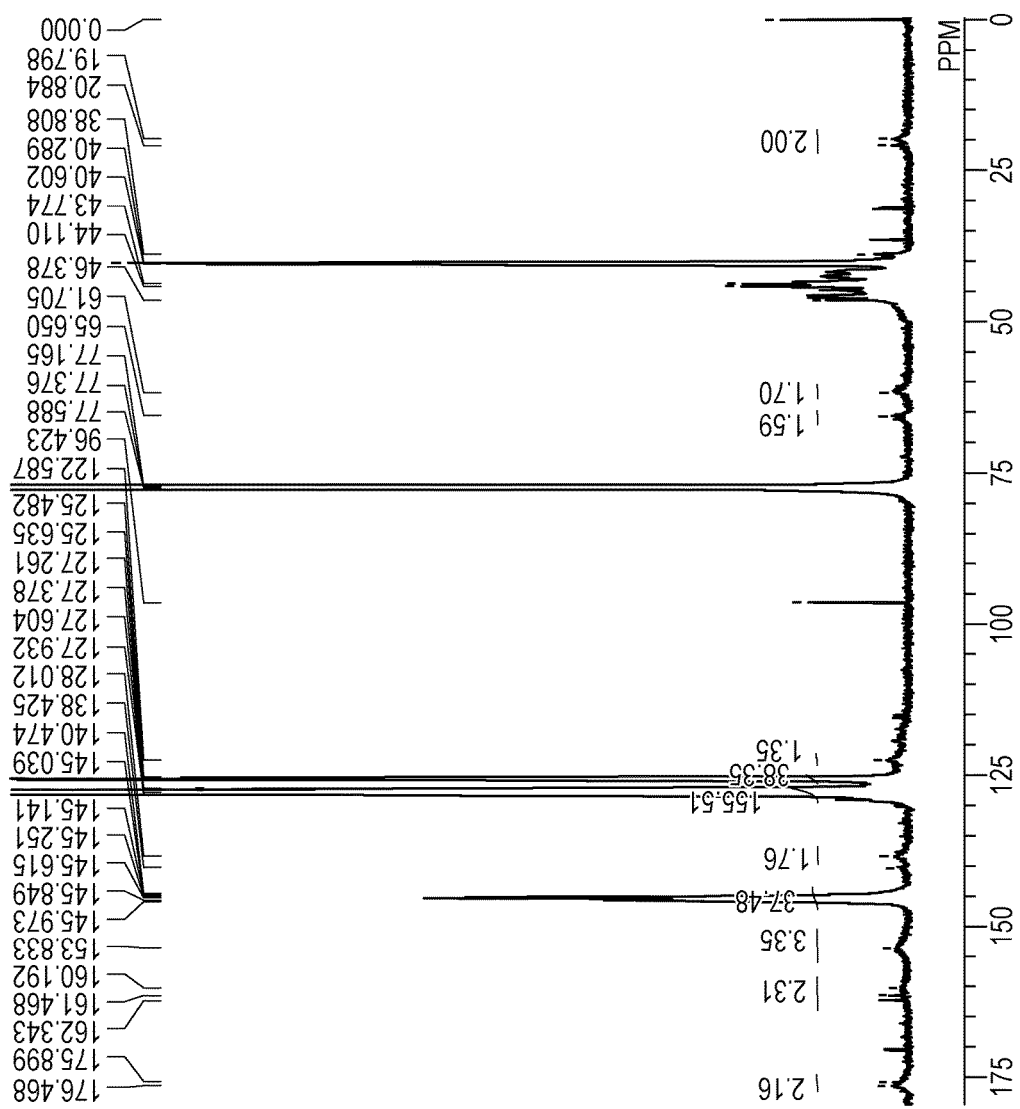
FIG. 2 illustrates a ¹³C NMR spectrum (CDCl₃, room temperature, 150 MHz) of a polymer (16) according to an embodiment of the present disclosure.

[2] Results of $^{13}C$ NMR (150 MHz, CDCl$_3$, room temperature) (see FIG. 2): δ [ppm]=176.5-175.9 (2.2C, >C=O), 162.3-160.2, 153.8, 146.0-145.0 (37.5C, styrene ArC), 140.5, 138.4, 128.0-127.3 (styrene ArC), 125.6-125.5 (styrene ArC), 122.6, 65.7 (1.6C, —CH$_2$O—Ar), 61.7 (1.7C, —OCH$_2$—), 46.4-38.8, 20.9-19.8 (2.0C, —CH$_3$)

The results of $^{13}C$ NMR confirmed that phthalonitrile included in the polymer (44) had been reacted quantitatively to form a phthalocyanine ring, that is, the polymer (16) had been prepared, since the phthalonitrile carbon atoms were absent.

Preparation of Polymer (32)

A polymer (32) including a phthalocyanine structure which is represented by the structural formula below was synthesized in accordance with the scheme described below.

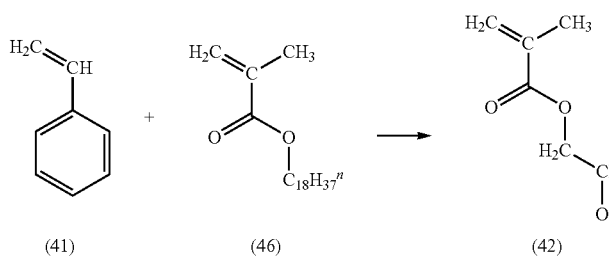

(41)　　(46)　　(42)

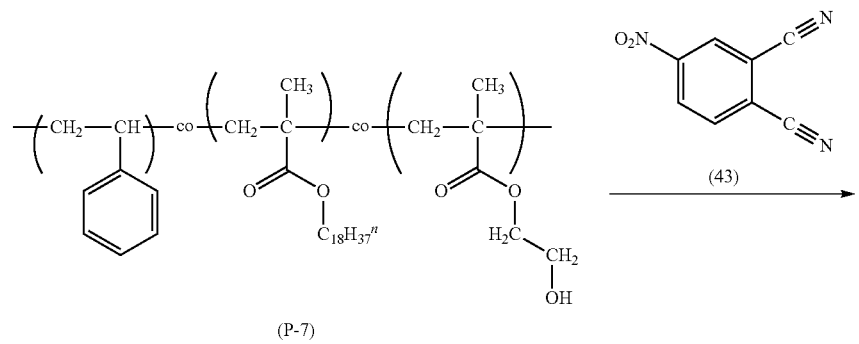

(P-7)

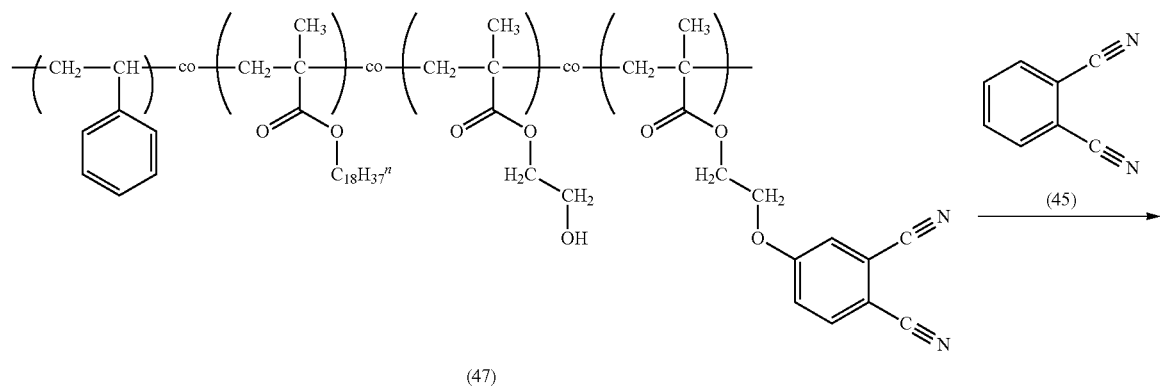

(47)

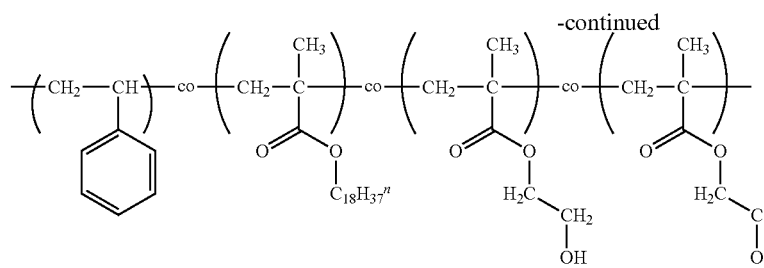
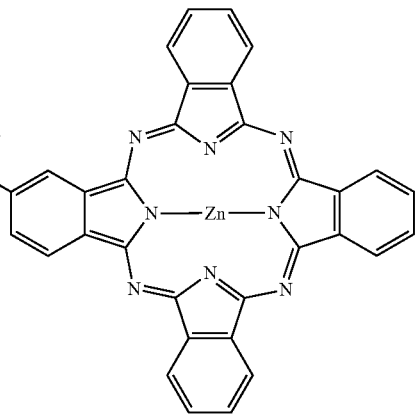

(32)

In the above scheme, the symbol "co" means that units constituting the copolymer are arranged in a random order; and the symbol "n" means that the alkyl group is linear. Propylene glycol monomethyl ether (100 parts) was heated while being purged with nitrogen and refluxed at 120° C. or more. To propylene glycol monomethyl ether, a mixture of 51.5 parts of styrene (41), 11.4 parts of stearyl methacrylate (46), 4.4 parts of 2-hydroxyethyl methacrylate (42), and 1.00 parts of tert-butyl peroxybenzoate (organic peroxide polymerization initiator "Perbutyl Z" produced by NOF CORPORATION) was added dropwise over 3 hours. After the addition of the mixture was completed, the resulting solution was stirred for 3 hours. While the temperature of the solution was increased to 170° C., atmospheric distillation was performed. After the temperature of the solution reached 170° C., distillation was performed under a reduced pressure of 1 hPa for 1 hour in order to remove the solvent. Thus, a resin solid component was formed. The solid component was purified by being dissolved in tetrahydrofuran and reprecipitated in 2-propanol. Thus, 65.3 parts of a backbone part (P-7) was prepared. The backbone part (P-7) was analyzed with the above apparatuses. The results of the analysis are summarized below.

Results of Analysis of Backbone Part (P-7)
[1] Results of Measurement of Molecular Weight (GPC):
Weight-average molecular weight (Mw)=19,185
Number-average molecular weight (Mn)=6,620
[2] Results of Measurement of Hydroxyl Value:
33.3 mgKOH/g In 708 parts of anhydrous N,N-dimethylformamide, 75.0 g of the backbone part (P-7) prepared above was dissolved in a nitrogen atmosphere. To the resulting mixture, 18.5 parts of potassium carbonate and 8.65 parts of 4-nitrophthalonitrile (43) were added, and the mixture was stirred at 65° C. for 16 hours. The reaction solution was filtered and subsequently charged into a mixture of water and methanol (1:2). The resulting precipitate was cleaned with methanol. Thus, 73.3 parts of a polymer (47) was prepared. The polymer (47) was analyzed with the above-described apparatuses. The results of the analysis are summarized below.

Results of Analysis of Polymer (47)
[1] Results of Measurement of Molecular Weight (GPC):
Weight-average molecular weight (Mw)=20,200
Number-average molecular weight (Mn)=8,491

Figure 3:
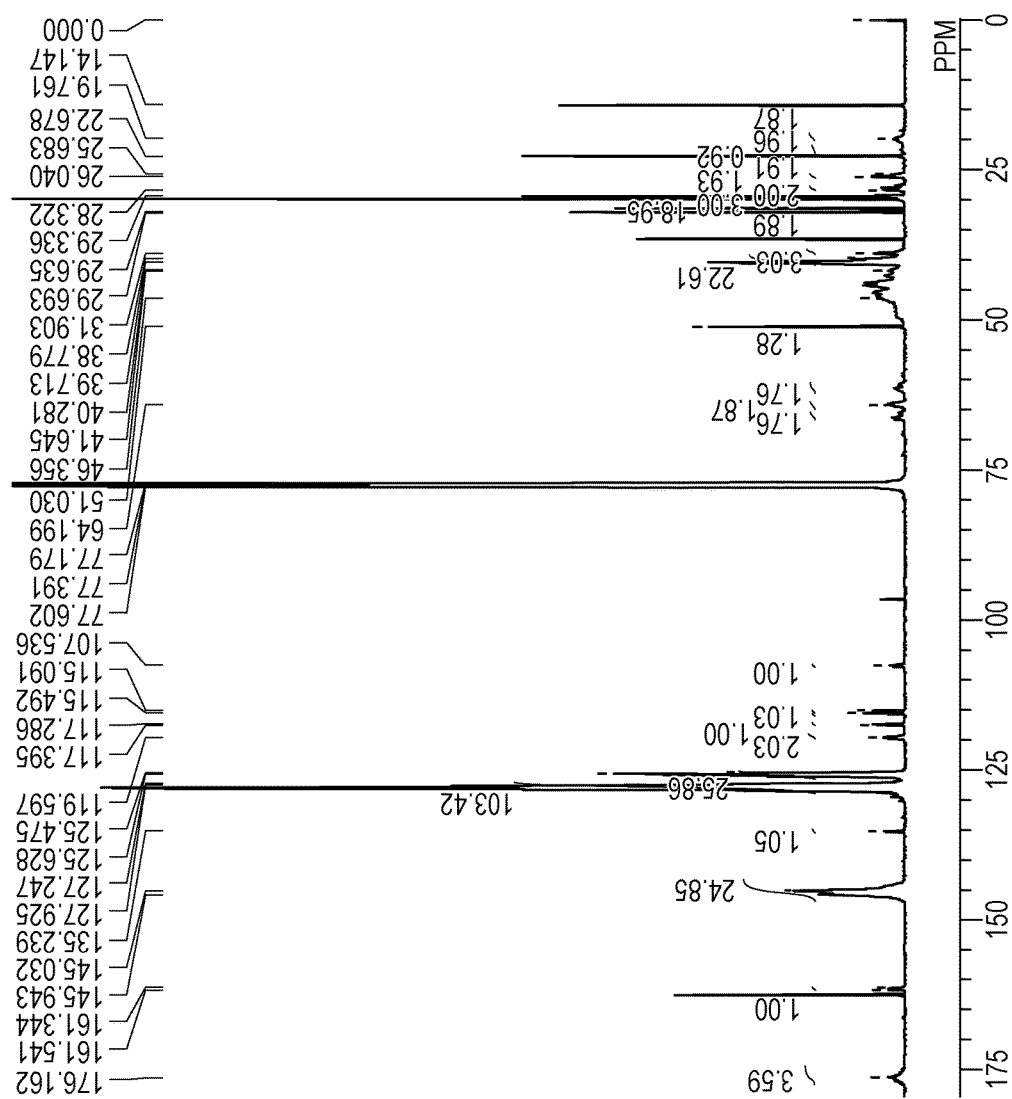
FIG. 3 illustrates a ¹³C NMR spectrum (CDCl₃, room temperature, 150 MHz) of a polymer (47) according to an embodiment of the present disclosure.

[2] Results of $^{13}C$ NMR (150 MHz, $CDCl_3$, room temperature) (see FIG. 3): δ [ppm]=177.3-174.8 (3.6C, >C=O), 161.5-161.3 (1.0C, phthalonitrile ArC), 145.9-145.0 (24.9C, styrene ArC), 135.2 (1.0C, phthalonitrile ArC), 127.9-127.2 (styrene ArC), 125.6-125.5 (styrene ArC), 119.6-119.5 (2.0C, phthalonitrile ArC), 117.4-117.3 (1.0C, phthalonitrile ArC), 115.5 (1.0C, —CN), 115.1 (1.0C, —C≡N), 107.5-107.3 (1.00, phthalonitrile ArC), 66.5-65.2 (1.8C, —$CH_2$O—Ar), 64.2-63.7 (1.9C, —$OCH_2$—), 61.4-60.3 (1.8C, —$OCH_2$—), 51.0, 49.5-41.6, 40.3-39.7, 38.8, 31.9 (1.9C, —$CH_2$—), 29.7-29.6 (19.0C, —$CH_2$—), 29.3 (3.8C, —$CH_2$—), 28.3-27.6 (1.9C, —$CH_2$—), 26.0-25.7 (1.9C, —$CH_2$—), 22.7 (1.9C, —$CH_2$—), 21.9-19.8 (—$CH_3$), 14.1 (1.9C, —$CH_3$)

The reaction percentage of this step, which was calculated from the integral values of carbonyl groups, phthalonitrile, and the terminal methyl groups of stearyl methacrylate on the basis of the results of $^{13}C$ NMR, was 58.8%. The compositional ratio [mol %] between the units constituting the polymer (47) was styrene/stearyl methacrylate/2-hydroxyethyl methacrylate/phthalonitrile-including monomer=87.4/6.7/2.5/3.5.

In 88 parts of o-xylene, 10.0 parts of the polymer (47) prepared above, 1.3 parts of phthalonitrile (45), and 0.5 parts of zinc acetate were dissolved. The resulting solution was heated to 90° C., and 1.7 parts of 1,8-diazabicyclo[5.4.0]undec-7-ene (DBU) was added dropwise to the solution at 90° C. After the addition of DBU was completed, the solution was heated to 140° C. and stirred for 30 hours at 140° C. After the reaction solution was cooled to room temperature and then filtered, the filtrate was vacuum-concentrated, dissolved in 94.4 parts of N,N-dimethylformamide, and reprecipitated in methanol. The step of dissolving the resulting precipitate in 94.4 parts of N,N-dimethylformamide and subsequently performing reprecipitation in methanol was repeated four times. Thus, 10.1 parts of the polymer (32) was prepared.

The polymer (32) was analyzed with the above-described apparatuses. The results of the analysis are summarized below.

Results of Analysis of Polymer (32)

[1] Results of Measurement of Molecular Weight (GPC):
Weight-average molecular weight (Mw)=79,040
Number-average molecular weight (Mn)=19,153

Figure 4:
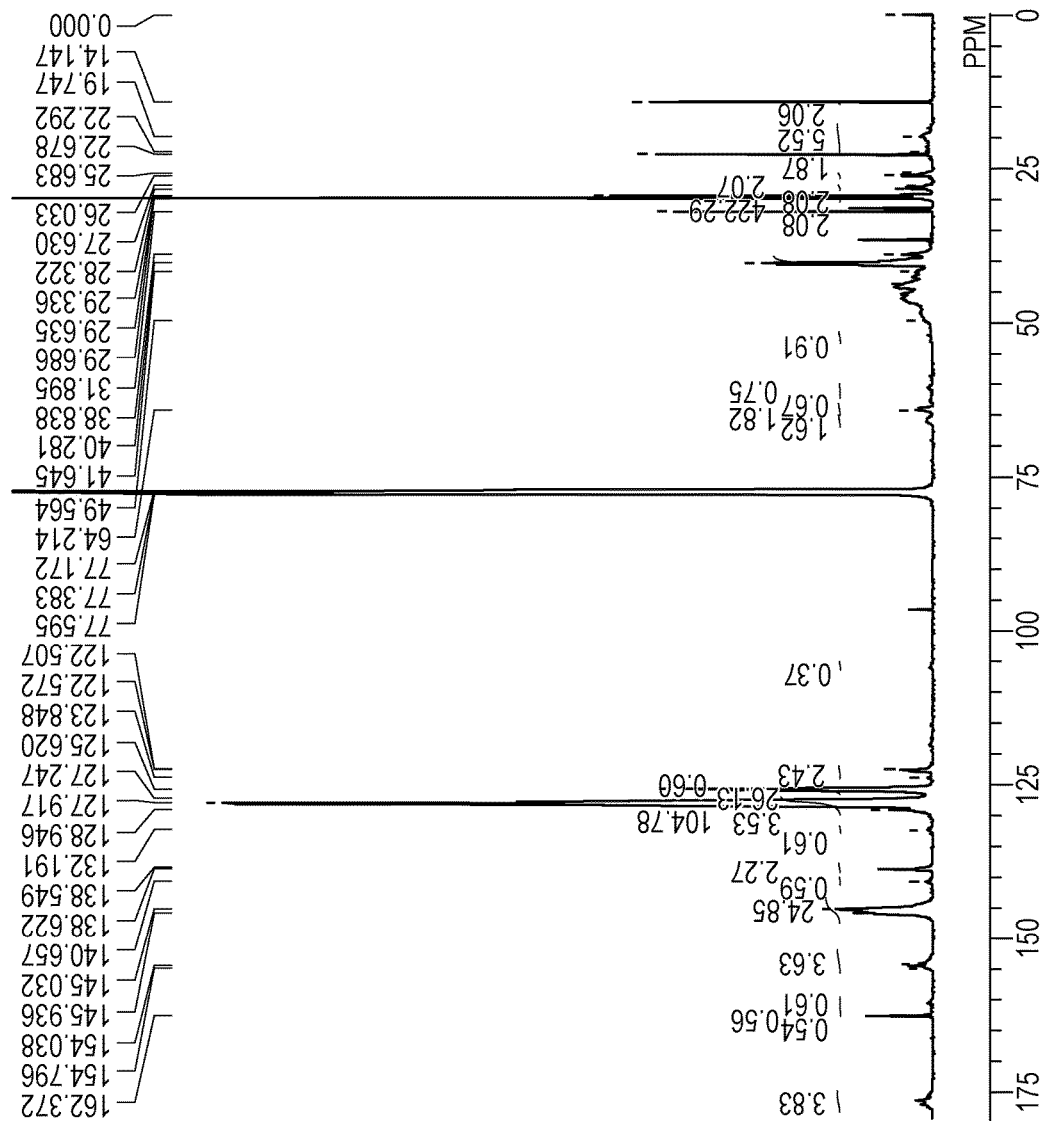
FIG. 4 illustrates a ¹³C NMR spectrum (CDCl₃, room temperature, 150 MHz) of a polymer (32) according to an embodiment of the present disclosure.

[2] Results of $^{13}$C NMR (150 MHz, CDCl$_3$, room temperature) (see FIG. 4): δ [ppm]=177.3-175.3 (3.8C, >C=O), 162.4-160.4, 154.8-154.0, 145.9-145.0 (24.9C, styrene ArC), 140.7, 138.6-138.5, 132.2, 128.9, 127.9-127.2 (styrene ArC), 125.6 (styrene ArC), 123.8, 122.6-122.5, 105.8, 66.3-65.2 (1.6C, —CH$_2$O—Ar), 64.2-63.7 (1.8C, —OCH$_2$—), 62.7-60.2 (1.4C, —OCH$_2$—), 53.0-52.1, 49.6-41.6, 40.3, 38.8, 31.9 (2.1C, —CH$_2$—), 29.7-29.6 (21.3C, —CH$_2$—), 29.3 (4.3C, —CH$_2$—), 28.3-27.6 (2.5C, —CH$_2$—), 26.0-25.7 (2.1C, —CH$_2$—), 22.7 (1.9C, —CH$_2$—), 22.3-19.7 (—CH$_3$), 14.1 (2.1C, —CH$_3$)

The results of $^{13}$C NMR confirmed that phthalonitrile included in the polymer (47) had been reacted quantitatively to form a phthalocyanine ring, that is, the polymer (32) had been prepared, since the phthalonitrile carbon atoms were absent.

Preparation of Other Polymers

Polymers (17) to (31) and (33) to (40) including a phthalocyanine structure, which are described in Table 2, were prepared as in Preparation of Polymer (16) and Preparation of Polymer (32), except that the raw materials of the polymers were changed.

Table 1 summarizes the structures of the backbone parts. Table 2 summarizes the structures of the polymers including a phthalocyanine structure.

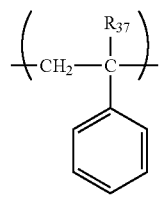

MN-1

In Formula MN-1, $R_{37}$ represents a hydrogen atom or an alkyl group.

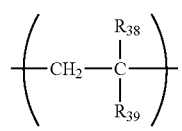

MN-2

In Formula MN-2, $R_{38}$ represents a hydrogen atom or an alkyl group; and $R_{39}$ represents a carboxylic acid ester group or a carboxylic acid amide group.

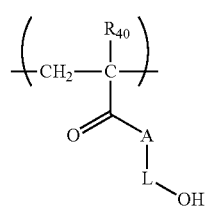

MN-3

In Formula MN-3, $R_{40}$ represents a hydrogen atom or an alkyl group; A represents an O atom or an NH group; and L represents an alkylene group.

TABLE 1

| Backbone part | MN-1 [mol %] | MN-2 [mol %] | MN-3 [mol %] | $R_{37}$ | $R_{38}$ | $R_{39}$ | $R_{40}$ | A | L |
|---|---|---|---|---|---|---|---|---|---|
| P-1 | 96 | 0 | 4 | H | — | — | CH$_3$ | O | C$_2$H$_5$ |
| P-2 | 98 | 0 | 2 | H | — | — | CH$_3$ | O | C$_2$H$_5$ |
| P-3 | 96 | 0 | 4 | H | — | — | H | O | C$_4$H$_8$ |
| P-4 | 96 | 0 | 4 | H | — | — | H | O | *—CH(CH$_3$)CH$_2$—** |
| P-5 | 96 | 0 | 4 | H | — | — | CH$_3$ | O | *—H$_2$C—⟨cyclohexyl⟩—CH$_2$—** |
| P-6 | 96 | 0 | 4 | H | — | — | H | N | C$_2$H$_5$ |
| P-7 | 88 | 6 | 6 | H | CH$_3$ | COOC$_{18}$H$_{37}$(n) | CH$_3$ | O | C$_2$H$_5$ |
| P-8 | 89 | 6 | 5 | H | CH$_3$ | COOC$_{18}$H$_{37}$(n) | CH$_3$ | O | C$_2$H$_5$ |
| P-9 | 90 | 6 | 4 | H | CH$_3$ | COOC$_{18}$H$_{37}$(n) | CH$_3$ | O | C$_2$H$_5$ |
| P-10 | 86 | 8 | 6 | H | CH$_3$ | COOC$_{18}$H$_{37}$(n) | CH$_3$ | O | C$_2$H$_5$ |
| P-11 | 88 | 6 | 6 | H | H | COOC$_{22}$H$_{45}$(n) | CH$_3$ | O | C$_2$H$_5$ |
| P-12 | 90 | 6 | 4 | H | H | COOC$_4$H$_9$(n) | CH$_3$ | O | C$_2$H$_5$ |
| P-13 | 90 | 6 | 4 | H | H | COOCH$_2$CH(C$_2$H$_5$)C$_4$H$_9$ | CH$_3$ | O | C$_2$H$_5$ |
| P-14 | 90 | 6 | 4 | H | H | CONH$_2$ | CH$_3$ | O | C$_2$H$_5$ |
| P-15 | 0 | 96 | 4 | — | H | COOC$_{18}$H$_{37}$(n) | CH$_3$ | O | C$_2$H$_5$ |

In Table 1, MN-1, MN-2, and MN-3 represent the following units;
the symbol "(n)" means that the alkyl group is linear;
the symbol "*" represents a site bonded to A;
and the symbol "**" represents a site bonded to an OH group.

TABLE 2

| Polymer | Backbone part | Bond site | $R_1$ | $R_2$ | $R_3$ | $R_4$ | A | L | M |
|---|---|---|---|---|---|---|---|---|---|
| 16 | P-1 | 4 | $CH_3$ | H | H | H | O | $C_2H_4$ | Zn |
| 17 | P-1 | 3 | $CH_3$ | H | H | H | O | $C_2H_4$ | Zn |
| 18 | P-1 | 4 | $CH_3$ | $CH_3(4)$ | $CH_3(4)$ | $CH_3(4)$ | O | $C_2H_4$ | Zn |
| 19 | P-1 | 4 | $CH_3$ | t-Bu(4) | t-Bu(4) | t-Bu(4) | O | $C_2H_4$ | Zn |
| 20 | P-1 | 4 | $CH_3$ | H | H | H | O | $C_2H_4$ | 2H |
| 21 | P-1 | 4 | $CH_3$ | H | H | H | O | $C_2H_4$ | Cu |
| 22 | P-1 | 4 | $CH_3$ | H | H | H | O | $C_2H_4$ | Ni |
| 23 | P-1 | 4 | $CH_3$ | H | H | H | O | $C_2H_4$ | Co |
| 24 | P-1 | 4 | $CH_3$ | H | H | H | O | $C_2H_4$ | Fe |
| 25 | P-1 | 4 | $CH_3$ | H | H | H | O | $C_2H_4$ | AlOH |
| 26 | P-1 | 4 | $CH_3$ | H | H | H | O | $C_2H_4$ | $SiCl_2$ |
| 27 | P-2 | 4 | $CH_3$ | H | H | H | O | $C_2H_5$ | Zn |
| 28 | P-3 | 4 | $CH_3$ | H | H | H | O | $C_4H_8$ | Zn |
| 29 | P-4 | 4 | $CH_3$ | H | H | H | O | *—CH($CH_3$)$CH_2$—** | Zn |
| 30 | P-5 | 4 | $CH_3$ | H | H | H | O | 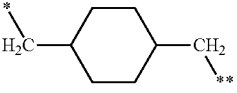 | Zn |
| 31 | P-6 | 4 | H | H | H | H | N | $C_2H_5$ | Zn |
| 32 | P-7 | 4 | $CH_3$ | H | H | H | O | $C_2H_5$ | Zn |
| 33 | P-8 | 4 | $CH_3$ | H | H | H | O | $C_2H_5$ | Zn |
| 34 | P-9 | 4 | $CH_3$ | H | H | H | O | $C_2H_5$ | Zn |
| 35 | P-10 | 4 | $CH_3$ | H | H | H | O | $C_2H_5$ | Zn |
| 36 | P-11 | 4 | $CH_3$ | H | H | H | O | $C_2H_5$ | Zn |
| 37 | P-12 | 4 | $CH_3$ | H | H | H | O | $C_2H_5$ | Zn |
| 38 | P-13 | 4 | $CH_3$ | H | H | H | O | $C_2H_5$ | Zn |
| 39 | P-14 | 4 | $CH_3$ | H | H | H | O | $C_2H_5$ | Zn |
| 40 | P-15 | 4 | $CH_3$ | H | H | H | O | $C_2H_5$ | Zn |

In Table 2, "Bond site" refers to a substitution site in Formula (1), and the parenthesized numbers in "$R_2$" to "$R_4$" also refer to substitution sites in Formula (1);
the symbol "t-Bu" refers to a tert-butyl group;
the symbol "2H" in "M" means that a metal was not included, that is, the polymer included the unit represented by Formula (2);
the symbol "*" represents a site bonded to A;
and the symbol "**" represents a site bonded to the phthalocyanine structure via an oxygen atom.

Comparative Example 1

Preparation of Comparative Polymer (48)

The comparative polymer (48) below was synthesized as in "Synthesis of Azo Compound 3" described in Japanese Patent Laid-Open No. 2012-067285.

Preparation of Comparative Polymer (49)

The comparative polymer (49) below, which included the same phthalocyanine structure as those of the compounds (Pc1) and (Pc2) described in Laibing Wang et al, Polym. Chem. 2014, vol. 5, issue 8, pp. 2872-2879, The Royal Society of Chemistry, United Kingdom, was synthesized as in Preparation of Polymer (16) above, except that the phthalonitrile (45) was changed to 4-(octyloxy)phthalonitrile.

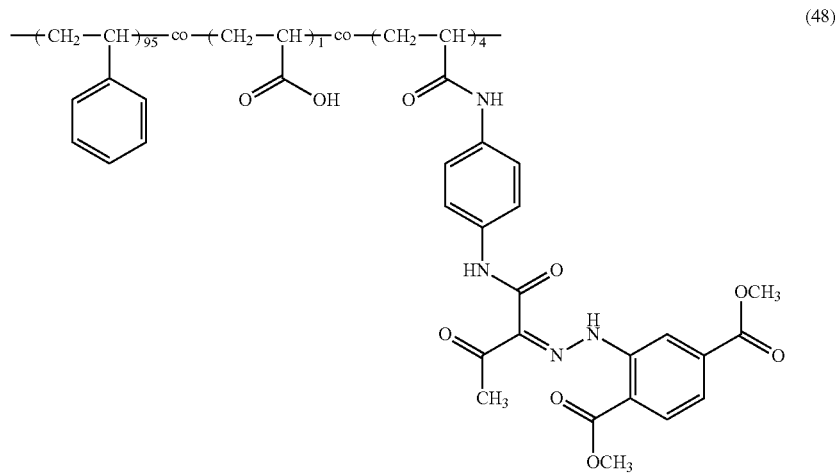

(48)

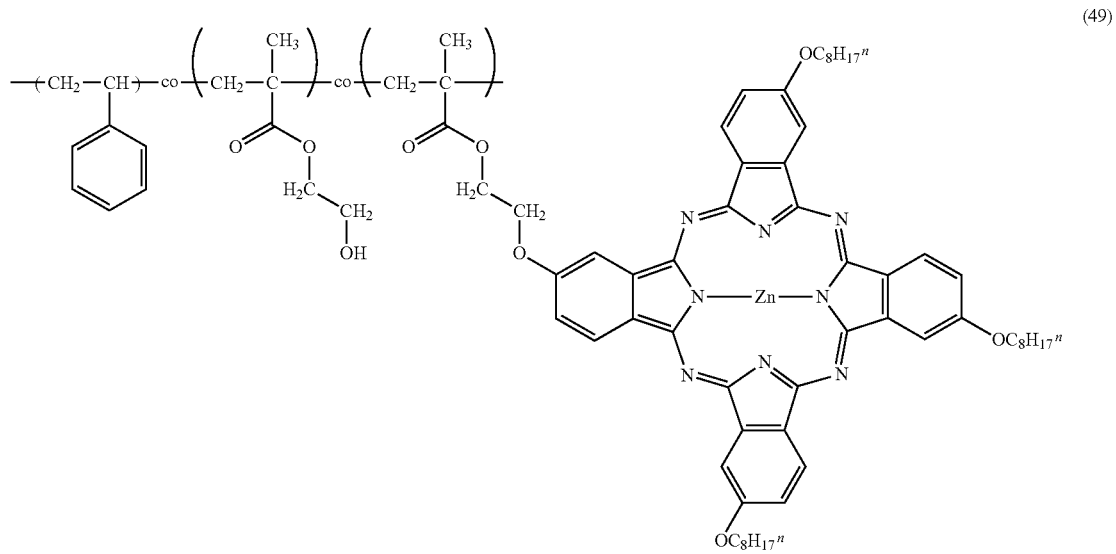

(49)

In Formula (49), "n" means that the alkyl group is linear.

Example 2-1

Yellow pigment dispersions were prepared in the following manner.

Preparation of Yellow Pigment Dispersions 1

With 1.80 parts of the polymer (16) including a phthalocyanine structure, 180 parts of styrene that served as a water-insoluble solvent, and 130 parts of glass beads (diameter: 1 mm), 18.0 parts of C.I. Pigment Yellow 155 (hereinafter, referred to as "yellow pigment a") represented by Formula (Pig-A) below was mixed. The resulting mixture was dispersed using an Attritor produced by Nippon Coke & Engineering Co., Ltd. for 3 hours and then filtered through a mesh. Thus, a yellow pigment dispersion (Dis-Y1) was prepared.

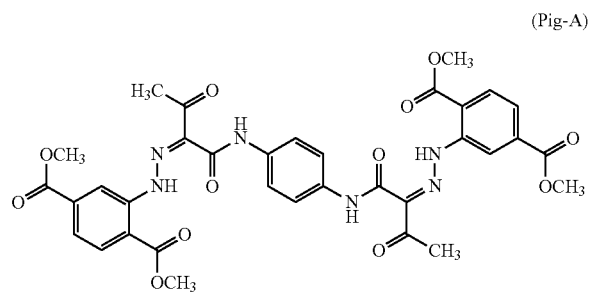 [SMILES: COC(=O)c1ccc(C(=O)OC)c(N/N=C(/C(C)=O)C(=O)Nc2ccc(NC(=O)/C(=N\Nc3cc(C(=O)OC)ccc3C(=O)OC)C(C)=O)cc2)c1]

(Pig-A)

Preparation of Yellow Pigment Dispersions 2

Yellow pigment dispersions (Dis-Y2) to (Dis-Y25) were prepared as in Preparation of Yellow Pigment Dispersions 1 above, except that the polymer (16) including a phthalocyanine structure was changed to the polymers (17) to (40) including a phthalocyanine structure, respectively.

Preparation of Yellow Pigment Dispersions 3

Yellow pigment dispersions (Dis-Y26) and (Dis-Y27) were prepared as in Preparation of Yellow Pigment Dispersions 1 above, except that C.I. Pigment Yellow 155 (yellow pigment a) represented by Formula (Pig-A) above was changed to C.I. Pigment Yellow 180 (hereinafter, referred to as "yellow pigment b") represented by Formula (Pig-B) below and C.I. Pigment Yellow 185 (hereinafter, referred to as "yellow pigment c") represented by Formula (Pig-C) below, respectively.

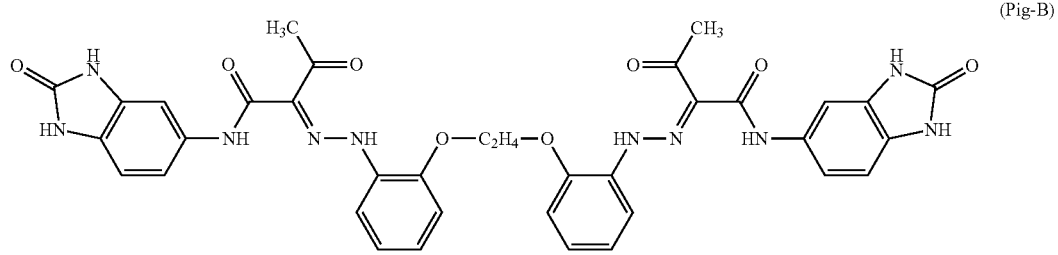

(Pig-B)

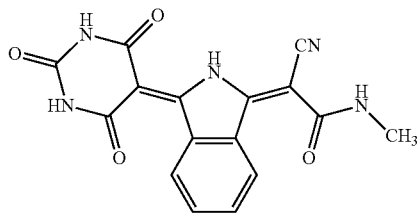
(Pig-C)

Preparation of Yellow Pigment Dispersions 4

A pigment composition was prepared by mixing 42.0 parts of C.I. Pigment Yellow 155 (yellow pigment a) represented by Formula (Pig-A) above with 4.2 parts of the polymer (16) including a phthalocyanine structure, which served as a pigment dispersant, by dry blending using a hybridization system "NHS-0" produced by Nara Machinery Co., Ltd. The pigment composition (19.8 parts) was mixed with 180 parts of styrene and 130 parts of glass beads (diameter: 1 mm). The resulting mixture was dispersed for 1 hour with a paint shaker produced by Toyo Seiki Seisakusho, Ltd. and then filtered through a mesh. Thus, a yellow pigment dispersion (Dis-Y28) was prepared.

Comparative Example 2-1

Reference yellow pigment dispersions, which were used as a reference for evaluations, and comparative yellow pigment dispersions were prepared in the following manner.
Preparation of Reference Yellow Pigment Dispersions 1

A reference yellow pigment dispersion (Dis-Y29) was prepared as in Preparation of Yellow Pigment Dispersions 1,except that the polymer (16) including a phthalocyanine structure was not used.
Preparation of Reference Yellow Pigment Dispersions 2

Reference yellow pigment dispersions (Dis-Y30) and (Dis-Y31) were prepared as in Preparation of Yellow Pigment Dispersions 3,except that the polymer (16) including a phthalocyanine structure was not used.
Preparation of Reference Yellow Pigment Dispersions 3

A reference yellow pigment dispersion (Dis-Y32) was prepared as in Preparation of Yellow Pigment Dispersions 4,except that the polymer (16) including a phthalocyanine structure was not used.
Preparation of Comparative Yellow Pigment Dispersions 1

Comparative yellow pigment dispersions (Dis-Y33) to (Dis-Y36) were prepared as in Preparation of Yellow Pigment Dispersions 1,except that the polymer (16) including a phthalocyanine structure was changed to the comparative polymer (48) described above (hereinafter, referred to as "comparative compound 1"), the comparative polymer (49) described above (hereinafter, referred to as "comparative compound 2"), the methyl methacrylate-sodium styrenesulfonate copolymer described in Japanese Patent Laid-Open No. 03-113462 (hereinafter, referred to as "comparative compound 3"), and the styrene-butyl acrylate [copolymerization ratio (mass ratio)=95/5] block copolymer (Mw=9,718) described in Japanese Patent Laid-Open No. 06-148927 (hereinafter, referred to as "comparative compound 4"), respectively.

Example 2-2

Magenta pigment dispersions were prepared in the following manner.

Preparation of Magenta Pigment Dispersions 1

With 1.80 parts of the above-described polymer (16) including a phthalocyanine structure, 180 parts of styrene that served as a water-insoluble solvent, and 130 parts of glass beads (diameter: 1 mm), 18.0 parts of C.I. Pigment Red 122 (hereinafter, referred to as "magenta pigment a") represented by Formula (Pig-D) below was mixed. The resulting mixture was dispersed using an Attritor produced by Nippon Coke & Engineering Co., Ltd. for 3 hours and then filtered through a mesh. Thus, a magenta pigment dispersion (Dis-M1) was prepared.

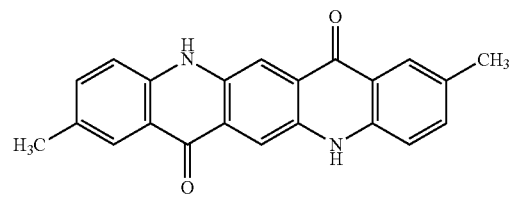
(Pig-D)

Preparation of Magenta Pigment Dispersions 2

Magenta pigment dispersions (Dis-M2) to (Dis-M25) were prepared as in Preparation of Magenta Pigment Dispersions 1 above, except that the polymer (16) including a phthalocyanine structure was changed to the polymers (17) to (40) including a phthalocyanine structure, respectively.
Preparation of Magenta Pigment Dispersions 3

Magenta pigment dispersions (Dis-M26) and (Dis-M27) were prepared as in Preparation of Magenta Pigment Dispersions 1 above, except that C.I. Pigment Red 122 (magenta pigment a) represented by Formula (Pig-D) above was changed to C.I. Pigment Red 255 (hereinafter, referred to as "magenta pigment b") represented by Formula (Pig-E) below and C.I. Pigment Red 150 (hereinafter, referred to as "magenta pigment c") represented by Formula (Pig-F) below, respectively.

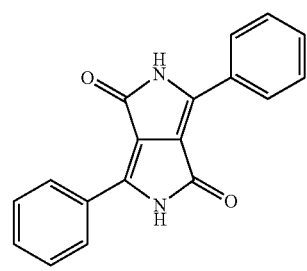
(Pig-E)

(Pig-F)

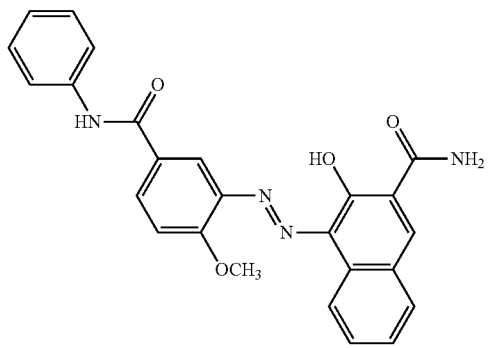

Preparation of Magenta Pigment Dispersions 4

A pigment composition was prepared by mixing 42.0 parts of C.I. Pigment Red 122 (magenta pigment a) represented by Formula (Pig-D) above with 4.2 parts of the polymer (16) including a phthalocyanine structure, which served as a pigment dispersant, by dry blending using a hybridization system "NHS-0" produced by Nara Machinery Co., Ltd. The pigment composition (19.8 parts) was mixed with 180 parts of styrene and 130 parts of glass beads (diameter: 1 mm). The resulting mixture was dispersed for 1 hour with a paint shaker produced by Toyo Seiki Seisakusho, Ltd. and then filtered through a mesh. Thus, a magenta pigment dispersion (Dis-M28) was prepared.

Comparative Example 2-2

Reference magenta pigment dispersions used as a reference in the evaluations and comparative magenta pigment dispersions were prepared in the following manner.
Preparation of Reference Magenta Pigment Dispersions 1

A reference magenta pigment dispersion (Dis-M29) was prepared as in Preparation of Magenta Pigment Dispersions 1, except that the polymer (16) including a phthalocyanine structure was not used.
Preparation of Reference Magenta Pigment Dispersions 2

Reference magenta pigment dispersions (Dis-M30) and (Dis-M31) were prepared as in Preparation of Magenta Pigment Dispersions 3, except that the polymer (16) including a phthalocyanine structure was not used.
Preparation of Reference Magenta Pigment Dispersions 3

A reference magenta pigment dispersion (Dis-M32) was prepared as in Preparation of Magenta Pigment Dispersions 4, except that the polymer (16) including a phthalocyanine structure was not used.
Preparation of Comparative Magenta Pigment Dispersions 1

Comparative magenta pigment dispersions (Dis-M33) to (Dis-M36) were prepared as in Preparation of Magenta Pigment Dispersions 1, except that the polymer (16) including a phthalocyanine structure was changed to the comparative polymer (48) described above (comparative compound 1), the comparative polymer (49) described above (comparative compound 2), the methyl methacrylate-sodium styrenesulfonate copolymer described in Japanese Patent Laid-Open No. 03-113462 (comparative compound 3), and the styrene-butyl acrylate [copolymerization ratio (mass ratio)= 95/5] block copolymer (Mw=9,718) described in Japanese Patent Laid-Open No. 06-148927 (comparative compound 4), respectively.

Example 2-3

Cyan pigment dispersions were prepared in the following manner.
Preparation of Cyan Pigment Dispersions 1

With 1.80 parts of the above-described polymer (16) including a phthalocyanine structure, 180 parts of styrene that served as a water-insoluble solvent, and 130 parts of glass beads (diameter: 1 mm), 18.0 parts of C.I. Pigment Blue 15:3 (hereinafter, referred to as "cyan pigment a") represented by Formula (Pig-G) below was mixed. The resulting mixture was dispersed using an Attritor produced by Nippon Coke & Engineering Co., Ltd. for 3 hours and then filtered through a mesh. Thus, a cyan pigment dispersion (Dis-C1) was prepared.

(Pig-G)

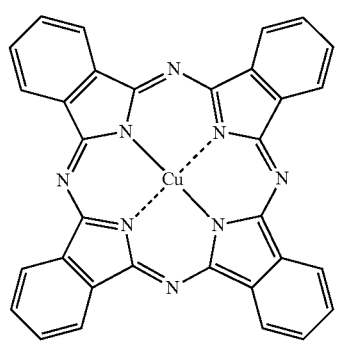

Preparation of Cyan Pigment Dispersions 2

Cyan pigment dispersions (Dis-C2) to (Dis-C25) were prepared as in Preparation of Cyan Pigment Dispersions 1 above, except that the polymer (16) including a phthalocyanine structure was changed to the polymers (17) to (40) including a phthalocyanine structure, respectively.
Preparation of Cyan Pigment Dispersions 3

Cyan pigment dispersions (Dis-C26) and (Dis-C27) were prepared as in Preparation of Cyan Pigment Dispersions 1 above, except that C.I. Pigment Blue 15:3 (cyan pigment a) represented by Formula (Pig-G) above was changed to C.I. Pigment Blue 16 (hereinafter, referred to as "cyan pigment b") represented by Formula (Pig-H) below and C.I. Pigment Blue 17:1 (hereinafter, referred to as "cyan pigment c") represented by Formula (Pig-I) below, respectively.

(Pig-H)

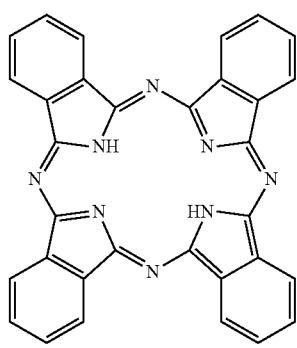

-continued

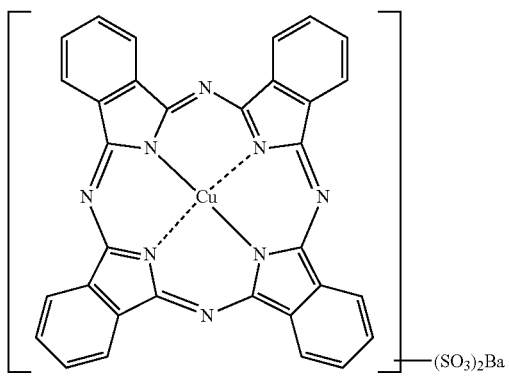

(Pig-I)

Preparation of Cyan Pigment Dispersions 4

A pigment composition was prepared by mixing 42.0 parts of C.I. Pigment Blue 15:3 (cyan pigment a) represented by Formula (Pig-G) above with 4.2 parts of the polymer (16) including a phthalocyanine structure, which served as a pigment dispersant, by dry blending using a hybridization system "NHS-0" produced by Nara Machinery Co., Ltd. The pigment composition (19.8 parts) was mixed with 180 parts of styrene and 130 parts of glass beads (diameter: 1 mm). The resulting mixture was dispersed for 1 hour with a paint shaker produced by Toyo Seiki Seisaku-sho, Ltd. and then filtered through a mesh. Thus, a cyan pigment dispersion (Dis-C28) was prepared.

Comparative Example 2-3

Reference cyan pigment dispersions used as a reference in the evaluations and comparative cyan pigment dispersions were prepared in the following manner.
Preparation of Reference Cyan Pigment Dispersions 1

A reference cyan pigment dispersion (Dis-C29) was prepared as in Preparation of Cyan Pigment Dispersions 1, except that the polymer (16) including a phthalocyanine structure was not used.
Preparation of Reference Cyan Pigment Dispersions 2

Reference cyan pigment dispersions (Dis-C30) and (Dis-C31) were prepared as in Preparation of Cyan Pigment Dispersions 3, except that the polymer (16) including a phthalocyanine structure was not used.
Preparation of Reference Cyan Pigment Dispersions 3

A reference cyan pigment dispersion (Dis-C32) was prepared as in Preparation of Cyan Pigment Dispersions 4, except that the polymer (16) including a phthalocyanine structure was not used.
Preparation of Comparative Cyan Pigment Dispersions 1

Comparative cyan pigment dispersions (Dis-C33) to (Dis-C36) were prepared as in Preparation of Cyan Pigment Dispersions 1, except that the polymer (16) including a phthalocyanine structure was changed to the comparative polymer (48) described above (comparative compound 1), the comparative polymer (49) described above (comparative compound 2), the methyl methacrylate-sodium styrenesulfonate copolymer described in Japanese Patent Laid-Open No. 03-113462 (comparative compound 3), and the styrene-butyl acrylate [copolymerization ratio (mass ratio)=95/5] block copolymer (Mw=9,718) described in Japanese Patent Laid-Open No. 06-148927 (comparative compound 4), respectively.

Example 2-4

Black pigment dispersions were prepared in the following manner.
Preparation of Black Pigment Dispersions 1

With 3.0 parts of the polymer (16) including a phthalocyanine structure, 150 parts of styrene that served as a water-insoluble solvent, and 130 parts of glass beads (diameter: 1 mm), 30.0 parts of carbon black (specific surface area: 65 m$^2$/g, average particle size: 30 nm, pH: 9.0; hereinafter, referred to as "black pigment a") was mixed. The resulting mixture was dispersed using an Attritor produced by Nippon Coke & Engineering Co., Ltd. for 3 hours and then filtered through a mesh. Thus, a black pigment dispersion (Dis-Bk1) was prepared.
Preparation of Black Pigment Dispersions 2

Black pigment dispersions (Dis-Bk2) to (Dis-Bk25) were prepared as in Preparation of Black Pigment Dispersions 1 above, except that the polymer (16) including a phthalocyanine structure was changed to the polymers (17) to (40) including a phthalocyanine structure, respectively.
Preparation of Black Pigment Dispersions 3

Black pigment dispersions (Dis-Bk26) and (Dis-Bk27) were prepared as in Preparation of Black Pigment Dispersions 1 above, except that the carbon black (specific surface area: 65 m$^2$/g, average particle size: 30 nm, pH: 9.0; black pigment a) was changed to carbon black (specific surface area: 77 m$^2$/g, average particle size: 28 nm, pH: 7.5; hereinafter, referred to as "black pigment b") and carbon black (specific surface area: 370 m$^2$/g, average particle size: 13 nm, pH: 3.0; hereinafter, referred to as "black pigment c"), respectively.
Preparation of Black Pigment Dispersions 4

A pigment composition was prepared by mixing 42.0 parts of carbon black (specific surface area: 65 m$^2$/g, average particle size: 30 nm, pH: 9.0; black pigment a) with 4.2 parts of the polymer (16) including a phthalocyanine structure, which served as a pigment dispersant, by dry blending using a hybridization system "NHS-0" produced by Nara Machinery Co., Ltd. The pigment composition (33.0 parts) was mixed with 150 parts of styrene and 130 parts of glass beads (diameter: 1 mm). The resulting mixture was dispersed for 1 hour with a paint shaker produced by Toyo Seiki Seisaku-sho, Ltd. and then filtered through a mesh. Thus, a black pigment dispersion (Dis-Bk28) was prepared.

Comparative Example 2-4

Reference black pigment dispersions used as a reference in the evaluations and comparative black pigment dispersions were prepared in the following manner.
Preparation of Reference Black Pigment Dispersions 1

A reference black pigment dispersion (Dis-Bk29) was prepared as in Preparation of Black Pigment Dispersions 1, except that the polymer (16) including a phthalocyanine structure was not used.
Preparation of Reference Black Pigment Dispersions 2

Reference black pigment dispersions (Dis-Bk30) and (Dis-Bk31) were prepared as in Preparation of Black Pigment Dispersions 3, except that the polymer (16) including a phthalocyanine structure was not used.
Preparation of Reference Black Pigment Dispersions 3

A reference black pigment dispersion (Dis-Bk32) was prepared as in Preparation of Black Pigment Dispersions 4, except that the polymer (16) including a phthalocyanine structure was not used.

Preparation of Comparative Black Pigment Dispersions 1

Comparative black pigment dispersions (Dis-Bk33) to (Dis-Bk36) were prepared as in Preparation of Black Pigment Dispersions 1, except that the polymer (16) including a phthalocyanine structure was changed to the comparative polymer (48) described above (comparative compound 1), the comparative polymer (49) described above (comparative compound 2), the methyl methacrylate-sodium styrenesulfonate copolymer described in Japanese Patent Laid-Open No. 03-113462 (comparative compound 3), and the styrene-butyl acrylate [copolymerization ratio (mass ratio)=95/5] block copolymer (Mw=9,718) described in Japanese Patent Laid-Open No. 06-148927 (comparative compound 4), respectively.

Example 3

The yellow, magenta, cyan, and black pigment dispersions prepared above were evaluated in the following manner.

Evaluation of Pigment Dispersibility

The gloss levels of coating films formed of the yellow pigment dispersions (Dis-Y1) to (Dis-Y28), the magenta pigment dispersions (Dis-M1) to (Dis-M28), the cyan pigment dispersions (Dis-C1) to (Dis-C28), and the black pigment dispersions (Dis-Bk1) to (Dis-Bk28) were measured in order to evaluate the pigment dispersibility of the polymer including a phthalocyanine structure according to the embodiment. A specific method for evaluating the pigment dispersibility of the polymer is described below.

Each pigment dispersion was charged into a pipette, arranged on the upper edge of a sheet of super art paper (SA kanefuji 180 kg 80×160, produced by Oji Paper Co., Ltd.) in a line, and applied uniformly onto the surface of the art paper sheet with a wire bar (#10). After the resulting coating film had been dried, the gloss level (reflection angle: 75°) of the coating film was measured with "Gloss Meter VG2000" produced by NIPPON DENSHOKU INDUSTRIES CO., LTD. The gloss level of the coating film was evaluated in accordance with the criteria described below. The higher the degree of dispersion of the pigment, the higher the smoothness of the coating film, which increases the gloss level of the coating film.

Increases in the gloss levels of the yellow pigment dispersions (Dis-Y1) to (Dis-Y25) were determined with reference to the gloss level of the reference yellow pigment dispersion (Dis-Y29). An increase in the gloss level of the yellow pigment dispersion (Dis-Y26) was determined with reference to the gloss level of the reference yellow pigment dispersion (Dis-Y30). An increase in the gloss level of the yellow pigment dispersion (Dis-Y27) was determined with reference to the gloss level of the reference yellow pigment dispersion (Dis-Y31). An increase in the gloss level of the yellow pigment dispersion (Dis-Y28) was determined with reference to the gloss level of the reference yellow pigment dispersion (Dis-Y32).

Increases in the gloss levels of the magenta pigment dispersions (Dis-M1) to (Dis-M25) were determined with reference to the gloss level of the reference magenta pigment dispersion (Dis-M29). An increase in the gloss level of the magenta pigment dispersion (Dis-M26) was determined with reference to the gloss level of the reference magenta pigment dispersion (Dis-M30). An increase in the gloss level of the magenta pigment dispersion (Dis-M27) was determined with reference to the gloss level of the reference magenta pigment dispersion (Dis-M31). An increase in the gloss level of the magenta pigment dispersion (Dis-M28) was determined with reference to the gloss level of the reference magenta pigment dispersion (Dis-M32).

Increases in the gloss levels of the cyan pigment dispersions (Dis-C1) to (Dis-C25) were determined with reference to the gloss level of the reference cyan pigment dispersion (Dis-C29). An increase in the gloss level of the cyan pigment dispersion (Dis-C26) was determined with reference to the gloss level of the reference cyan pigment dispersion (Dis-C30). An increase in the gloss level of the cyan pigment dispersion (Dis-C27) was determined with reference to the gloss level of the reference cyan pigment dispersion (Dis-C31). An increase in the gloss level of the cyan pigment dispersion (Dis-C28) was determined with reference to the gloss level of the reference cyan pigment dispersion (Dis-C32).

Increases in the gloss levels of the black pigment dispersions (Dis-Bk1) to (Dis-Bk25) were determined with reference to the gloss level of the reference black pigment dispersion (Dis-Bk29). An increase in the gloss level of the black pigment dispersion (Dis-Bk26) was determined with reference to the gloss level of the reference black pigment dispersion (Dis-Bk30). An increase in the gloss level of the black pigment dispersion (Dis-Bk27) was determined with reference to the gloss level of the reference black pigment dispersion (Dis-Bk31). An increase in the gloss level of the black pigment dispersion (Dis-Bk28) was determined with reference to the gloss level of the reference black pigment dispersion (Dis-Bk32).

The yellow, magenta, cyan, and black pigment dispersions were evaluated in accordance with the following criteria.

Criteria of Evaluation of Yellow Pigment Dispersions
  A: An increase in the gloss level of the coating film was 10% or more.
  B: An increase in the gloss level of the coating film was 5% or more and less than 10%.
  C: An increase in the gloss level of the coating film was 0% or more and less than 5%.
  D: The gloss level of the coating film was reduced.

When an increase in the gloss level of the coating film was 5% or more, the dispersibility of the pigment was considered to be high.

Criteria of Evaluation of Magenta Pigment Dispersions
  A: An increase in the gloss level of the coating film was 35% or more.
  B: An increase in the gloss level of the coating film was 20% or more and less than 35%.
  C: An increase in the gloss level of the coating film was 5% or more and less than 20%.
  D: An increase in the gloss level of the coating film was less than 5%.

When an increase in the gloss level of the coating film was 20% or more, the dispersibility of the pigment was considered to be high.

Criteria of Evaluation of Cyan Pigment Dispersions
  A: An increase in the gloss level of the coating film was 50% or more.
  B: An increase in the gloss level of the coating film was 35% or more and less than 50%.
  C: An increase in the gloss level of the coating film was 15% or more and less than 35%.
  D: An increase in the gloss level of the coating film was less than 15%.

When an increase in the gloss level of the coating film was 35% or more, the dispersibility of the pigment was considered to be high.

Criteria of Evaluation of Black Pigment Dispersions
A: The gloss level of the coating film was 80 or more.
B: The gloss level of the coating film was 50 or more and less than 80.
C: The gloss level of the coating film was 20 or more and less than 50.
D: The gloss level of the coating film was less than 20.

When the gloss level of the coating film was 50 or more, the dispersibility of the pigment was considered to be high.

Comparative Example 3

The gloss levels of the comparative yellow pigment dispersions (Dis-Y33) to (Dis-Y36), the comparative magenta pigment dispersions (Dis-M33) to (Dis-M36), the comparative cyan pigment dispersions (Dis-C33) to (Dis-C36), and the comparative black pigment dispersions (Dis-Bk33) to (Dis-Bk36) were evaluated as in Example 3.

Increases in the gloss levels of the comparative yellow pigment dispersions (Dis-Y33) to (Dis-Y36) were determined with reference to the gloss level of the reference yellow pigment dispersion (Dis-Y29). Increases in the gloss levels of the comparative magenta pigment dispersions (Dis-M33) to (Dis-M36) were determined with reference to the gloss level of the reference magenta pigment dispersion (Dis-M29). Increases in the gloss levels of the comparative cyan pigment dispersions (Dis-C33) to (Dis-C36) were determined with reference to the gloss level of the reference cyan pigment dispersion (Dis-C29). Increases in the gloss levels of the comparative black pigment dispersions (Dis-Bk33) to (Dis-Bk36) were determined with reference to the gloss level of the reference black pigment dispersion (Dis-Bk29).

Table 3 summarizes the results of evaluations of the yellow pigment dispersions, the magenta pigment dispersions, the cyan pigment dispersions, and the black pigment dispersions.

TABLE 3

| | Yellow | | Magenta | | Cyan | | Black | |
|---|---|---|---|---|---|---|---|---|
| Polymer | Dispersion | Gloss (gloss level) | Dispersion | Gloss (gloss level) | Dispersion | Gloss (gloss level) | Dispersion | Gloss (gloss level) |
| (16) | Dis-Y1 | A(67) | Dis-M1 | A(74) | Dis-C1 | A(76) | Dis-Bk1 | A(98) |
| (17) | Dis-Y2 | A(66) | Dis-M2 | A(72) | Dis-C2 | A(73) | Dis-Bk2 | A(86) |
| (18) | Dis-Y3 | A(65) | Dis-M3 | A(72) | Dis-C3 | B(66) | Dis-Bk3 | A(100) |
| (19) | Dis-Y4 | A(63) | Dis-M4 | A(69) | Dis-C4 | B(63) | Dis-Bk4 | A(96) |
| (20) | Dis-Y5 | A(65) | Dis-M5 | A(65) | Dis-C5 | A(69) | Dis-Bk5 | A(85) |
| (21) | Dis-Y6 | A(68) | Dis-M6 | A(66) | Dis-C6 | A(75) | Dis-Bk6 | A(102) |
| (22) | Dis-Y7 | A(70) | Dis-M7 | A(66) | Dis-C7 | A(77) | Dis-Bk7 | A(101) |
| (23) | Dis-Y8 | A(69) | Dis-M8 | A(70) | Dis-C8 | A(77) | Dis-Bk8 | A(103) |
| (24) | Dis-Y9 | A(67) | Dis-M9 | A(67) | Dis-C9 | A(74) | Dis-Bk9 | A(99) |
| (25) | Dis-Y10 | A(63) | Dis-M10 | A(65) | Dis-C10 | B(65) | Dis-Bk10 | A(89) |
| (26) | Dis-Y11 | A(63) | Dis-M11 | A(65) | Dis-C11 | B(63) | Dis-Bk11 | A(80) |
| (27) | Dis-Y12 | A(67) | Dis-M12 | A(70) | Dis-C12 | B(64) | Dis-Bk12 | A(88) |
| (28) | Dis-Y13 | A(66) | Dis-M13 | A(71) | Dis-C13 | A(69) | Dis-Bk13 | A(90) |
| (29) | Dis-Y14 | A(66) | Dis-M14 | A(70) | Dis-C14 | A(70) | Dis-Bk14 | A(96) |
| (30) | Dis-Y15 | A(65) | Dis-M15 | A(69) | Dis-C15 | A(72) | Dis-Bk15 | A(95) |
| (31) | Dis-Y16 | A(65) | Dis-M16 | A(66) | Dis-C16 | A(75) | Dis-Bk16 | A(100) |
| (32) | Dis-Y17 | A(65) | Dis-M17 | A(69) | Dis-C17 | A(76) | Dis-Bk17 | A(103) |
| (33) | Dis-Y18 | A(66) | Dis-M18 | A(70) | Dis-C18 | A(77) | Dis-Bk18 | A(101) |
| (34) | Dis-Y19 | A(65) | Dis-M19 | A(71) | Dis-C19 | A(74) | Dis-Bk19 | A(100) |
| (35) | Dis-Y20 | A(66) | Dis-M20 | A(66) | Dis-C20 | A(76) | Dis-Bk20 | A(99) |
| (36) | Dis-Y21 | A(65) | Dis-M21 | A(69) | Dis-C21 | A(77) | Dis-Bk21 | A(101) |
| (37) | Dis-Y22 | A(69) | Dis-M22 | A(70) | Dis-C22 | A(75) | Dis-Bk22 | A(98) |
| (38) | Dis-Y23 | A(68) | Dis-M23 | A(71) | Dis-C23 | A(75) | Dis-Bk23 | A(100) |
| (39) | Dis-Y24 | A(65) | Dis-M24 | A(68) | Dis-C24 | A(76) | Dis-Bk24 | A(90) |
| (40) | Dis-Y25 | A(63) | Dis-M25 | A(65) | Dis-C25 | A(69) | Dis-Bk25 | A(85) |
| (16) | Dis-Y26 | A(69) | Dis-M26 | A(55) | Dis-C26 | B(86) | Dis-Bk26 | B(68) |
| (16) | Dis-Y27 | A(75) | Dis-M27 | A(80) | Dis-C27 | B(88) | Dis-Bk27 | A(83) |
| (16) | Dis-Y28 | A(68) | Dis-M28 | A(68) | Dis-C28 | A(74) | Dis-Bk28 | A(84) |
| None | Dis-Y29 | (57) | Dis-M29 | (47) | Dis-C29 | (46) | Dis-Bk29 | D(6) |
| None | Dis-Y30 | (60) | Dis-M30 | (30) | Dis-C30 | (63) | Dis-Bk30 | C(42) |
| None | Dis-Y31 | (53) | Dis-M31 | (56) | Dis-C31 | (63) | Dis-Bk31 | D(2) |
| None | Dis-Y32 | (55) | Dis-M32 | (48) | Dis-C32 | (44) | Dis-Bk32 | D(5) |
| (48) Comparative compound 1 | Dis-Y33 | B(61) | Dis-M33 | A(66) | Dis-C33 | D(49) | Dis-Bk33 | A(105) |
| (49) Comparative compound 2 | Dis-Y34 | B(62) | Dis-M34 | C(55) | Dis-C34 | C(53) | Dis-Bk34 | A(85) |
| Comparative compound 3 | Dis-Y35 | B(60) | Dis-M35 | B(63) | Dis-C35 | D(51) | Dis-Bk35 | B(64) |
| Comparative compound 4 | Dis-Y36 | C(59) | Dis-M36 | C(56) | Dis-C36 | D(47) | Dis-Bk36 | D(6) |

Example 4-1

Yellow toners were prepared by suspension polymerization in the following manner.
Preparation of Yellow Toners 1
Preparation of Aqueous Medium Into a four-neck flask equipped with a high-speed mixer "T.K. HOMO MIXER" produced by PRIMIX Corporation, 710 parts of ion-exchange water and 450 parts of a 0.1 mol/L-Na$_3$PO$_4$ aqueous solution were charged. Subsequently, the number of rotation of the mixer was set to 12,000 rpm, and the flask was heated to 60° C. To the flask, 68 parts of a 1.0 mol/L-CaCl$_2$ aqueous solution was gradually added. Thus, an aqueous medium containing water-insoluble fine Ca$_3$(PO$_4$)$_2$ particles serving as a dispersion stabilizer was prepared.

Suspension Polymerization Step

The following components were heated to 60° C. and subsequently dissolved and dispersed uniformly by using a high-speed mixer "T.K. HOMO MIXER" produced by PRIMIX Corporation at 5,000 rpm.

Yellow pigment dispersion (Dis-Y1): 132 parts
Styrene monomer: 46 parts
n-Butyl acrylate monomer: 34 parts
Polar resin [saturated polyester resin (terephthalic acid-propylene oxide-modified bisphenol A, acid value: 15 mgKOH/g, peak molecular weight: 6,000)]: 10 parts
Ester wax (maximum endothermic peak observed in DSC=70° C., Mn=704): 25 parts
Aluminum salicylate compound "BONTRON E-108" produced by Orient Chemical Industries Co., Ltd.: 2 parts
Divinylbenzene monomer: 0.1 parts To the resulting mixture, 10 parts of 2,2'-azobis(2,4-dimethylvaleronitrile) that served as a polymerization initiator was added, and the mixture was mixed with the aqueous medium prepared above. While the number of rotation of the mixer was maintained to be 12,000 rpm, granulation was performed for 15 minutes. Subsequently, the high-speed stirrer was replaced with a propeller. Polymerization was continued for 5 hours while the temperature of the liquid mixture was maintained to be 60° C. Then, the temperature of the liquid mixture was increased to 80° C., and polymerization was further continued another 8 hours. After the polymerization reaction was completed, the remaining monomers were distilled away at 80° C. under a reduced pressure, and the temperature was reduced to 30° C. Thus, a dispersion containing polymer fine particles was prepared.

Cleaning and Dehydration Step

The dispersion containing polymer fine particles was transferred to a cleaning container, and diluted hydrochloric acid was added to the cleaning container under stirring. The resulting mixture was stirred at a pH of 1.5 for 2 hours in order to dissolve compounds including phosphoric acid and calcium, such as Ca$_3$(PO$_4$)$_2$. The resulting solution was subjected to solid-liquid separation using a filter. Thus, polymer fine particles were prepared. The polymer fine particles were added into water and stirred in order to again form a dispersion including polymer fine particles. Then, the dispersion including polymer fine particles was subjected to solid-liquid separation with a filter. The step of redispersing the polymer fine particles in water and performing solid-liquid separation of the resulting dispersion was repeated until compounds including phosphoric acid and calcium, such as Ca$_3$(PO$_4$)$_2$, were removed to a sufficient degree. Finally, polymer fine particles prepared by solid-liquid separation were dried with a drying machine to a sufficient degree. Thus, toner particles were prepared.

With 100 parts of the toner particles, 1.0 parts of a hydrophobic silica fine powder (number-average diameter of primary particles: 7 nm) that had been surface-treated with hexamethyldisilazane, 0.15 parts of a fine powder of rutile-type titanium dioxide (number-average diameter of primary particles: 45 nm), and 0.5 parts of a fine powder of rutile-type titanium dioxide (number-average diameter of primary particles: 200 nm) were mixed for 5 minutes by dry blending using a Henschel Mixer produced by Nippon Coke & Engineering Co., Ltd. Thus, a yellow toner (Tnr-Y1) was prepared.

cl Preparation of Yellow Toners 2

Yellow toners (Tnr-Y2) to (Tnr-Y27) according to the embodiment were prepared as in Preparation of Yellow Toners 1, except that the yellow pigment dispersion (Dis-Y1) was changed to the yellow pigment dispersions (Dis-Y2) to (Dis-Y27), respectively.

Comparative Example 4-1

Reference yellow toners, which were used as a reference for evaluations, and comparative yellow toners were prepared in the following manner.

Preparation of Reference Yellow Toners 1

Reference yellow toners (Tnr-Y28) to (Tnr-Y30) were prepared as in Preparation of Yellow Toners 1, except that the yellow pigment dispersion (Dis-Y1) was changed to the yellow pigment dispersions (Dis-Y29) to (Dis-Y31), respectively.

Preparation of Comparative Yellow Toners 1

Comparative yellow toners (Tnr-Y31) to (Tnr-Y34) were prepared as in Preparation of Yellow Toners 1, except that the yellow pigment dispersion (Dis-Y1) was changed to the yellow pigment dispersions (Dis-Y33) to (Dis-Y36), respectively.

Example 4-2

Magenta toners were prepared by suspension polymerization in the following manner.

Preparation of Magenta Toners 1

A magenta toner (Tnr-M1) was prepared as in Preparation of Yellow Toners 1, except that the yellow pigment dispersion (Dis-Y1) was changed to the magenta pigment dispersion (Dis-M1).

Preparation of Magenta Toners 2

Magenta toners (Tnr-M2) to (Tnr-M27) according to the embodiment were prepared as in Preparation of Magenta Toners 1, except that the magenta pigment dispersion (Dis-M1) was changed to the magenta pigment dispersions (Dis-M2) to (Dis-M27), respectively.

Comparative Example 4-2

Reference magenta toners, which were used as a reference for evaluations, and comparative magenta toners were prepared in the following manner.

Preparation of Reference Magenta Toners 1

Reference magenta toners (Tnr-M28) to (Tnr-M30) were prepared as in Preparation of Magenta Toners 1, except that the magenta pigment dispersion (Dis-M1) was changed to the magenta pigment dispersions (Dis-M29) to (Dis-M31), respectively.

Preparation of Comparative Magenta Toners 1

Comparative magenta toners (Tnr-M31) to (Tnr-M34) were prepared as in Preparation of Magenta Toners 1, except that the magenta pigment dispersion (Dis-M1) was changed to the magenta pigment dispersions (Dis-M33) to (Dis-M36), respectively.

Example 4-3

Cyan toners were prepared by suspension polymerization in the following manner.
Preparation of Cyan Toners 1
A cyan toner (Tnr-C1) was prepared as in Preparation of Yellow Toners 1, except that the yellow pigment dispersion (Dis-Y1) was changed to the cyan pigment dispersion (Dis-C1).
Preparation of Cyan Toners 2
Cyan toners (Tnr-C2) to (Tnr-C27) according to the embodiment were prepared as in Preparation of Cyan Toners 1, except that the cyan pigment dispersion (Dis-C1) was changed to the cyan pigment dispersions (Dis-C2) to (Dis-C27), respectively.

Comparative Example 4-3

Reference cyan toners, which were used as a reference for evaluations, and comparative cyan toners were prepared in the following manner.
Preparation of Reference Cyan Toners 1
Reference cyan toners (Tnr-C28) to (Tnr-C30) were prepared as in Preparation of Cyan Toners 1, except that the cyan pigment dispersion (Dis-C1) was changed to the cyan pigment dispersions (Dis-C29) to (Dis-C31), respectively.
Preparation of Comparative Cyan Toners 1
Comparative cyan toners (Tnr-C31) to (Tnr-C34) were prepared as in Preparation of Cyan Toners 1, except that the cyan pigment dispersion (Dis-C1) was changed to the cyan pigment dispersions (Dis-C33) to (Dis-C36), respectively.

Example 4-4

Black toners were prepared by suspension polymerization in the following manner.
Preparation of Black Toners 1
A black toner (Tnr-Bk1) was prepared as in Preparation of Yellow Toners 1, except that the yellow pigment dispersion (Dis-Y1) was changed to the black pigment dispersion (Dis-Bk1).
Preparation of Black Toners 2
Black toners (Tnr-Bk2) to (Tnr-Bk27) according to the embodiment were prepared as in Preparation of Black Toners 1, except that the black pigment dispersion (Dis-Bk1) was changed to the black pigment dispersions (Dis-Bk2) to (Dis-Bk27), respectively.

Comparative Example 4-4

Reference black toners, which were used as a reference for evaluations, and comparative black toners were prepared in the following manner.
Preparation of Reference Black Toners 1
Reference black toners (Tnr-Bk28) to (Tnr-Bk30) were prepared as in Preparation of Black Toners 1, except that the black pigment dispersion (Dis-Bk1) was changed to the black pigment dispersions (Dis-Bk29) to (Dis-Bk31), respectively.
Preparation of Comparative Black Toners 1
Comparative black toners (Tnr-Bk31) to (Tnr-Bk34) were prepared as in Preparation of Black Toners 1, except that the black pigment dispersion (Dis-Bk1) was changed to the black pigment dispersions (Dis-Bk33) to (Dis-Bk36), respectively.

Example 5-1

Yellow toners were prepared by dissolution suspension in the following manner.

Preparation of Yellow Toners 3
Preparation of Yellow Pigment Dispersion
A yellow pigment dispersion was prepared by mixing together 180 parts of ethyl acetate, 12 parts of C.I. Pigment Yellow 155 (yellow pigment a), 1.2 parts of the polymer (16) including a phthalocyanine structure, and 130 parts of glass beads (diameter: 1 mm), dispersing the resulting mixture with an Attritor produced by Nippon Coke & Engineering Co., Ltd. for 3 hours, and filtering the mixture through a mesh.
Mixing Step
The following components were dispersed with a ball mill for 24 hours. Thus, 200 parts of a toner-composition liquid mixture was prepared.
  The yellow pigment dispersion prepared above: 96.0 parts
  Polar resin [saturated polyester resin (polycondensate of propylene-oxide-modified bisphenol A and phthalic acid, Tg=75.9° C., Mw=11,000, Mn=4,200, acid value: 11)]: 85.0 parts
  Hydrocarbon wax (Fischer-Tropsch wax, maximum endothermic peak observed in DSC=80° C., Mw=750): 9.0 parts
  Aluminium salicylate compound "BONTRON E-108" produced by Orient Chemical Industries Co., Ltd.: 2 parts
  Ethyl acetate (solvent): 10.0 parts
Dispersion Suspension Step
The following components were dispersed with a ball mill for 24 hours in order to dissolve carboxymethylcellulose. Thus, an aqueous medium was prepared.
  Calcium carbonate (coated with acrylic copolymer): 20.0 parts
  Carboxymethylcellulose "Serogen BS-H" produced by Dai-ichi Kogyo Seiyaku Co., Ltd.: 0.5 parts
  Ion-exchange water: 99.5 parts
Into a high-speed mixer "T.K. HOMO MIXER" produced by PRIMIX Corporation, 1,200 parts of the aqueous medium was charged. While stirring was performed with a rotor blade rotating at a circumferential velocity of 20 m/sec, 1,000 parts of the toner-composition liquid mixture prepared above was charged into the mixer. Then, stirring was performed for 1 minute while the temperature was maintained to be 25° C. Thus, a suspension was prepared.
Solvent Removal Step
While 2,200 parts of the suspension prepared above was stirred with a mixing impeller "Fullzone" produced by Kobelco Eco-Solutions Co., Ltd. at a circumferential velocity of 45 m/min and the temperature of the suspension was maintained to be 40° C., the gas phase above the surface of the suspension was forcibly drawn using a blower in order to remove the solvent. In this solvent removal step, 75 parts of 1%-diluted ammonia water, which served as an ionic substance, was added to the suspension 15 minutes after the time the removal of the solvent was started; 25 parts of the ammonia water was added to the suspension 1 hour after the time the removal of the solvent was started; 25 parts of the ammonia water was added to the suspension 2 hours after the time the removal of the solvent was started; and 25 parts of the ammonia water was added to the suspension 3 hours after the time the removal of the solvent was started. Thus, 150 parts of the ammonia water was added to the suspension in total. The suspension was maintained for 17 hours after the time the removal of the solvent was started while the temperature of the suspension was maintained to be 40° C. Thus, a toner dispersion including suspension particles from which the solvent (i.e., ethyl acetate) had been removed was prepared.

Cleaning and Dehydration Step

To 300 parts of the toner dispersion prepared in the solvent removal step, 80 parts of 10-mol/L hydrochloric acid was added. To the resulting mixture, a 0.1-mol/L aqueous sodium hydroxide solution was added in order to neutralize the mixture. Subsequently, cleaning with ion-exchange water by suction filtration was repeated four times. Thus, a toner cake was prepared. The toner cake was dried in a vacuum drying machine, and the dried toner cake was screened through a sieve having an opening size of 45 μm. Thus, toner particles were prepared. The toner particles were subjected to the same treatment as in Preparation of Yellow Toners 1 of Example 4-1. Thus, a yellow toner (Tnr-Y35) according to the embodiment was prepared.

Preparation of Yellow Toners 4

Yellow toners (Tnr-Y36) to (Tnr-Y59) according to the embodiment were prepared as in Preparation of Yellow Toners 3, except that the polymer (16) including a phthalocyanine structure was changed to the polymers (17) to (40), respectively.

Preparation of Yellow Toners 5

Yellow toners (Tnr-Y60) and (Tnr-Y61) according to the embodiment were prepared as in Preparation of Yellow Toners 3, except that C.I. Pigment Yellow 155 (yellow pigment a) represented by Formula (Pig-A) above was changed to C.I. Pigment Yellow 180 (yellow pigment b) represented by Formula (Pig-B) above and C.I. Pigment Yellow 185 (yellow pigment c) represented by Formula (Pig-C) above, respectively.

Comparative Example 5-1

Reference yellow toners, which were used as a reference for evaluations, and comparative yellow toners were prepared in the following manner.

Preparation of Reference Yellow Toners 2

A reference yellow toner (Tnr-Y62) was prepared as in Preparation of Yellow Toners 3, except that the polymer (16) including a phthalocyanine structure was not used.

Preparation of Reference Yellow Toners 3

Reference yellow toners (Tnr-Y63) and (Tnr-Y64) were prepared as in Preparation of Yellow Toners 5, except that the polymer (16) including a phthalocyanine structure was not used.

Preparation of Comparative Yellow Toners 2

Comparative yellow toners (Tnr-Y65) to (Tnr-Y68) were prepared as in Preparation of Yellow Toners 3, except that the polymer (16) including a phthalocyanine structure was changed to the comparative polymer (48) described above (comparative compound 1), the comparative polymer (49) described above (comparative compound 2), the methyl methacrylate-sodium styrenesulfonate copolymer described in Japanese Patent Laid-Open No. 03-113462 (comparative compound 3), and the styrene-butyl acrylate [copolymerization ratio (mass ratio)=95/5] block copolymer (Mw=9,718) described in Japanese Patent Laid-Open No. 06-148927 (comparative compound 4), respectively.

Example 5-2

Magenta toners were prepared by dissolution suspension in the following manner.

Preparation of Magenta Toners 3

A magenta toner (Tnr-M35) according to the embodiment was prepared as in Preparation of Yellow Toners 3, except that C.I. Pigment Yellow 155 (yellow pigment a) represented by Formula (Pig-A) above was changed to C.I. Pigment Red 122 (magenta pigment a) represented by Formula (Pig-D) above.

Preparation of Magenta Toners 4

Magenta toners (Tnr-M36) to (Tnr-M59) according to the embodiment were prepared as in Preparation of Magenta Toners 3, except that the polymer (16) including a phthalocyanine structure was changed to the polymers (17) to (40), respectively.

Preparation of Magenta Toners 5

Magenta toners (Tnr-M60) and (Tnr-M61) according to the embodiment were prepared as in Preparation of Magenta Toners 3, except that C.I. Pigment Red 122 (magenta pigment a) represented by Formula (Pig-D) above was changed to C.I. Pigment Red 255 (magenta pigment b) represented by Formula (Pig-E) above and C.I. Pigment Red 150 (magenta pigment c) represented by Formula (Pig-F) above, respectively.

Comparative Example 5-2

Reference magenta toners, which were used as a reference for evaluations, and comparative magenta toners were prepared in the following manner.

Preparation of Reference Magenta Toners 2

A reference magenta toner (Tnr-M62) was prepared as in Preparation of Magenta Toners 3, except that the polymer (16) including a phthalocyanine structure was not used.

Preparation of Reference Magenta Toners 3

Reference magenta toners (Tnr-M63) and (Tnr-M64) were prepared as in Preparation of Magenta Toners 5, except that the polymer (16) including a phthalocyanine structure was not used.

Preparation of Comparative Magenta Toners 2

Comparative magenta toners (Tnr-M65) to (Tnr-M68) were prepared as in Preparation of Magenta Toners 3, except that the polymer (16) including a phthalocyanine structure was changed to the comparative polymer (48) described above (comparative compound 1), the comparative polymer (49) described above (comparative compound 2), the methyl methacrylate-sodium styrenesulfonate copolymer described in Japanese Patent Laid-Open No. 03-113462 (comparative compound 3), and the styrene-butyl acrylate [copolymerization ratio (mass ratio)=95/5] block copolymer (Mw=9,718) described in Japanese Patent Laid-Open No. 06-148927 (comparative compound 4), respectively.

Example 5-3

Cyan toners were prepared by dissolution suspension in the following manner.

Preparation of Cyan Toners 3

A cyan toner (Tnr-C35) according to the embodiment was prepared as in Preparation of Yellow Toners 3, except that C.I. Pigment Yellow 155 (yellow pigment a) represented by Formula (Pig-A) above was changed to C.I. Pigment Blue 15:3 (cyan pigment a) represented by Formula (Pig-G) above.

Preparation of Cyan Toners 4

Cyan toners (Tnr-C36) to (Tnr-O59) according to the embodiment were prepared as in Preparation of Cyan Toners 3, except that the polymer (16) including a phthalocyanine structure was changed to the polymers (17) to (40), respectively.

Preparation of Cyan Toners 5

Cyan toners (Tnr-C60) and (Tnr-C61) according to the embodiment were prepared as in Preparation of Cyan Toners 3, except that C.I. Pigment Blue 15:3 (cyan pigment a) represented by Formula (Pig-G) above was changed to C.I. Pigment Blue 16 (cyan pigment b) represented by Formula (Pig-H) above and C.I. Pigment Blue 17:1 (cyan pigment c) represented by Formula (Pig-I) above, respectively.

Comparative Example 5-3

Reference cyan toners, which were used as a reference for evaluations, and comparative cyan toners were prepared in the following manner.
Preparation of Reference Cyan Toners 2
A reference cyan toner (Tnr-C62) was prepared as in Preparation of Cyan Toners 3, except that the polymer (16) including a phthalocyanine structure was not used.
Preparation of Reference Cyan Toners 3
Reference cyan toners (Tnr-C63) and (Tnr-C64) were prepared as in Preparation of Cyan Toners 5, except that the polymer (16) including a phthalocyanine structure was not used.
Preparation of Comparative Cyan Toners 2
Comparative cyan toners (Tnr-C65) to (Tnr-C68) were prepared as in Preparation of Cyan Toners 3, except that the polymer (16) including a phthalocyanine structure was changed to the comparative polymer (48) described above (comparative compound 1), the comparative polymer (49) described above (comparative compound 2), the methyl methacrylate-sodium styrenesulfonate copolymer described in Japanese Patent Laid-Open No. 03-113462 (comparative compound 3), and the styrene-butyl acrylate [copolymerization ratio (mass ratio)=95/5] block copolymer (Mw=9,718) described in Japanese Patent Laid-Open No. 06-148927 (comparative compound 4), respectively.

Example 5-4

Black toners were prepared by dissolution suspension in the following manner.
Preparation of Black Toners 3
A black toner (Tnr-Bk35) according to the embodiment was prepared as in Preparation of Yellow Toners 3, except that 12 parts of C.I. Pigment Yellow 155 (yellow pigment a) represented by Formula (Pig-A) above was changed to 30 parts of carbon black (specific surface area: 65 m$^2$/g, average particle size: 30 nm, pH: 9.0; black pigment a) and the amount of the polymer (16) including a phthalocyanine structure was changed to 3.0 parts.
Preparation of Black Toners 4
Black toners (Tnr-Bk36) to (Tnr-Bk59) according to the embodiment were prepared as in Preparation of Black Toners 3, except that the polymer (16) including a phthalocyanine structure was changed to the polymers (17) to (40), respectively.
Preparation of Black Toners 5
Black toners (Tnr-Bk60) and (Tnr-Bk61) according to the embodiment were prepared as in Preparation of Black Toners 3, except that the carbon black (specific surface area: 65 m$^2$/g, average particle size: 30 nm, pH: 9.0; black pigment a) was changed to carbon black (specific surface area: 77 m$^2$/g, average particle size: 28 nm, pH: 7.5; black pigment b) and carbon black (specific surface area: 370 m$^2$/g, average particle size: 13 nm, pH: 3.0; black pigment c), respectively.

Comparative Example 5-4

Reference black toners, which were used as a reference for evaluations, and comparative black toners were prepared in the following manner.
Preparation of Reference Black Toners 2
A reference black toner (Tnr-Bk62) was prepared as in Preparation of Black Toners 3, except that the polymer (16) including a phthalocyanine structure was not used.
Preparation of Reference Black Toners 3
Reference black toners (Tnr-Bk63) and (Tnr-Bk64) were prepared as in Preparation of Black Toner 5, except that the polymer (16) including a phthalocyanine structure was not used.
Preparation of Comparative Black Toners 2
Comparative black toners (Tnr-Bk65) to (Tnr-Bk68) were prepared as in Preparation of Black Toners 3, except that the polymer (16) including a phthalocyanine structure was changed to the comparative polymer (48) described above (comparative compound 1), the comparative polymer (49) described above (comparative compound 2), the methyl methacrylate-sodium styrenesulfonate copolymer described in Japanese Patent Laid-Open No. 03-113462 (comparative compound 3), and the styrene-butyl acrylate [copolymerization ratio (mass ratio)=95/5] block copolymer (Mw=9,718) described in Japanese Patent Laid-Open No. 06-148927 (comparative compound 4), respectively.

Example 6

The yellow toners, the magenta toners, the cyan toners, and the black toners prepared in Examples 4-1 to 4-4 and Examples 5-1 to 5-4 were evaluated in the following manner.
Evaluation of Tinting Strengths of Toners
A sample image was formed using each of the yellow toners (Tnr-Y1) to (Tnr-Y27) and (Tnr-Y35) to (Tnr-Y61), the magenta toners (Tnr-M1) to (Tnr-M27) and (Tnr-M35) to (Tnr-M61), the cyan toners (Tnr-C1) to (Tnr-C27) and (Tnr-C35) to (Tnr-C61), and the black toners (Tnr-Bk1) to (Tnr-Bk27) and (Tnr-Bk35) to (Tnr-Bk61) and evaluated by comparing the property of the sample image with that of a reference image as described below. Prior to the comparison of image property, a sheet-passing durability test was conducted using a modification of "LBP-5300" produced by CANON KABUSHIKI KAISHA as an image-forming apparatus (hereinafter, referred to as "LBP"). Specifically, a developing blade included in a process cartridge (hereinafter, referred to as "CRG") of the image-forming apparatus was replaced with a SUS blade having a thickness of 8 μm, and a modification was made such that a blade bias of −200 V with respect to the developing bias applied to the developing roller, which served as a toner carrier, could be applied to the SUS blade.

A solid image was formed on a sheet of recording paper (75 g/m$^2$ paper) with a toner coverage of 0.5 mg/cm$^2$ in a normal temperature-normal humidity [N/N (23.5° C., 60%RH)] environment. The density of the solid image was measured with a reflection densitometer "Spectrolino" produced by GretagMacbeth. The tinting strength of the toner was evaluated in terms of an increase in the density of the solid image.

Increases in the densities of solid images formed using the yellow toners (Tnr-Y1) to (Tnr-Y25) were determined with reference to the density of a solid image formed using the reference yellow toner (Tnr-Y28). An increase in the density of a solid image formed using the yellow toner (Tnr-Y26) was determined with reference to the density of a solid image formed using the reference yellow toner (Tnr-Y29). An increase in the density of a solid image formed using the yellow toner (Tnr-Y27) was determined with reference to the density of a solid image formed using the reference yellow toner (Tnr-Y30).

Increases in the densities of solid images formed using the yellow toners (Tnr-Y35) to (Tnr-Y59) were determined with reference to the density of a solid image formed using the reference yellow toner (Tnr-Y62). An increase in the density of a solid image formed using the yellow toner (Tnr-Y60) was determined with reference to the density of a solid image formed using the reference yellow toner (Tnr-Y63).

An increase in the density of a solid image formed using the yellow toner (Tnr-Y61) was determined with reference to the density of a solid image formed using the reference yellow toner (Tnr-Y64).

Increases in the densities of solid images formed using the magenta toners (Tnr-M1) to (Tnr-M25) were determined with reference to the density of a solid image formed using the reference magenta toner (Tnr-M28). An increase in the density of a solid image formed using the magenta toner (Tnr-M26) was determined with reference to the density of a solid image formed using the reference magenta toner (Tnr-M29). An increase in the density of a solid image formed using the magenta toner (Tnr-M27) was determined with reference to the density of a solid image formed using the reference magenta toner (Tnr-M30).

Increases in the densities of solid images formed using the magenta toners (Tnr-M35) to (Tnr-M59) were determined with reference to the density of a solid image formed using the reference magenta toner (Tnr-M62). An increase in the density of a solid image formed using the magenta toner (Tnr-M60) was determined with reference to the density of a solid image formed using the reference magenta toner (Tnr-M63). An increase in the density of a solid image formed using the magenta toner (Tnr-M61) was determined with reference to the density of a solid image formed using the reference magenta toner (Tnr-M64).

Increases in the densities of solid images formed using the cyan toners (Tnr-C1) to (Tnr-C25) were determined with reference to the density of a solid image formed using the reference cyan toner (Tnr-C28). An increase in the density of a solid image formed using the cyan toner (Tnr-C26) was determined with reference to the density of a solid image formed using the reference cyan toner (Tnr-C29). An increase in the density of a solid image formed using the cyan toner (Tnr-C27) was determined with reference to the density of a solid image formed using the reference cyan toner (Tnr-C30).

Increases in the densities of solid images formed using the cyan toners (Tnr-C35) to (Tnr-O59) were determined with reference to the density of a solid image formed using the reference cyan toner (Tnr-C62). An increase in the density of a solid image formed using the cyan toner (Tnr-C60) was determined with reference to the density of a solid image formed using the reference cyan toner (Tnr-C63). An increase in the density of a solid image formed using the cyan toner (Tnr-C61) was determined with reference to the density of a solid image formed using the reference cyan toner (Tnr-C64).

Increases in the densities of solid images formed using the black toners (Tnr-Bk1) to (Tnr-Bk25) were determined with reference to the density of a solid image formed using the reference black toner (Tnr-Bk28). An increase in the density of a solid image formed using the black toner (Tnr-Bk26) was determined with reference to the density of a solid image formed using the reference black toner (Tnr-Bk29). An increase in the density of a solid image formed using the black toner (Tnr-Bk27) was determined with reference to the density of a solid image formed using the reference black toner (Tnr-Bk30).

Increases in the densities of solid images formed using the black toners (Tnr-Bk35) to (Tnr-Bk59) were determined with reference to the density of a solid image formed using the reference black toner (Tnr-Bk62). An increase in the density of a solid image formed using the black toner (Tnr-Bk60) was determined with reference to the density of a solid image formed using the reference black toner (Tnr-Bk63). An increase in the density of a solid image formed using the black toner (Tnr-Bk61) was determined with reference to the density of a solid image formed using the reference black toner (Tnr-Bk64).

Increases in the densities of yellow, magenta, cyan, and black solid images were evaluated in accordance with the following criteria.

Criteria of Evaluation of Increases in Densities of Solid Images Formed Using Yellow Toners A: An increase in the density of the solid image was 5% or more.

B: An increase in the density of the solid image was 1% or more and less than 5%.

C: An increase in the density of the solid image was 0% or more and less than 1%.

D: The density of the solid image was reduced.

The tinting strength of the toner was evaluated as good when an increase in the density of the solid image was 1% or more.

Criteria of Evaluation of Increases in Densities of Solid Images Formed Using Magenta Toners A: An increase in the density of the solid image was 20% or more.

B: An increase in the density of the solid image was 10% or more and less than 20%.

C: An increase in the density of the solid image was 5% or more and less than 10%.

D: An increase in the density of the solid image was less than 5%.

The tinting strength of the toner was evaluated as good when an increase in the density of the solid image was 10% or more.

Criteria of Evaluation of Increases in Densities of Solid Images Formed Using Cyan Toners A: An increase in the density of the solid image was 30% or more.

B: An increase in the density of the solid image was 20% or more and less than 30%.

C: An increase in the density of the solid image was 10% or more and less than 20%.

D: An increase in the density of the solid image was less than 10%.

The tinting strength of the toner was evaluated as good when an increase in the density of the solid image was 20% or more.

Criteria of Evaluation of Increases in Densities of Solid Images Formed Using Black Toners A: An increase in the density of the solid image was 60% or more.

B: An increase in the density of the solid image was 40% or more and less than 60%.

C: An increase in the density of the solid image was 20% or more and less than 40%.

D: An increase in the density of the solid image was less than 20%.

The tinting strength of the toner was evaluated as good when an increase in the density of the solid image was 40% or more.

Comparative Example 6

The tinting strengths of the comparative yellow toners (Tnr-Y31) to (Tnr-Y34) and (Tnr-Y65) to (Tnr-Y68), the comparative magenta toners (Tnr-M31) to (Tnr-M34) and (Tnr-M65) to (Tnr-M68), the comparative cyan toners (Tnr-C31) to (Tnr-C34) and (Tnr-C65) to (Tnr-C68), and the comparative black toners (Tnr-Bk31) to (Tnr-Bk34) and (Tnr-Bk65) to (Tnr-Bk68) were evaluated as in Example 6.

Increases in the densities of solid images formed using the comparative yellow toners (Tnr-Y31) to (Tnr-Y34) were determined with reference to the density of a solid image formed using the reference yellow toner (Tnr-Y28).

Increases in the densities of solid images formed using the comparative yellow toners (Tnr-Y65) to (Tnr-Y68) were determined with reference to the density of a solid image formed using the reference yellow toner (Tnr-Y62).

Increases in the densities of solid images formed using the comparative magenta toners (Tnr-M31) to (Tnr-M34) were determined with reference to the density of a solid image formed using the reference magenta toner (Tnr-M28).

Increases in the densities of solid images formed using the comparative magenta toners (Tnr-M65) to (Tnr-M68) were determined with reference to the density of a solid image formed using the reference magenta toner (Tnr-M62).

Increases in the densities of solid images formed using the comparative cyan toners (Tnr-C31) to (Tnr-C34) were determined with reference to the density of a solid image formed using the reference cyan toner (Tnr-C28).

Increases in the densities of solid images formed using the comparative cyan toners (Tnr-C65) to (Tnr-C68) were determined with reference to the density of a solid image formed using the reference cyan toner (Tnr-C62).

Increases in the densities of solid images formed using the comparative black toners (Tnr-Bk31) to (Tnr-Bk34) were determined with reference to the density of a solid image formed using the reference black toner (Tnr-Bk28).

Increases in the densities of solid images formed using the comparative black toners (Tnr-Bk65) to (Tnr-Bk68) were determined with reference to the density of a solid image formed using the reference black toner (Tnr-Bk62).

Table 4 summarizes the results of evaluations of the tinting strengths of the yellow, magenta, cyan, and black toners prepared by suspension polymerization. Table 5 summarizes the results of evaluations of the tinting strengths of the yellow, magenta, cyan, and black toners prepared by dissolution suspension.

TABLE 4

| Polymer | Yellow | | Magenta | | Cyan | | Black | |
|---|---|---|---|---|---|---|---|---|
| | Dispersion | Gloss (gloss level) | Dispersion | Gloss (gloss level) | Dispersion | Gloss (gloss level) | Dispersion | Gloss (gloss level) |
| (16) | Tnr-Y1 | A | Tnr-M1 | A | Tnr-C1 | A | Tnr-Bk1 | A |
| (17) | Tnr-Y2 | A | Tnr-M2 | A | Tnr-C2 | A | Tnr-Bk2 | A |
| (18) | Tnr-Y3 | A | Tnr-M3 | A | Tnr-C3 | A | Tnr-Bk3 | A |
| (19) | Tnr-Y4 | A | Tnr-M4 | A | Tnr-C4 | A | Tnr-Bk4 | A |
| (20) | Tnr-Y5 | A | Tnr-M5 | A | Tnr-C5 | A | Tnr-Bk5 | A |
| (21) | Tnr-Y6 | A | Tnr-M6 | A | Tnr-C6 | A | Tnr-Bk6 | A |
| (22) | Tnr-Y7 | A | Tnr-M7 | A | Tnr-C7 | A | Tnr-Bk7 | A |
| (23) | Tnr-Y8 | A | Tnr-M8 | A | Tnr-C8 | A | Tnr-Bk8 | A |
| (24) | Tnr-Y9 | A | Tnr-M9 | A | Tnr-C9 | A | Tnr-Bk9 | A |
| (25) | Tnr-Y10 | A | Tnr-M10 | A | Tnr-C10 | A | Tnr-Bk10 | A |
| (26) | Tnr-Y11 | A | Tnr-M11 | A | Tnr-C11 | A | Tnr-Bk11 | A |
| (27) | Tnr-Y12 | A | Tnr-M12 | A | Tnr-C12 | A | Tnr-Bk12 | A |
| (28) | Tnr-Y13 | A | Tnr-M13 | A | Tnr-C13 | A | Tnr-Bk13 | A |
| (29) | Tnr-Y14 | A | Tnr-M14 | A | Tnr-C14 | A | Tnr-Bk14 | A |
| (30) | Tnr-Y15 | A | Tnr-M15 | A | Tnr-C15 | A | Tnr-Bk15 | A |
| (31) | Tnr-Y16 | A | Tnr-M16 | A | Tnr-C16 | A | Tnr-Bk16 | A |
| (32) | Tnr-Y17 | A | Tnr-M17 | A | Tnr-C17 | A | Tnr-Bk17 | A |
| (33) | Tnr-Y18 | A | Tnr-M18 | A | Tnr-C18 | A | Tnr-Bk18 | A |
| (34) | Tnr-Y19 | A | Tnr-M19 | A | Tnr-C19 | A | Tnr-Bk19 | A |
| (35) | Tnr-Y20 | A | Tnr-M20 | A | Tnr-C20 | A | Tnr-Bk20 | A |
| (36) | Tnr-Y21 | A | Tnr-M21 | A | Tnr-C21 | A | Tnr-Bk21 | A |
| (37) | Tnr-Y22 | A | Tnr-M22 | A | Tnr-C22 | A | Tnr-Bk22 | A |
| (38) | Tnr-Y23 | A | Tnr-M23 | A | Tnr-C23 | A | Tnr-Bk23 | A |
| (39) | Tnr-Y24 | A | Tnr-M24 | A | Tnr-C24 | A | Tnr-Bk24 | A |
| (40) | Tnr-Y25 | A | Tnr-M25 | A | Tnr-C25 | A | Tnr-Bk25 | A |
| (16) | Tnr-Y26 | A | Tnr-M26 | A | Tnr-C26 | A | Tnr-Bk26 | A |
| (16) | Tnr-Y27 | A | Tnr-M27 | A | Tnr-C27 | A | Tnr-Bk27 | A |
| None | Tnr-Y28 | — | Tnr-M28 | — | Tnr-C28 | — | Tnr-Bk28 | — |
| None | Tnr-Y29 | — | Tnr-M29 | — | Tnr-C29 | — | Tnr-Bk29 | — |
| None | Tnr-Y30 | — | Tnr-M30 | — | Tnr-C30 | — | Tnr-Bk30 | — |
| (48) Comparative compound 1 | Tnr-Y31 | B | Tnr-M31 | A | Tnr-C31 | B | Tnr-Bk31 | A |
| (49) Comparative compound 2 | Tnr-Y32 | B | Tnr-M32 | C | Tnr-C32 | D | Tnr-Bk32 | A |
| Comparative compound 3 | Tnr-Y33 | D | Tnr-M33 | D | Tnr-C33 | C | Tnr-Bk33 | D |
| Comparative compound 4 | Tnr-Y34 | D | Tnr-M34 | D | Tnr-C34 | D | Tnr-Bk34 | D |

TABLE 5

| Polymer | Yellow | | Magenta | | Cyan | | Black | |
|---|---|---|---|---|---|---|---|---|
| | Dispersion | Gloss (gloss level) | Dispersion | Gloss (gloss level) | Dispersion | Gloss (gloss level) | Dispersion | Gloss (gloss level) |
| (16) | Tnr-Y35 | A | Tnr-M35 | A | Tnr-C35 | A | Tnr-Bk35 | A |
| (17) | Tnr-Y36 | A | Tnr-M36 | A | Tnr-C36 | A | Tnr-Bk36 | A |
| (18) | Tnr-Y37 | A | Tnr-M37 | A | Tnr-C37 | A | Tnr-Bk37 | A |

TABLE 5-continued

| Polymer | Yellow Dispersion | Gloss (gloss level) | Magenta Dispersion | Gloss (gloss level) | Cyan Dispersion | Gloss (gloss level) | Black Dispersion | Gloss (gloss level) |
|---|---|---|---|---|---|---|---|---|
| (19) | Tnr-Y38 | A | Tnr-M38 | A | Tnr-C38 | A | Tnr-Bk38 | A |
| (20) | Tnr-Y39 | A | Tnr-M39 | A | Tnr-C39 | A | Tnr-Bk39 | A |
| (21) | Tnr-Y40 | A | Tnr-M40 | A | Tnr-C40 | A | Tnr-Bk40 | A |
| (22) | Tnr-Y41 | A | Tnr-M41 | A | Tnr-C41 | A | Tnr-Bk41 | A |
| (23) | Tnr-Y42 | A | Tnr-M42 | A | Tnr-C42 | A | Tnr-Bk42 | A |
| (24) | Tnr-Y43 | A | Tnr-M43 | A | Tnr-C43 | A | Tnr-Bk43 | A |
| (25) | Tnr-Y44 | A | Tnr-M44 | A | Tnr-C44 | A | Tnr-Bk44 | A |
| (26) | Tnr-Y45 | A | Tnr-M45 | A | Tnr-C45 | A | Tnr-Bk45 | A |
| (27) | Tnr-Y46 | A | Tnr-M46 | A | Tnr-C46 | A | Tnr-Bk46 | A |
| (28) | Tnr-Y47 | A | Tnr-M47 | A | Tnr-C47 | A | Tnr-Bk47 | A |
| (29) | Tnr-Y48 | A | Tnr-M48 | A | Tnr-C48 | A | Tnr-Bk48 | A |
| (30) | Tnr-Y49 | A | Tnr-M49 | A | Tnr-C49 | A | Tnr-Bk49 | A |
| (31) | Tnr-Y50 | A | Tnr-M50 | A | Tnr-C50 | A | Tnr-Bk50 | A |
| (32) | Tnr-Y51 | A | Tnr-M51 | A | Tnr-C51 | A | Tnr-Bk51 | A |
| (33) | Tnr-Y52 | A | Tnr-M52 | A | Tnr-C52 | A | Tnr-Bk52 | A |
| (34) | Tnr-Y53 | A | Tnr-M53 | A | Tnr-C53 | A | Tnr-Bk53 | A |
| (35) | Tnr-Y54 | A | Tnr-M54 | A | Tnr-C54 | A | Tnr-Bk54 | A |
| (36) | Tnr-Y55 | A | Tnr-M55 | A | Tnr-C55 | A | Tnr-Bk55 | A |
| (37) | Tnr-Y56 | A | Tnr-M56 | A | Tnr-C56 | A | Tnr-Bk56 | A |
| (38) | Tnr-Y57 | A | Tnr-M57 | A | Tnr-C57 | A | Tnr-Bk57 | A |
| (39) | Tnr-Y58 | A | Tnr-M58 | A | Tnr-C58 | A | Tnr-Bk58 | A |
| (40) | Tnr-Y59 | A | Tnr-M59 | A | Tnr-C59 | A | Tnr-Bk59 | A |
| (16) | Tnr-Y60 | A | Tnr-M60 | A | Tnr-C60 | B | Tnr-Bk60 | B |
| (16) | Tnr-Y61 | A | Tnr-M61 | A | Tnr-C61 | B | Tnr-Bk61 | A |
| None | Tnr-Y62 | — | Tnr-M62 | — | Tnr-C62 | — | Tnr-Bk62 | — |
| None | Tnr-Y63 | — | Tnr-M63 | — | Tnr-C63 | — | Tnr-Bk63 | — |
| None | Tnr-Y64 | — | Tnr-M64 | — | Tnr-C64 | — | Tnr-Bk64 | — |
| (48) Comparative compound 1 | Tnr-Y65 | B | Tnr-M65 | A | Tnr-C65 | B | Tnr-Bk65 | A |
| (49) Comparative compound 2 | Tnr-Y66 | B | Tnr-M66 | C | Tnr-C66 | C | Tnr-Bk66 | A |
| Comparative compound 3 | Tnr-Y67 | D | Tnr-M67 | D | Tnr-C67 | B | Tnr-Bk67 | D |
| Comparative compound 4 | Tnr-Y68 | D | Tnr-M68 | D | Tnr-C68 | D | Tnr-Bk68 | D |

The results described in Table 3 confirm that: using the polymer including a phthalocyanine structure according to the embodiment increased the dispersibility of pigments in a pigment composition and a pigment dispersion; in particular, addition of the polymer according to the embodiment markedly increased the dispersibility of cyan pigments; and the dispersibility of pigments was high when all of $R_2$ to $R_4$ in Formula (1) were a hydrogen atom.

The results described in Tables 4 and 5 confirm that using the polymer including a phthalocyanine structure according to the embodiment improves the dispersibility of pigments in a binder resin and thereby enables a yellow toner, a magenta toner, a cyan toner, and a black toner having a high tinting strength to be produced.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2015-039423, filed Feb. 27, 2015, which is hereby incorporated by reference herein in its entirety.

What is claimed is:

1. A polymer comprising a unit represented by any one of Formulae (1) and (2) below,

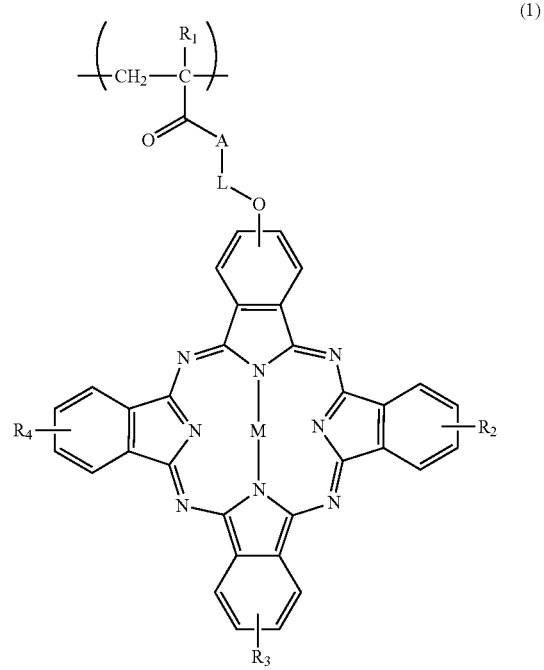

(1)

wherein,
R₁ represents a hydrogen atom or an alkyl group,
R₂ to R₄ each independently represent a hydrogen atom or an alkyl group having 1 to 4 carbon atoms,
A represents an oxygen atom or an NH group,
L represents an alkylene group, and
M represents a divalent metal, an SiX₂ group, or an AlX group, where X represents a halogen atom or an OR₅ group, R₅ being a hydrogen atom, an alkyl group, an aryl group, or an aralkyl group,

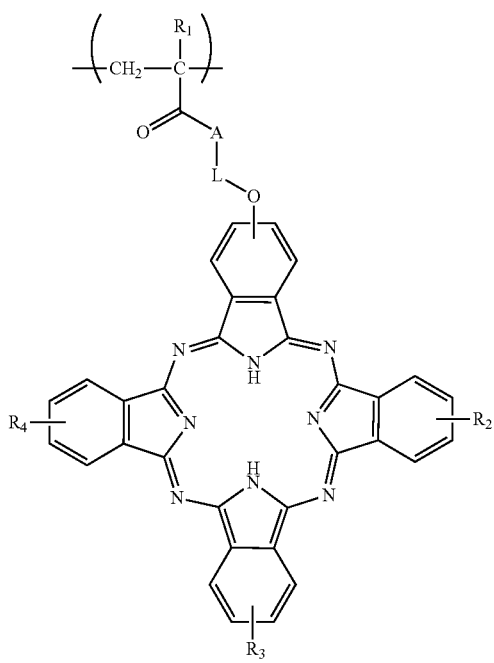

(2)

wherein,
R₁ represents a hydrogen atom or an alkyl group,
R₂ to R₄ each independently represent a hydrogen atom or an alkyl group having 1 to 4 carbon atoms,
A represents an oxygen atom or an NH group, and
L represents an alkylene group.

2. The polymer according to claim 1,
wherein A included in the unit represented by any one of Formulae (1) and (2) is an oxygen atom.

3. The polymer according to claim 1,
wherein all of R₂ to R₄ included in the unit represented by any one of Formulae (1) and (2) are a hydrogen atom.

4. The polymer according to claim 1,
wherein L included in the unit represented by any one of Formulae (1) and (2) is an alkylene group having 1 to 3 carbon atoms.

5. The polymer according to claim 1, being a copolymer including the unit represented by any one of Formulae (1) and (2) and a unit represented by Formula (3) below,

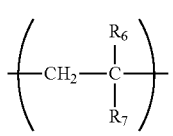

(3)

wherein,
R₆ represents a hydrogen atom or alkyl group, and
R₇ represents a phenyl group, a phenyl group including a substituent, a carboxyl group, an alkoxycarbonyl group, or a carboxamide group.

6. The polymer according to claim 5,
wherein R₆ included in the unit represented by Formula (3) is a hydrogen atom or a methyl group, and R₇ included in the unit represented by Formula (3) is a phenyl group or an alkoxycarbonyl group.

7. The polymer according to claim 1, comprising a unit represented by Formula (1),
wherein M included in the unit represented by Formula (1) is Zn(II), Cu(II), Co(II), Ni(II), or Fe(II).

8. The polymer according to claim 1, comprising a unit represented by Formula (1), the unit represented by Formula (1) being represented by Formula (4) below,

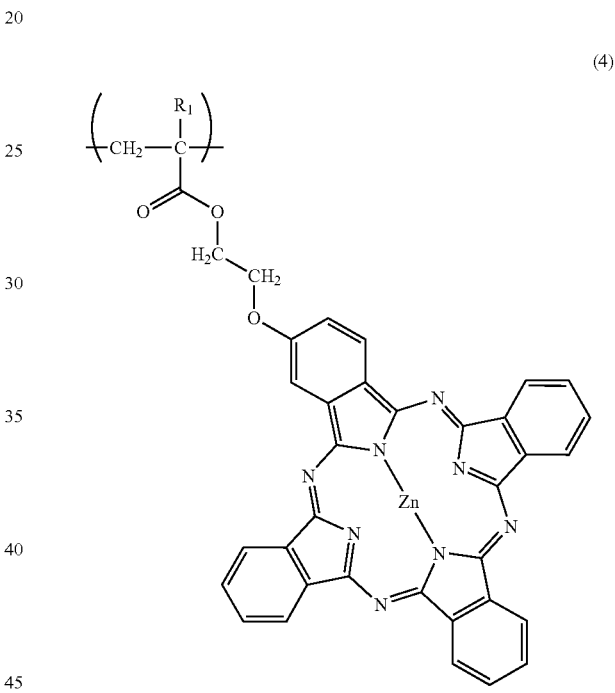

(4)

wherein R₁ represents a hydrogen atom or an alkyl group.

9. The polymer according to claim 1, comprising a backbone part having a number-average molecular weight of 500 to 200,000.

10. A pigment composition comprising the polymer according to claim 1 and a pigment.

11. The pigment composition according to claim 10, wherein the pigment is carbon black or a phthalocyanine pigment.

12. A pigment dispersion comprising the pigment composition according to claim 10 and a water-insoluble solvent.

13. The pigment dispersion according to claim 12, wherein the water-insoluble solvent contains styrene.

14. A toner comprising toner particles each including a binder resin and a colorant, the colorant being the pigment composition according to claim 10.

* * * * *